US012033604B2

(12) United States Patent
Piscoi et al.

(10) Patent No.: US 12,033,604 B2
(45) Date of Patent: Jul. 9, 2024

(54) ELECTRONIC MUSICAL INSTRUMENTS, SYSTEMS, AND METHODS

(71) Applicant: DRUM WORKSHOP, INC., Oxnard, CA (US)

(72) Inventors: Paul Piscoi, Dumbrăviţa (RO); Mark Moralez, Newhall, CA (US); Rich Sikra, Moorpark, CA (US); Connor Lombardi, Camarillo, CA (US); Marcus Ryle, Santa Rosa Valley, CA (US); Dave Coons, Moorpark, CA (US)

(73) Assignee: DRUM WORKSHOP, INC., Oxnard, CA (US)

( * ) Notice: Subject to any disclaimer, the term of this patent is extended or adjusted under 35 U.S.C. 154(b) by 0 days.

(21) Appl. No.: 18/363,621

(22) Filed: Aug. 1, 2023

(65) Prior Publication Data

US 2024/0029693 A1 Jan. 25, 2024

Related U.S. Application Data

(63) Continuation of application No. PCT/US2023/028353, filed on Jul. 21, 2023.

(Continued)

(51) Int. Cl.
*G10H 1/00* (2006.01)

(52) U.S. Cl.
CPC ......... *G10H 1/0008* (2013.01); *G10H 1/0083* (2013.01); *G10H 2240/211* (2013.01)

(58) Field of Classification Search
CPC ............... G10H 1/0008; G10H 1/0083; G10H 2240/211
See application file for complete search history.

(56) References Cited

U.S. PATENT DOCUMENTS

| | | | |
|---|---|---|---|
| 4,242,937 | A | 1/1981 | Pozar |
| 5,262,585 | A | 11/1993 | Greene |

(Continued)

FOREIGN PATENT DOCUMENTS

| | | |
|---|---|---|
| AU | 2018210857 | 3/2022 |
| CN | 207124030 | 3/2018 |

(Continued)

OTHER PUBLICATIONS

Office Action Issued in U.S. Appl. No. 17/153,819; mailed Oct. 6, 2023.

(Continued)

*Primary Examiner* — Jianchun Qin
(74) *Attorney, Agent, or Firm* — Ferguson Case Orr Paterson

(57) ABSTRACT

This disclosure relates generally to electronic musical instruments, systems, and methods. More particularly, this disclosure relates to electronic percussion instruments such as tom toms, snare drums, bass drums, cymbals, and hi-hats, and assemblies of instruments (e.g., percussion instruments), such as drum sets. Some cymbals and hi-hats according to the present disclosure can be used in conjunction with a traditional acoustic metal cymbal. This disclosure also relates generally to devices and methods for operating electronic musical instrument systems including one or more musical instruments and a hub, and particularly to systems including wireless communication between the instrument(s) and hub. Various devices and methods are described for operating the system, including various operational modes of the devices, and including methods and techniques for connecting the devices, improving communication speed and robustness, and conserving power.

18 Claims, 32 Drawing Sheets

Related U.S. Application Data

(60) Provisional application No. 63/408,443, filed on Sep. 20, 2022, provisional application No. 63/391,253, filed on Jul. 21, 2022.

(56) References Cited

U.S. PATENT DOCUMENTS

| | | | | |
|---|---|---|---|---|
| 6,075,197 | A * | 6/2000 | Chan | G10H 1/0008 84/738 |
| 6,271,458 | B1 | 8/2001 | Yoshino et al. | |
| 6,632,989 | B2 | 10/2003 | Yoshino et al. | |
| 6,756,535 | B1 | 6/2004 | Yoshino et al. | |
| 6,822,148 | B2 | 11/2004 | Yanase | |
| 6,881,885 | B2 | 4/2005 | Yoshino et al. | |
| 6,921,857 | B2 | 7/2005 | Yoshino et al. | |
| 7,038,117 | B2 | 5/2006 | Yoshino | |
| 7,385,135 | B2 | 6/2008 | Yoshino et al. | |
| 7,396,991 | B2 | 7/2008 | Susami | |
| 7,459,626 | B2 | 12/2008 | Yoshino et al. | |
| 7,468,483 | B2 | 12/2008 | Yoshino | |
| 7,473,840 | B2 | 1/2009 | Arimoto | |
| 7,491,877 | B1 | 2/2009 | Cherny | |
| 7,612,273 | B2 | 11/2009 | Matsuyuki | |
| 7,694,780 | B2 | 4/2010 | Beels | |
| 7,943,841 | B2 | 5/2011 | Toda | |
| 8,253,001 | B1 | 8/2012 | Liu | |
| 8,563,843 | B1 | 10/2013 | Shemesh | |
| 8,754,318 | B2 | 6/2014 | Mori | |
| 8,946,536 | B2 | 2/2015 | Field | |
| 9,330,643 | B2 | 5/2016 | Field | |
| 9,390,697 | B2 | 7/2016 | Takegawa | |
| 9,424,827 | B2 | 8/2016 | Gill | |
| 9,721,549 | B2 | 8/2017 | Sikra | |
| 9,773,480 | B2 | 9/2017 | Rapp | |
| 9,812,110 | B2 | 11/2017 | Borman | |
| 10,032,440 | B2 | 7/2018 | Field | |
| 10,147,409 | B2 | 12/2018 | Takasaki | |
| 10,475,424 | B2 | 11/2019 | Motohashi | |
| 10,657,944 | B2 | 5/2020 | Gewa | |
| 10,672,370 | B2 | 6/2020 | Takegawa | |
| 10,679,591 | B2 | 6/2020 | Gewa | |
| 10,924,847 | B2 | 2/2021 | Ryle | |
| 11,335,310 | B2 | 5/2022 | Suitor | |
| 11,404,037 | B2 | 8/2022 | Takasaki | |
| 2002/0112593 | A1 | 8/2002 | Yanase | |
| 2004/0118269 | A1 | 6/2004 | Yoshino | |
| 2005/0014510 | A1 | 1/2005 | Ueon | |
| 2005/0039593 | A1 | 2/2005 | Wachter | |
| 2005/0150366 | A1 | 7/2005 | Sasami | |
| 2006/0083235 | A1 | 4/2006 | Mizuno | |
| 2006/0156910 | A1 | 7/2006 | Yoshino | |
| 2007/0137460 | A1 | 6/2007 | Mori | |
| 2007/0234886 | A1 | 10/2007 | Matsuyuki | |
| 2008/0034946 | A1 | 2/2008 | Aimi | |
| 2009/0241761 | A1 | 10/2009 | Hotta | |
| 2013/0152768 | A1 | 6/2013 | Rapp | |
| 2013/0180388 | A1 | 7/2013 | Mori | |
| 2013/0252548 | A1 * | 9/2013 | Levy | H04W 52/0216 455/517 |
| 2013/0340598 | A1 | 12/2013 | Marquez | |
| 2014/0150630 | A1 | 6/2014 | Juszkiewicz | |
| 2014/0208926 | A1 | 7/2014 | Shepherd | |
| 2014/0251116 | A1 | 9/2014 | Peterson | |
| 2014/0260916 | A1 | 9/2014 | Oppel | |
| 2015/0027301 | A1 | 8/2015 | Shih | |
| 2015/0294658 | A1 | 10/2015 | Gill | |
| 2016/0196811 | A1 | 7/2016 | Shen | |
| 2016/0203804 | A1 | 7/2016 | Carpenter | |
| 2016/0210943 | A1 | 7/2016 | Sikra | |
| 2016/0247492 | A1 | 8/2016 | Field | |
| 2016/0284184 | A1 * | 9/2016 | Bean | H04W 52/0251 |
| 2016/0309420 | A1 | 10/2016 | Verma | |
| 2017/0116971 | A1 | 4/2017 | Lehrman | |
| 2018/0061386 | A1 | 3/2018 | Takasaki | |
| 2018/0174556 | A1 | 6/2018 | Steinhauser | |
| 2018/0204557 | A1 | 7/2018 | Steinhauser | |
| 2019/0156798 | A1 | 5/2019 | Motohashi et al. | |
| 2019/0180727 | A1 | 6/2019 | Motohashi et al. | |
| 2019/0186959 | A1 | 6/2019 | Tanabe | |
| 2019/0213983 | A1 | 7/2019 | Motohashi | |
| 2019/0213984 | A1 | 7/2019 | Koizumi | |
| 2021/0056941 | A1 | 2/2021 | Chang | |
| 2021/0068194 | A1 | 3/2021 | Han et al. | |
| 2021/0225338 | A1 | 7/2021 | Piscoi | |
| 2021/0225346 | A1 | 7/2021 | Piscoi | |
| 2024/0029693 | A1 | 1/2024 | Piscoi | |

FOREIGN PATENT DOCUMENTS

| | | |
|---|---|---|
| CN | 110462728 | 11/2019 |
| CN | 112309355 | 2/2021 |
| CN | 113851099 | 12/2021 |
| JP | H04135789 | 12/1992 |
| RO | 00130805 | 6/2014 |
| RO | 130805 | 12/2015 |

OTHER PUBLICATIONS

Office Action Issued in U.S. Appl. No. 17/153,824; mailed Sep. 7, 2023.

Office Action Issued in U.S. Appl. No. 17/153,824; mailed Apr. 5, 2023.

Muzzio Drums, 'Electronic Drums', p. 1-3, Mar. 23, 2021.

Muzzio Drums, 'Hybrid Drum', p. 1-3, Mar. 23, 2021.

Pearl, 'Introducing e-Merge', p. 1-22, Mar. 23, 2021.

Pearl, 'e-MERGE Powered by KORG', p. 1-6, Mar. 23, 2021.

Pearl, 'e-MERGE', pp. 1-22, Mar. 23, 2021.

International Search Report for Application No. PCT/US2021/014217; Dated May 24, 2021.

International Written Opinion for Application No. PCT/US2021/014217; Dated May 24, 2021.

H Nishikawa et al 2015 Journal of Physics: Conference Series.

International Search Report for Application No. PCT/US2017/067605; Dated Feb. 26, 2018.

International Written Opinion for Application No. PCT/US2017/067605; Dated Feb. 26, 2018.

International Search Report for Application No. PCT/US2018/13917; Dated May 15, 2018.

Notice of Allowance issued in U.S. Appl. No. 17/153,824 Issued Jan. 23, 2024.

International Search Report issued in International Application No. PCT/US23/28353, Mailed Dec. 7, 2023.

International Written Opinion issued in International Application No. PCT/US23/28353, Mailed Dec. 7, 2023.

International Search Report issued in International Application No. PCT/US2023/028353 mailed Dec. 7, 2023.

International Written Opinion issued in International Application No. PCT/US2023/028353 mailed Dec. 7, 2023.

Supplementary European Search Report issued in European Application No. 21744950.3 datedJan. 25, 2024.

Written Opinion issued in European Application No. 21744950.3 dated Jan. 25, 2024.

EPO Communication Pursuant to Rules 70(2) and 70a(2) EPC issued in European Application No. 21744950.3 dated Feb. 13, 2024.

Anonymous: "Sending data through an 802.15.4 network latency timing I Digi International", Aug. 8, 2017 (Aug. 8, 2017), pp. 1-5, XP093118863, Internet Retrieved from the Internet: URL:https://www.digi.com/support/knowledge-base/sending-data-through-an-802-15-4-net work-latency-t.pp. 1-5.

Office Action issued in U.S. Appl. No. 18/443,097 issued Apr. 22, 2024.

* cited by examiner

250

| 252 | 254 | 256 | 258 | 260 |
|---|---|---|---|---|
| Preamble | Sync Destination Address | Header | Payload | CRC |
| 8 bits | 32 bits | 32 bits | 24 bits | 16 bits |

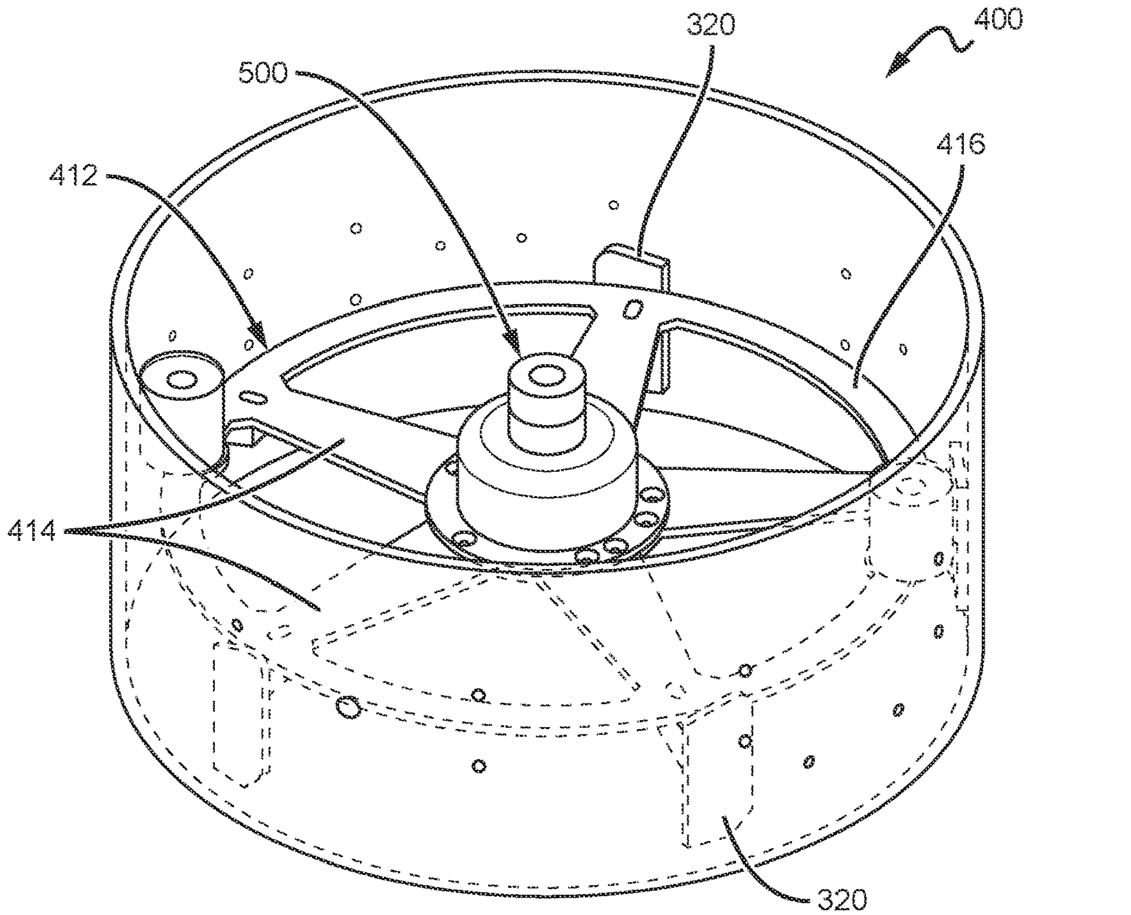
FIG. 4A
FIG. 5A
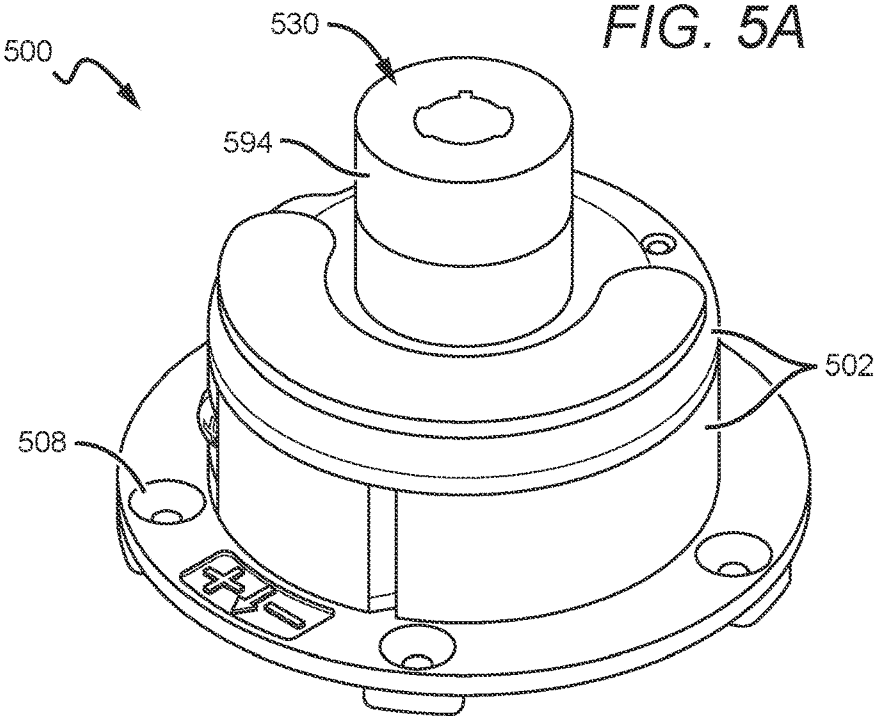

FIG. 10B
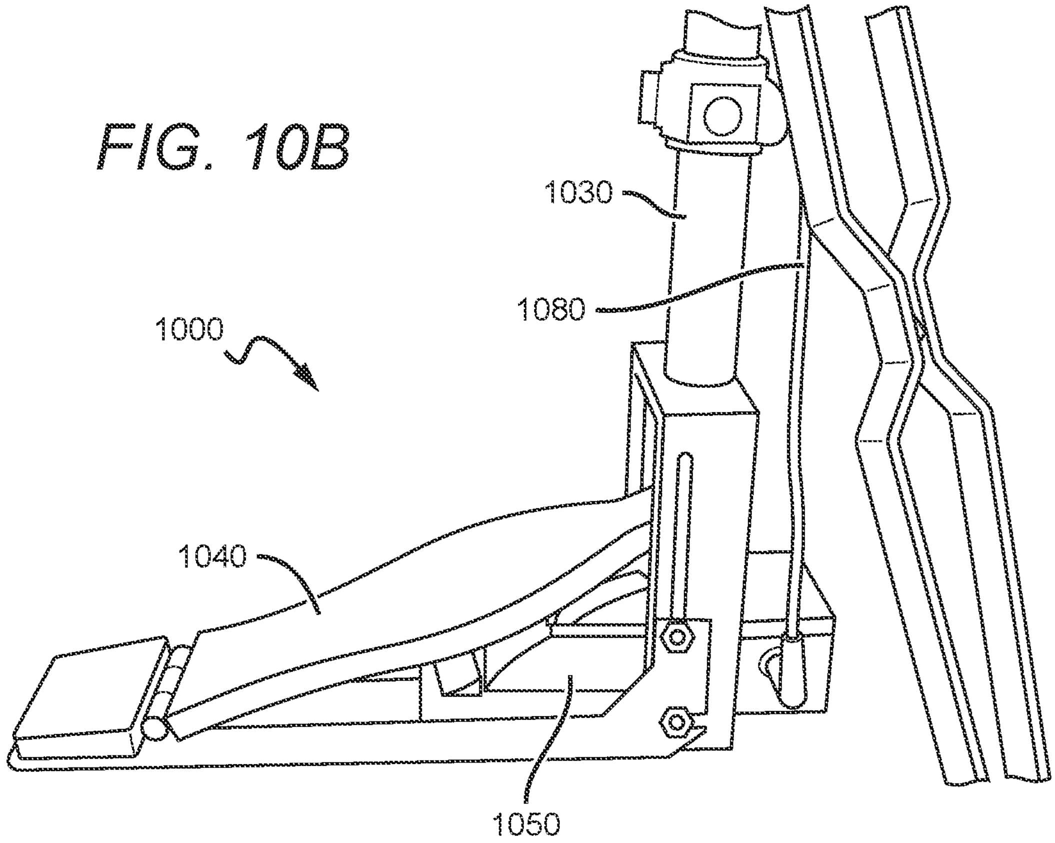
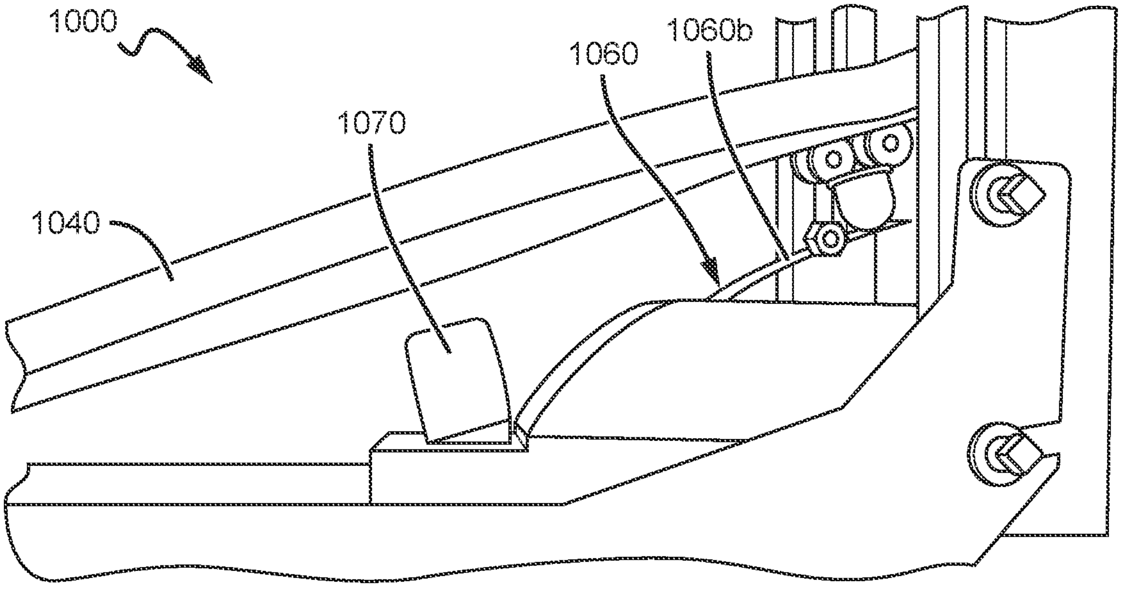
FIG. 10C

ELECTRONIC MUSICAL INSTRUMENTS, SYSTEMS, AND METHODS

REFERENCE TO RELATED APPLICATIONS

This application is a continuation of PCT Pat. App. No. PCT/US2023/028353, filed on Jul. 21, 2023 and entitled "Electronic Musical Instruments, Systems, and Methods," which claims the priority benefit of U.S. Provisional Patent Application No. 63/391,253, filed on Jul. 21, 2022 and entitled "Electronic Cymbal Arrangement and Methods," and the priority benefit of U.S. Provisional Patent Application No. 63/408,443, filed on Sep. 20, 2022 and entitled "Electronic Cymbal Arrangement and Methods." Each of these three priority applications is fully incorporated by reference herein in its entirety.

This application is related to U.S. patent application Ser. No. 17/153,819, filed on Jan. 20, 2021 and entitled "Electronic Musical Instruments and Systems," which claims the priority benefit of U.S. Provisional Patent Application No. 62/963,504, filed on Jan. 20, 2020 and entitled "Electronic Musical Instruments," and the priority benefit of U.S. Provisional Patent Application No. 63/011,882, filed on Apr. 17, 2020 and entitled "Electronic Musical Instruments." This application is also related to U.S. patent application Ser. No. 17/153,824, filed on Jan. 20, 2021 and entitled "Electronic Cymbal Instruments and Systems," which claims the priority benefit of U.S. Provisional Patent Application No. 62/963,504, filed on Jan. 20, 2020 and entitled "Electronic Musical Instruments," and the priority benefit of U.S. Provisional Patent Application No. 63/011,882, filed on Apr. 17, 2020 and entitled "Electronic Musical Instruments." Each of these five related applications is fully incorporated by reference herein in its entirety. Additionally, PCT App. No. PCT/US21/14217, filed on Jan. 20, 2021 and entitled "Electronic Musical Instruments and Systems," is also fully incorporated by reference herein in its entirety.

BACKGROUND OF THE DISCLOSURE

Field of the Disclosure

This disclosure relates generally to electronic musical instruments. More particularly, this disclosure relates to electronic percussion instruments such as tom toms, snare drums, bass drums, cymbals, and hi-hats, and/or to assemblies of instruments (e.g. percussion instruments), such as drum sets. Even more particularly, this disclosure relates to wireless electronic percussion instruments, and percussion instruments with interchangeable and/or removable components to change the instrument between a traditional percussion instrument (that relies on resonance and/or vibration to produce sound) and an electronic percussion instrument.

Description of the Related Art

Prior art wireless electronic drums suffer from latency issues, such that there is a noticeable delay between when an instrument is actuated and when the electronic sound is produced. Prior art wired electronic drums do not suffer from the same latency issues, but are cumbersome due to the requirement for one or more wired connections to each instrument (e.g., for power and/or connection to a sound module). Some examples of prior art wireless electronic percussion instruments, the components and concepts of which may also be incorporated into embodiments of the present disclosure, are shown and described in Romanian Pat. Pub. No. RO 130805A1 to Piscoi, filed on Jun. 30, 2014, the entire contents of which are fully incorporated by reference herein.

SUMMARY OF THE DISCLOSURE

One embodiment of an electronic musical instrument system according to the present disclosure includes an electronic musical instrument with an electronic for communicating with a hub. The electronic musical instrument is configured to operate in a plurality of modes having different functionalities, with the plurality of modes comprising a sleep mode, a standby mode, and a run mode.

One embodiment of a method of operating a musical instrument system according to the present disclosure includes controlling a musical instrument to operate in a plurality of modes comprising a sleep mode, a scan mode, a standby mode, and a run mode. The method further comprises controlling the musical instrument to transition from the sleep mode to the scan mode and send a connection request from said first musical instrument to said hub while in the scan mode. The hub may be controlled to receive the connection request and form a connection between the first musical instrument and the hub. The method further comprises controlling the first musical instrument to transition to the standby mode. The method further comprises controlling the first musical instrument to transition from the standby mode to the run mode and send an instrument signal from the musical instrument to the hub while in the run mode. The hub may be controlled to receive the instrument signal. The method further comprises producing a sound based on the instrument signal.

Another embodiment of an electronic musical instrument system according to the present disclosure includes a hub with at least a first hub antenna, and a musical instrument configured to pair with the hub so as to be able to send instrument signals to the hub, the musical instrument including a first instrument antenna and a second instrument antenna. The hub and musical instrument are configured to send communications between the first instrument antenna and the first hub antenna, and between the second instrument antenna and the first hub antenna.

Another embodiment of a method of operating a musical instrument system according to the present disclosure includes pairing a musical instrument to a hub, and sending one or more instrument signals from a first musical instrument antenna to a hub antenna. The method further comprises determining that communications using the first instrument antenna reached a low performance threshold, transitioning from the first instrument antenna to a second instrument antenna, and sending one or more instrument signals from the musical instrument to the hub using the second instrument antenna.

One embodiment of a cymbal assembly according to the present disclosure includes a striking portion and an electronics portion under the striking portion. The electronics portion comprises at least a first edge sensor. The cymbal assembly further includes a spacer between the first edge sensor and an underside of the striking portion.

Another embodiment of a cymbal assembly according to the present disclosure includes a striking portion, an electronics portion under the striking portion, a first edge sensor between the electronics portion and an underside of the striking portion, and a spacer between the electronics portion and the underside of the striking portion.

One method of forming a cymbal assembly according to the present disclosure includes placing a spacer material between an electronics portion and a striking portion, and curing the spacer material to form a spacer that fills a gap between the electronics portion and the striking portion.

Another embodiment of a cymbal assembly according to the present disclosure includes a striking portion comprising a conductive material, and an electronics portion under the striking portion. The assembly further includes a conductive element on the electronics portion and beneath the striking portion, and one or more sensors configured to measure a variable corresponding to the distance between the striking portion and the conductive element.

One embodiment of a hi-hat assembly according to the present disclosure includes a first cymbal and a second cymbal separated from the first cymbal by a separation distance when the hi-hast assembly is in its resting position. The hi-hat assembly further includes a lever on the first cymbal, with the lever comprising a conductive material, and includes a mount on the first cymbal proximate the lever and also comprising a conductive material. The assembly includes an actuator on the second cymbal, and a sensor between the first and second cymbals configured to measure capacitance between the lever and the mount.

This has outlined, rather broadly, the features and technical advantages of the present disclosure so that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further features and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

FIGS. 4A and 4B are top perspective and exploded top perspective views, respectively, of portions of a snare drum according to another embodiment of the present disclosure;

FIGS. 5A-5F are various perspective views of an electronics portion according to one embodiment of the present disclosure;

FIGS. 10A-10C are perspective views of another embodiment of a hi-hat assembly according to the present disclosure;

DETAILED DESCRIPTION OF THE DISCLOSURE

Figures 1A, 2B:
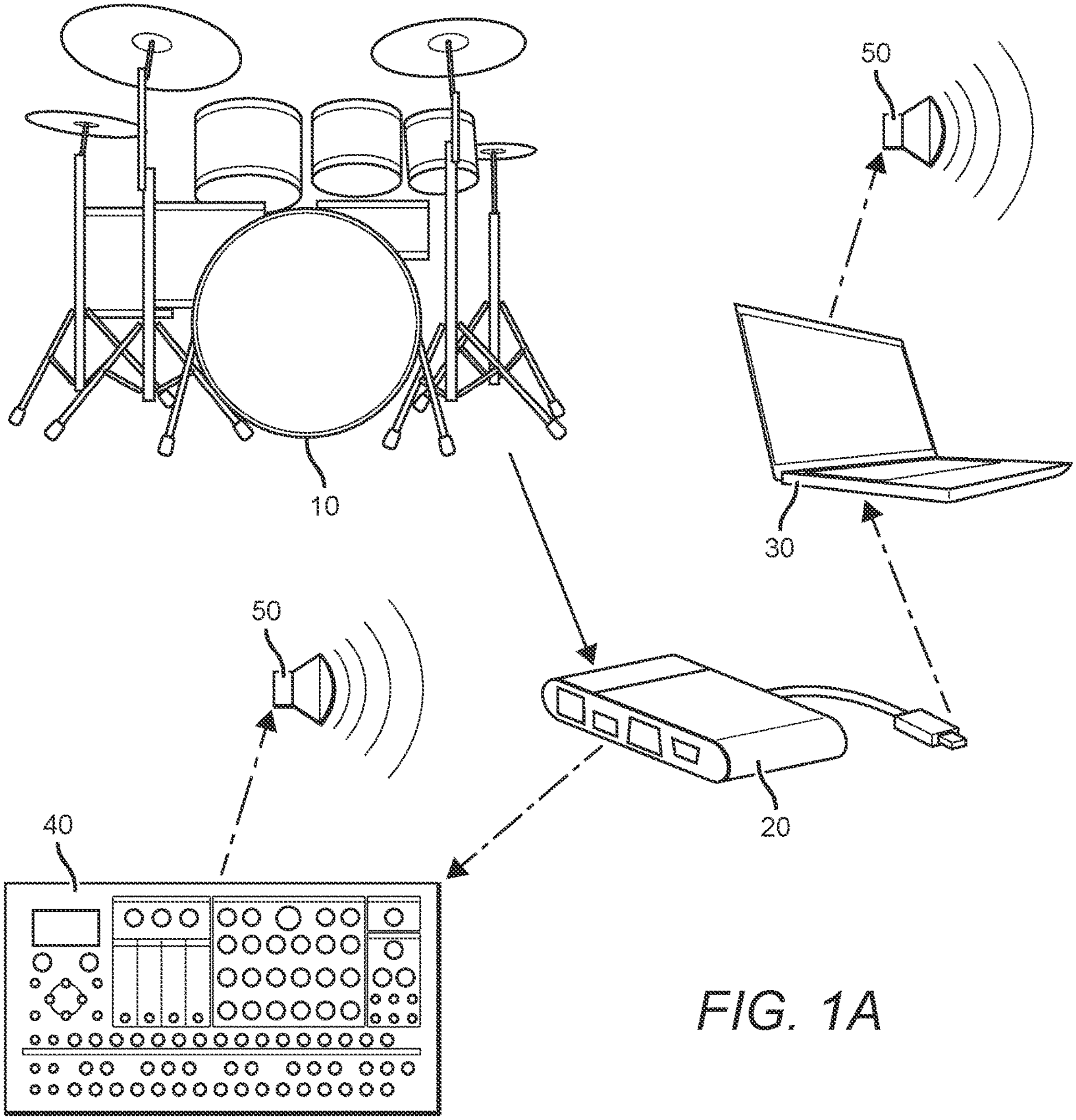
FIG. 1A is a diagram of a musical instrument system according to the present disclosure.
FIG. 2B is a diagram of an instrument signal according to one embodiment of the present disclosure.

This disclosure relates generally to electronic musical instruments. More particularly, this disclosure relates to electronic percussion instruments such as tom toms, snare drums, bass drums, cymbals, and hi-hats, and assemblies of instruments (e.g., percussion instruments), such as drum sets. Even more particularly, this disclosure relates to wireless electronic percussion instruments, and percussion instruments with interchangeable and/or removable components to change the instrument between a traditional percussion instrument (that relies on resonance and/or vibration to produce sound) and an electronic percussion instrument. The present disclosure also relates to electronic cymbal instruments, such as cymbal assemblies and hi-hat assemblies, some embodiments of which can be used in conjunction with a traditional acoustic metal cymbal.

The present disclosure also relates generally to devices and methods for operating electronic musical instrument systems including one or more musical instruments and a hub for receiving signals, in many embodiments wirelessly, from the musical instruments. Various devices and methods are described for operating the system, including various operational modes of the devices, and including methods and techniques for connecting the devices, improving communication speed and robustness, and conserving power.

It is understood that when an element is referred to as being "on" another element, it can be directly on the other element or intervening elements may also be present. Similarly, if an element is "attached to," "connected to," or similar, another element, it can be directly attached/connected to the other element or intervening elements may also be present. Furthermore, relative terms such as "inner", "outer", "upper", "top", "above", "lower", "bottom", "beneath", "below", and similar terms, may be used herein to describe a relationship of one element to another. Terms such as "higher", "lower", "wider", "narrower", and similar terms, may be used herein to describe angular and/or relative relationships. It is understood that these terms are intended to encompass different orientations of the elements or system in addition to the orientation depicted in the figures.

Although the terms first, second, etc., may be used herein to describe various elements, components, regions and/or sections, these elements, components, regions, and/or sections should not be limited by these terms. These terms are only used to distinguish one element, component, region, or section from another. Thus, unless expressly stated otherwise, a first element, component, region, or section discussed below could be termed a second element, component, region, or section without departing from the teachings of the present disclosure.

Embodiments of the disclosure are described herein with reference to view illustrations that are schematic illustrations. As such, the actual thickness of elements can be different, and variations from the shapes of the illustrations as a result, for example, of manufacturing techniques and/or tolerances are expected. Thus, the elements illustrated in the figures are schematic in nature and their shapes are not intended to illustrate the precise shape of a region and are not intended to limit the scope of the disclosure.

FIG. 1A shows one embodiment of a basic system according to the present disclosure. The system in FIG. 1A includes one or more musical instruments 10 configured as described herein. In the specific example of FIG. 1A, each musical instrument 10 is a drum or cymbal of a drum set. The drum set may include multiple drums and cymbals 10. In other examples, the musical instrument 10 may be another type of musical instrument. The one or more musical instrument(s) 10 are configured to transmit instrument signals to a hub 20. The instrument signals may be produced by the one or more musical instrument(s) 10, for example, in response to actuations of the musical instrument(s) 10 which cause one or more sensors to produce electrical impulses. Those instrument signals may be transmitted to the hub 20 wirelessly. The hub 20 can include one or more electronic processors (such as, but not limited to microprocessors) and/or circuits configured to provide operations and functions described herein, and can serve as an intermediary device for receiving the instrument signals. The hub 20 is connected to another device such as a computer 30 or sound module 40, that itself produces sound or is connected to one or more other sound producing devices such as speakers 50. The transmission link from the hub 20 to the computer 30 or the sound module 40 may be wired in order to minimize latency. In other examples, the transmission link from the hub 20 to the computer 30 or the sound module 40 is a wireless link (e.g., using a different protocol, frequency, timing, code, or other mechanism to be distinguished from wireless transmissions from the one or more musical instrument(s) 10). The hub 20 can be provided with or receive electrical power via one or more batteries, connection to a wall socket, connection to a host device, or other means known in the art.

Wireless Connection

In embodiments of the present disclosure, messages/signals (used interchangeably herein) can be sent from the instrument(s) 10 to the hub 20 using various specifications known in the art, such as the Bluetooth LE, though it is understood that other formats may be used. In one embodiment, the signal can be sent using a frequency-shift keying (FSK) frequency modulation scheme. One specific embodiment uses Bluetooth and/or 1 Mbps FSK. It is understood that any signal-sending specification with adequate latency performance could be used in embodiments of the present disclosure.

While certain prior plug-in (i.e., wired) modules have typically experienced latency in the range of 4-12 ms, embodiments of the present disclosure have experienced latencies of 20 ms or under, 15 ms or under, 12 ms or under, or under, 8 ms or under, 6 ms or under, or even lower latency. Moreover, the additional latency caused by the wireless nature of embodiments of the present invention versus a wired equivalent, if any, can be less than 1 ms, less than 500 μs, less than 250 μs, even less, or zero; or the wireless nature may actually reduce overall system latency versus a wired equivalent.

Figure 1B:
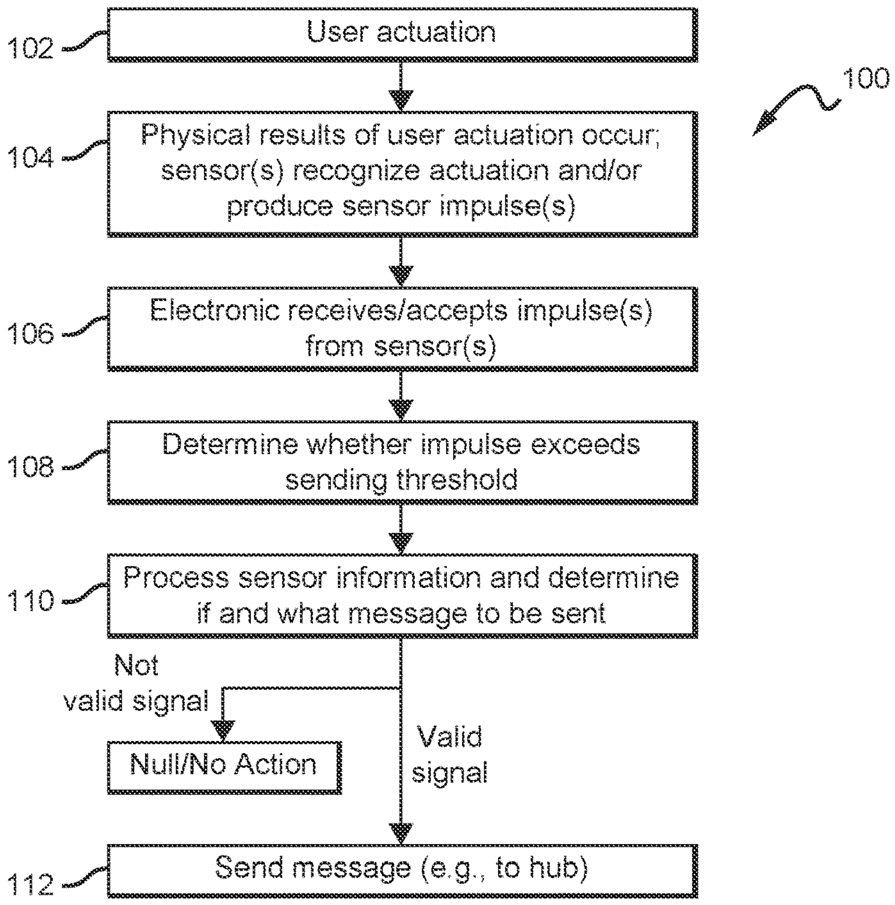
FIGS. 1B and 1C are flow charts showing methods according to embodiments of the present disclosure.

FIG. 1B is a flow chart of a method 100 according to one embodiment of the present disclosure which can be utilized with various instruments according to the present disclosure, including but not limited to the instruments in FIG. 1A and as specifically described below. It is understood that additional blocks may be included, and/or blocks may be omitted.

Upon a user actuating an instrument 10 (block 102), the actuation(s) (e.g., through the physical results of the actuation such as, but not limited to: displacement of a drum head, cymbal or pedal; vibration of a drum head, cymbal or other part of the instrument 10; etc.) are recognized by one or more sensors of the electronic musical instrument (block 104), which can produce a reaction (e.g., an impulse). The sensors can be linked (e.g. using one or more wires) to an electronic, such as the electronic 200 shown in FIG. 2 discussed in more detail below, though it is understood that other electronics could be used as would be understood by one of skill in the art. The electronic 200 includes one or more processors or processing electronics configured to receive/accept information (e.g., impulses) from the one or more sensors (block 106). The processors or processing electronics are further configured to then perform a logical function (e.g., using a logic gate circuit or software routine) to determine what, if any, message it should send based on the accepted information/impulse(s). In one specific embodiment, the processors or processing electronics are further configured to determine, based upon one or more accepted impulses, 1) whether the impulse from the sensor(s) exceeds a minimum sending threshold (which can help prevent inadvertent transmission of unintended impulses) (block 108), and 2) if so, process the sensor information and determine if and what message/signal to send (block 110). In certain examples, the minimum sending threshold can be, for instance, a predetermined voltage that must be caused by one or more of the instrument's piezoelectric sensors. In other examples, the minimum sending threshold can be another predetermined sensor output. If the minimum sending threshold is met, the electronic can then send the determined message to the hub 20 (block 112).

The system can be configured such that the hub 20, or another recipient-end element, sends an acknowledgment signal when the message from the electronic is received. The processors or processing electronics of the electronic 200 can be further configured to include a resend protocol such that if an acknowledgment message is not received within a certain period of time, the electronic 200 resends the original message. In certain embodiments, the resend time (i.e., the time that passes after which the electronic 200 will resend if it has not received an acknowledgment signal) is 1 ms or less. This cycle can be repeated until a pre-set timeout, after which the electronic would no longer attempt to send the original message. Due to the resend time being 1 ms or less, it would take multiple resend attempts before a human would be able to recognize that the original signal had not gone through. In some embodiments, 5 to 100 resends, 25 to 75 resends, or about 50 resends may be attempted before timeout.

Instrument Signal

In particular examples, the electronic 200 is configured such that each signal produced and transmitted by the electronic 200 in response to an actuation of one of the instruments 10 can be 25 bytes or less; or 20 bytes or less; or 15 bytes or less; or 10 bytes or less; or 5 bytes or less; or 3 bytes or less. In one embodiment a 112 bit/14 byte signal is used. The above signal sizes result in reduced latency and/or a reduced likelihood of interference.

In an even further specific embodiment, a standardized packet format 250 of 112 bits is divided with 8 bits dedicated to a preamble 252, 32 bits dedicated to a sync destination address 254 identifying the message recipient, 32 bits dedicated to a header 256, 24 bits dedicated to a payload 258, and 16 bits dedicated a CRC 260. It should be understood that messages of various sizes can be divided using these same or different proportions.

Sync addresses (e.g., sync destination addresses 254) can be unique to each product, similar to a serial number, and can be used as the "identifiers" described herein, and could also be used in other manners, such as, but not limited to identifying manufacture date, manufacturer, etc. A portion of the sync address can also identify the type of product the sender and/or destination is, such as a hub or an instrument electronic. For instance, a plurality of bits may be consistent among product type. In another embodiment, further differentiation is possible; for instance, each type of instrument may have its own identifier. In one specific embodiment, a first portion (e.g., the first or last 8 bits) of the sync destination address identify the type of product (e.g., hub or instrument), while the other 24 bits identify the specific hub or instrument. Other embodiments are possible.

Headers 256 can be used for a variety of information such as, but not limited to, retry count (i.e., whether this message is the first, second, etc. attempt to send the same substantive information), the antenna used to transmit the message (e.g., chip or wire antenna), which antenna the recipient should use to receive the message (e.g., chip or antenna), the sequential number of the message (e.g., sequential number of the message since the electronic awoke from sleep mode, which can be independent of retry attempts), and the type of message (e.g., instrument signal based on actuation of instrument, acknowledgment message, etc.). In one embodiment of the disclosure, the sequential number of the message for an instrument or electronic does not reset, and thus serves to indicate to the user how much the instrument or electronic has been used.

Payloads 258 can be used to embody a variety of operational variables. For instance, they can (1) identify the sender of the message using a receiver-assigned identifier, and/or (2) include information related to the actuation. In the specific embodiment using MIDI formatting, the payload 258 could include MIDI zone and velocity (i.e., 0-127) information.

Signal lengths used in embodiments of the present disclosure can also be relatively short, such as, for example, 250 µs or less in length, 200 µs or less in length, 150 µs or less in length, or less than 100 µs in length, though it is understood that other lengths are possible. This can also result in reduced latency and/or a reduced likelihood of interference, especially when combined with the above-described signal sizes.

Instrument Power Modes

Power savings can be vital in wireless electronic instruments, given that replacement of batteries in an electronics module can be a complicated and time-consuming process, and because power loss at an unexpected time is undesirable. In certain embodiments, instruments 10, such as through the electronic 200 (including processing electronics and/or electronic modules, as will be more fully described later in this disclosure), can be controlled to operate utilizing two or more power modes, which can help with power savings. Some power modes according to embodiments of the present disclosure include (1) sleep mode, (2) standby mode, and/or (3) run mode, though it is understood that other modes and any number of modes are possible (e.g. one mode, two or more modes, three or more modes, four or more modes, etc.). It should be understood that when referring to an instrument in the descriptions with regard to FIGS. 1A-2, instrument power modes, and other descriptions as would be understood by one of skill in the art, this can also refer to the electronics module and/or electronic 200 (to be discussed more fully later in this disclosure), and these same or similar concepts can be applied to a hub 20. It should also be understood that when referring to the number of modes, this does not include the instrument state where the instrument is completely off, such as because it has been switched completely off or lacks a power source.

Sleep mode: In some embodiments, an instrument 10 and/or electronic 200 can be in sleep mode until it is awoken by an action. In sleep mode, the instrument operates in a limited manner and/or has less functionality than other modes so as to conserve power. Power usage in sleep mode can be minimal, such as, for example, 100 µA or less, µA or less, 25 µA or less, 10 µA or less, or about 10 µA, while still being non-zero. In sleep mode, any boost converter(s) and/or analog circuitry can be disconnected and/or powered down to reach these low power usage levels.

The instrument 10 could be set to wake from sleep mode and transition to standby mode (described below) only when a single waking action is recognized, or when any one of a plurality of waking actions are recognized. Exemplary waking actions include, for example, pairing to a hub 20; receiving a connection request (e.g. from a hub 20); receiving acknowledgment and/or acceptance (e.g. from a hub of a connection request sent by the instrument 10; actuation of the instrument 10 (e.g. striking of a drumhead), which in a more specific embodiment would require actuation of at least a threshold magnitude; receipt of a sensor impulse by the electronic 200 from a sensor, which in a more specific embodiment would require the impulse to be of at least a threshold magnitude; the operation of a switch, such as a switch in a throw-off; or other embodiments as would be understood by one of skill in the art.

The use of threshold magnitudes in this and other manners can be useful in that threshold magnitudes can avoid the instrument 10 and/or system taking action in response to a minor and/or inadvertent stimulus, such as a user brushing against or slightly bumping an instrument, or causing a minor sensor impulse that did not meet the threshold magnitude. Avoiding inadvertent waking reduces unwanted power loss and other unintended actions. The instrument can recognize a stimulus, determine whether the threshold magnitude has been met, and then either take action or not depending on whether the threshold magnitude was met. This block can be similar to or the same as the block 110 from FIG. 1B, or can be different. In one embodiment, whether or not a threshold magnitude has been met is determined by measuring the voltage caused by one or more of an instrument's sensors (e.g., its main piezoelectric sensor) and comparing that voltage to a predetermined threshold voltage. Threshold magnitudes can be pre-set or user-configurable, and can be different or the same for different instruments and sensors, including sensors within the same instrument. The threshold magnitude and/or the determination of whether a threshold magnitude has been met can be made using an analog comparator (e.g., for each sensor), and adjustment of the threshold magnitude(s) can be made by adjusting comparator bias. Threshold magnitudes can also be stored (e.g., in memory) and/or adjusted within the electronics module 210.

Sleep mode can be re-entered from other modes upon the meeting of certain pre-set conditions. For instance, in one embodiment, the system reenters sleep mode upon determining that the instrument 10 is no longer paired to a hub 20. In another embodiment, the system reenters sleep mode upon the passage of a pre-determined amount of time without receiving a stimulus.

Sleep/Scan toggle: In some embodiments the instrument 10 is not configured to seek such a hub connection while in sleep mode. Instead, the instrument 10 can temporarily wake from sleep mode to a scan mode, wherein the instrument 10 sends a connection request to one or more potential pairing partners before returning to sleep mode if no connection is made and/or no acknowledgment is received. This can be done at pre-set time intervals (a "sleep timer"), such as every 1 second or more, every 3 seconds or more, every 5 seconds or more, every 7 seconds or more, every 10 seconds or more, every 30 seconds or more, every 60 seconds or more, every 60 seconds or less, every 30 seconds or less, every 15 seconds or less, every seconds or less, every 7 seconds or less, every 5 seconds or less, every 3 seconds or less, every 1 second or less, combinations of these ranges (e.g., between every 1 second and every 30 seconds or between every 1 and 15 seconds), or other ranges or intervals as would be understood by one of skill in the art. The total time in scan mode for each of these request cycles, including a nominal wake-up time (typically under 100 μs, such as about 10 μs), can in embodiments of the present disclosure be under 1 second, under 500 ms, under 250 ms, under 100 ms, under 50 ms, under under 10 ms, under 5 ms, under 2.5 ms, 500 μs-5 ms, or around 1.5 ms, though it is understood that these ranges are exemplary in nature. The total percentage of time in standby mode for each request cycle can be less than 5%, less than 1%, less than 0.50, less than 0.10, less than less than 0.0250, or around 0.020, though it is understood that these ranges are exemplary in nature.

In one embodiment of this toggling, the instrument only sends a message seeking connection to one or more preferred hubs 20 as will be described more fully below, such as its most recently connected hub 20. This can minimize the amount of power used and the amount of time in scan mode. It should also be understood that in one embodiment, the electronic performs this function as part of its sleep mode without toggling to scan mode (which means sleep mode would require more power). The instrument can send the message on the same frequency or channel that it used during its last connection to the hub 20, or on a plurality of frequencies/channels. In a further specific embodiment, if the instrument is unable to connect on that frequency/channel, it can then seek connection using a plurality of other frequencies/channels.

Upon successfully linking with a hub 20, the instrument 10 can perform or complete a transition from sleep mode or scan mode to standby mode within a nominal and/or near-zero amount of time.

Standby mode: In some embodiments, an instrument 10 and/or electronic 200 can include a standby mode, which is a partially operational mode with more operational capability than sleep mode and, in some embodiments, scan mode. For instance, in standby mode, the instrument/electronic can have its analog circuitry and/or boost converter(s) powered, and can be ready to quickly transition to run mode and send an instrument signal. As another example, while in standby mode the instrument can be configured to send a ping message to its connected hub after a certain period of inactivity (an "idle timer") to confirm the connection, or alternatively to confirm that the connection has ended. Examples of standby mode functions will be described below with regard to FIG. 1C.

Run mode: In run mode the instrument 10 is capable of sending and receiving instrument signals to and from a pair partner such as a hub. Run mode may include less than all of the functionality of sleep and/or standby modes; for instance, certain other functionalities may not be conducted in run mode, such as seeking a pairing partner/hub, because such actions are not necessary. This can result in a reduction in data traffic, thus saving power and resulting in a lower chance of interference. As another example, if profile information of the instrument 10 is shared as part of the process of connecting to the hub 20, then that information need not be communicated when the instrument 10 is in run mode unless there is a change to that information (e.g., the user sends an instruction that the drum should change from sounding like a first type of drum to a second type of drum).

Standby/Run toggle: As will be more fully described below with regard to FIG. 1C, the instrument 10 can toggle between standby and run modes, such as when it is being played by a user. From standby mode, the instrument 10 can determine whether it has received an instruction or stimulus (e.g., one meeting a threshold magnitude). If so, then the instrument 10 can wake from standby mode to run mode to formulate and send an instrument signal and await/receive acknowledgment of receipt from the hub 20.

Similarly, hubs 20 according to certain examples of the present disclosure can also operate utilizing the above-described power modes, with "wake-up" achieved through means such as operation of a computer to which the hub is connected (e.g. through moving a computer mouse, logging in, actuating a touchscreen, etc.) or other means such as those described above with regard to instruments and/or those that would be understood by one of skill in the art.

Instrument-Hub Connection

As described above with regard to the power modes, methods according to the present disclosure can include pairing of an instrument 10 with a hub 20. An instrument 10 can be configured to seek connection to a hub 20 in any number of ways. For instance, the instrument 10 can seek connection to a hub 20 (or vice versa) upon an instruction or stimulus as previously described, and/or at pre-set time intervals as previously described. In some embodiments, the instrument 10 first seeks connection and/or only seeks connection to a preferred hub 20, such as the hub 20 with which it was most recently connected. The instrument 10 can seek connection to any hub (as opposed to the preferred hub) in cases where the preferred hub is not found or where there is no record of a preferred hub, such as when the instrument is brand new. For instance, the instrument 10 can be configured to broadcast a scan message and listen for a response from any hub (which a hub 20 may send while in pairing mode, which can be instituted by the user). In one embodiment, the instrument 10 can be configured to seek connection through a priority list of hubs stored in memory of the electronic 200, such as from the most recently paired (most preferred) to the oldest paired (least preferred), prior to seeking connection to any non-preferred hub. In one embodiment, if the instrument 10 is seeking connection at pre-set time intervals, it may only seek connection to a previously paired hub(s), for example only to its most recently paired hub. Hub preferences, such as the most preferred hub or a preferred hub list (which could use the identifiers of the preferred hub(s)) can be stored in memory of the electronic 200.

Instrument Profile and Settings Sharing

As part of its communication with a hub 20, an instrument 10 (or electronic 200, electronics module, etc.) according to the present disclosure can also share information regarding that instrument. By way of example, the instrument 10 can send or receive instrument profile information and/or settings to or from the hub 20.

Instrument profile information could include, but is not limited to, non-configurable information, identifier(s) and/or identifying information (e.g. serial number), firmware information, instrument information (e.g. instrument type, instrument size, manufacturer(s), custom modifications, instrument usage information (e.g. how much has the instrument been played), etc.), and/or other information as would be understood by one of skill in the art.

Settings can include, but is not limited to, instrument settings configurable by a user, digital instrument information (i.e., information about the sounds of the instrument which the electronic instrument is to emulate, such as make, model, shell type, size, head information, and the like), sound settings (e.g. volume settings and post-processing settings such as transient shaping, reverb, delay, etc.), and/or other information as would be understood by one of skill in the art. The settings, and particularly the settings that vary based on usage or user-selected configuration, can be saved within an instrument (e.g., via memory of the electronic 200) whenever an instrument 10 is disconnected from a hub 20, such as to the instrument's electronic 200 or the memory otherwise associated with the instrument 10, so that they can be utilized the next time the instrument 10 connects to that hub 20 and/or a different hub.

Sharing of information profile and/or settings can take place at any number of different times, as will be discussed with regard to the below instrument-hub connection example.

Example Method for Operating Musical Instrument System

Figure 1C:
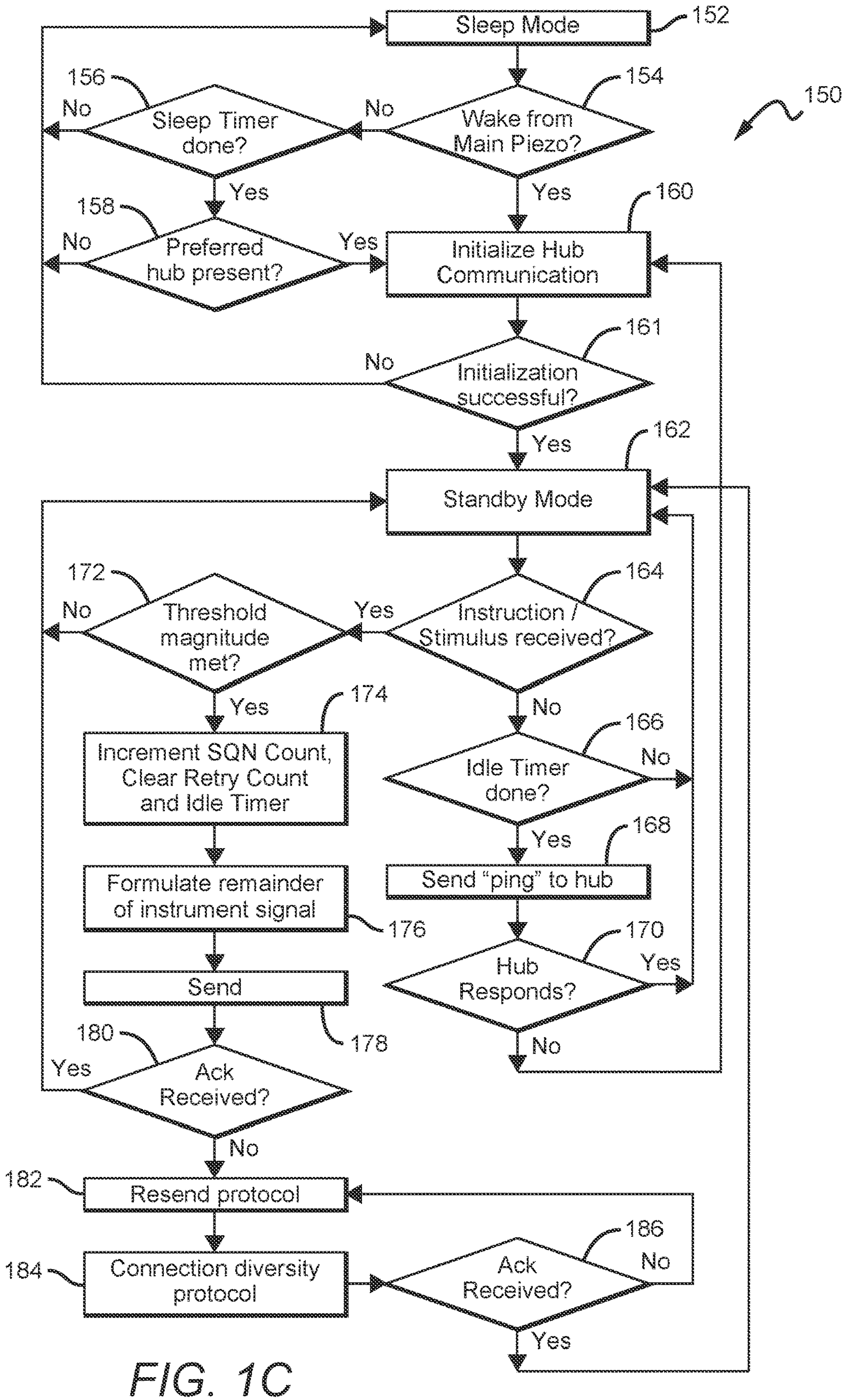

FIG. 1C shows an example of method 150 for operating a musical instrument system according to the present disclosure. It should be understood that the method 150 is only an example, and numerous other embodiments are contemplated. For instance, blocks shown in FIG. 1C may be omitted, blocks may be combined with one another, blocks may take place in an order different than that shown, and/or additional blocks may be included. It should also be understood that while this example refers to the "instrument" taking action, this action could specifically be taken by a component of the instrument 10, such as the electronic 200, the electronics module 210, a sensor, etc. It should also be understood that a plurality of instruments 10 may be performing this method at the same time, with the same hub 20 or different hubs.

Blocks shown or described as taking place during a certain instrument mode may also take place exclusively in one or more different mode(s) not shown/described, or in multiple modes including or excluding the mode shown/described. With regard to FIG. 1C, examples of sleep mode blocks include blocks 152, 154, and/or 156; examples of scan mode blocks include blocks 154 (which serves as an impetus to change from sleep mode to scan mode), 158, and/or 160; examples of standby mode blocks include blocks 162, 164, 166, 168, 170, and/or 172; and examples of run mode blocks include blocks 172 (which serves as the transition point between standby mode and run mode if the threshold magnitude is met), 174, 176, 178, 180, 182, 184, and/or 186.

Turning to an example of a method 150 according to the present disclosure, once the instrument is connected to a power source and/or turned on, in block 152 it can be in sleep mode such as that described above. In block 154, a waking action may occur, such as an impulse from a specific sensor (e.g., a primary piezoelectric sensor of the instrument, such as the center drumhead piezoelectric sensor of a drum). As the instrument awaits a waking action, it can cycle through its sleep timer checks (block 156) as described above with regard to the sleep mode/scan mode toggle to determine whether a hub (e.g., a preferred hub) is present (block 158). It should be understood that the instrument could also go into scan mode and determine whether the hub is present (block 158) after block 154 and prior to block 160. In block 158, in one embodiment scan mode utilizes only the channel on which it was last connected to determine whether a hub 20 is present; in another embodiment, it utilizes a plurality of channels, such as all available channels.

Once either the condition from block 154 or block 158 is met, the instrument 10 can attempt to initialize communication with the hub 20 in block 160. In block 160, the instrument 10 can attempt to initialize communication (e.g., in the manner described above with regard to a sleep/scan toggle) utilizing only the channel on which it was last connected to determine whether a hub is present, utilizing a plurality of channels, or using all available channels. In one embodiment, block 160 utilizes more channels than block 158. Examples of channels that can be used will be discussed further below. In block 161, the instrument 10 determines whether initialization was successful. If initialization is not successful, then the instrument 10 can return to sleep mode 152 and re-cycle through the previously described blocks. If initialization is successful, then the instrument 10 can enter standby mode 162.

While in standby mode 162, in block 164 the instrument 10 can be monitoring for an instruction or stimulus (referred to hereinafter as "stimulus" for simplicity), such as monitoring one or more terminals 202 of the electronic 200. Assuming no stimulus has been received, the instrument 10 will continue to monitor for a stimulus until it determines in block 166 that a pre-determined period of time has passed, i.e., that the idle timer has expired. The idle timer can be, for instance, between 10 seconds and 10 minutes, 30 seconds and 5 minutes, 1 minute and 3 minutes, about 2 minutes, greater or less than any of these times, or combinations of these ranges, though it is understood that these times are only exemplary in nature and other times are possible.

Upon determining that the idle timer has expired, in block 168 the instrument 10 will send a “ping” message to the hub 20 to confirm that a connection still exists. In block 170, the instrument 10 will determine whether or not the hub 20 responded to the ping message. If the hub 20 responded, the instrument 10 will return to standby mode 162 and the idle timer will reset. If the hub 20 does not respond, then the instrument 10 can return to block 160 to attempt to initialize a hub connection, or to another block or state such as sleep mode 152.

If a stimulus 164 is detected, then in block 172 the instrument 10 can determine whether or not the stimulus 164 met a threshold magnitude. If the stimulus 164 did not meet the threshold magnitude, then the instrument 10 can return to standby mode 162 and re-cycle through the described blocks. The threshold magnitude for the stimulus 164 can be less than a threshold magnitude for a stimulus in block 154 used to wake the instrument from sleep mode 152; that is, a higher magnitude stimulus (e.g., a higher velocity strike) may be required to wake the instrument from sleep mode 152 than the threshold stimulus that results in the sending of an instrument signal.

If the stimulus 164 meets the threshold requirements, then the instrument 10 can enter run mode. In block 174, the sequential number of the message (previously described) will be assigned, and the retry count and idle timer will be reset by the instrument 10. In block 176, the remainder of the instrument signal will be formulated (e.g., from sensor inputs), and in block 178 the instrument signal will be sent. The instrument 10 will then monitor for an acknowledgment message from the hub 20 and determine whether or not such a message has been received (block 180). The instrument 10 (e.g., through its electronic 200 and/or transceiver) can change to “receive” mode while awaiting an acknowledgment message.

Acknowledgment messages according to certain examples of the present disclosure can include the same sequential number as the received instrument signal so as to properly identify the instrument signal that is being acknowledged.

Once an acknowledgment message is received, the instrument 10 returns to standby mode 162. If an acknowledgment message is not received, then the instrument can enter its resend protocol 182 and/or its connection diversity protocol 184, both described in detail elsewhere in this disclosure. This can take place after a pre-set time after the sending of the instrument signal during which an acknowledgment message was not received, such as, for example, at least 50 μs, at least 100 μs, at least 250 μs, at least 400 μs, immediate (~0 or nominal), less than 5 ms, less than 2 ms, less than 1 ms, less than 500 μs, ranges between any of these times, and/or about 430 μs. In one embodiment, the time prior to re-send is varied. For instance, the re-send time can be varied and/or randomized among a plurality of potential re-send times (e.g., immediate, 320 μs, 640 μs, and/or 960 μs), or within a range of potential re-send times, such as the ranges discussed above. Different instruments/electronics in a system can have different re-send times or protocols so as to avoid the rare situation where two or more signals are produced at the exact same time and enter re-send protocols having the exact same timing.

In block 186, if an acknowledgment is eventually received, the instrument 10 can return to standby mode 162. If, on the other hand, no acknowledgment is received after the completion of the resend protocol 182 and/or connection diversity protocol 184 as applicable, then in some embodiments the instrument 10 can return to blocks 182,184 to repeat the resend and/or connection diversity protocols. If the maximum number of attempts is eventually reached without an acknowledgment being received, the instrument 10 returns to block 160 (initializing a hub communication) and/or standby mode 162, or other blocks as would be understood by one of skill in the art.

In one block not shown in FIG. 1C, prior to sending an instrument signal in block 178, instruments/electronics according to the present disclosure can perform a check of the wireless radio frequency prior to sending a signal. If the frequency is busy/being used already, such as by another instrument in the drum set, then the instrument/electronic can delay sending for a short period of time (e.g., 1 ms or less, 500 μs or less, 100 μs-500 μs, or about 270 μs) before either sending the signal or performing another check to see if the frequency is clear.

Multiple Instruments

In some embodiments of the present disclosure, a single hub 20 is used to receive signals from multiple electronic instruments 10, and thus produce sounds (through one or more sound sources) from each of those instruments. For instance, a single hub 20 can be used to receive signals from the various instruments 10 of a drum set, such as 1) a snare drum, 2) one or more toms, 3) a bass drum, 4) one or more cymbals, and 5) a hi-hat. The previously-described connection methods can be utilized in such a system, with an instrument 10 connecting in the above-described manners to that hub 20 while that hub 20 is already connected to one or more other instruments 10. It should be understood that any ratio of instruments:hubs is possible, often with fewer hubs than instruments, and in an even more specific embodiment with multiple instruments connected to a single hub.

Multiple electronics that are sending signals from multiple respective instruments 10 as part of a system can transmit messages to the same hub 20 on the same frequency. Because of the relatively small size and/or message length of each message as discussed above, there is a low chance of interference. In one embodiment of the present disclosure, each of two or more electronics of a system (e.g., the electronics for different instruments 10 of a drum set) can be set with a different resend time or protocol, or a varied/randomized protocol as previously described. This can stagger resends should two messages from respective electronics happen to interfere with one another, such as if a drummer were to actuate two or more instruments 10 at the exact same time. If the resend protocols of the instruments were set with the exact same resend time, this could result in an interference loop, whereas staggering resend times increases the likelihood that the messages will be sent at different times and thus not interfere with one another. Should two or more messages collide, the resend protocol methods described herein will likely result in all messages being received with only a very slight delay that would not cause any noticeable change in sound production.

The use of a single frequency for the sending of all messages from the various instruments of a drum set both: a) lessens the chance of outside interference, and b) simplifies the system as a whole, in that multiple frequencies for each of various instruments 10 do not have to be used. In some embodiments, all electronics of an instrument group such as a drum set utilize the same frequency. In some other embodiments, two or more pluralities of instruments 10 in an instrument group each use their own frequency. Many different embodiments are possible.

In one embodiment, all messages sent to the hub 20 by the various instruments 10 of a drum set use a first frequency (or a first plurality of frequencies), while all acknowledgment messages sent by the hub 20 use a second (different) frequency (or a second plurality of frequencies each different than each of the first plurality of frequencies). This prevents the collision of data/instrument signals (from the instrument electronics) and acknowledgment signals (from the hub). Generally speaking, this results in lower message failure than embodiments where the data signals and acknowledgment signals use the same frequency; however, it is understood that embodiments with the data and acknowledgment signals on the same frequency are possible.

In one embodiment of the present disclosure, a hub 20 and instrument(s) 10 utilizes a plurality of channels, with a "channel" being defined herein as a pair of frequencies where one direction of transmission (e.g., instrument-to-hub, such as an instrument signal) occurs on the first frequency while the other direction of transmission (e.g., hub-to-instrument, such as an ack signal) occurs on the second frequency. In one embodiment utilizing a channel method, any number of channels may be used. A greater number of channels can provide greater versatility for finding open frequencies and avoiding interference, while a lesser number of channels can provide for simplicity and power savings, since during some channel scanning actions fewer channels will need to be scanned. Some embodiments utilize two to ten channels, three to six channels, or four channels, though it is understood that these are exemplary in nature and any number of channels is possible. In some embodiments, all channel frequencies are within a certain range of one another, such as all channel frequencies being within 250 MHz of each other, or within 100 MHz of each other. By way of example only, in a four channel system, Channel 1 could transmit at 2402 MHz & 2423 MHz, Channel 2 could transmit at 2426 MHz and 2448 MHz, Channel 3 could transmit at 2451 MHz and 2476 MHz, and Channel 4 could transmit at 2480 MHz and 2472 MHz. Any of these channel frequencies may be adjusted, such as being adjusted by ±10 MHz, ±5 MHz, ±3 MHz, ±1 MHz (e.g., the first frequency of Channel 1 could be between 2392 MHz and 2412 MHz, etc.). This channel spacing selection can reduce or minimize the amount of interference with traditional WiFi channels 1 (2412 MHz), 6 (2437 MHz), and 11 (2462 MHz). It is understood that fewer than all of these channels could be used, or that additional channels could also be used.

Hub Messages to Instruments

While in certain embodiments of the disclosure a hub 20 may initiate communication with one or more musical instruments 10 to which it is connected, in some other embodiments the hub 20 does not initiate communication with any electronic musical instruments 10 to which it is connected. Because of this, a hub 20 may need to inform the instrument electronic 200 that the hub 20 has a message that needs to be sent. The hub 20 can indicate to the instrument 10 that it has a pending message via a portion of its acknowledgment message, such as in the ack message's header. Receipt of such a message can serve as an instruction to the instrument(s) 10 to transition from standby mode to run mode (discussed below), thus enabling receipt of the full hub message, or otherwise to configure themselves to receive a hub message (e.g., by powering antenna(s)).

In some embodiments, changes to settings (e.g. configurable settings) can be communicated to the hub 20 from the instrument 10, or vice versa, while in run mode. For instance, the hub 20 may receive instructions from a computer to which it is connected to adjust a configurable setting for a certain instrument, and transmit these instructions to the instrument, such as in the manner described above with regard to the hub sending a "pending message(s)" indicator as part of an ack message. In another embodiment, firmware updates or replacements can be transmitted in this manner.

Electronic Conversion Unit

Figure 2A:
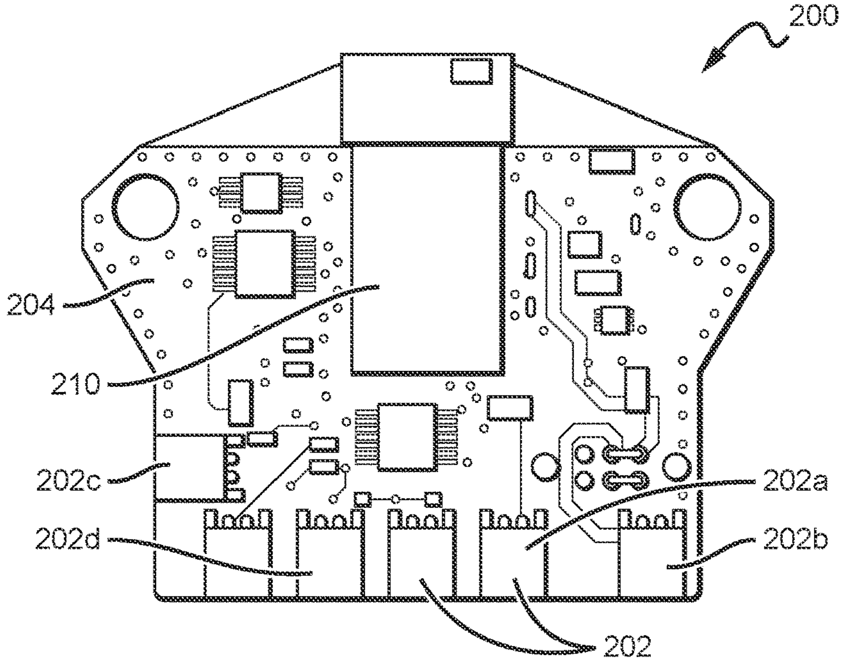
FIG. 2A is a perspective view of an electronic according to one embodiment of the present disclosure.

FIG. 2 shows one embodiment of an electronic 200 according to certain examples of the present disclosure. It is understood that electronics other than that shown in FIG. 2 and specifically described below are possible.

One embodiment of the electronic 200 according to the present disclosure is contained on two or more circuit boards (e.g. PCBs), which may or may not be connected, such as via soldering, microstrip, or other means known in the art. A first board 204 (which may be referred to herein as the "primary board") can include all of the connectors, power supply, and analog circuitry, and a second board 210 (which may be referred to herein as the "module board" or "module") can include one or more microprocessors and radio circuitry. Inter-board connections between the two or more boards may be used to connect them.

Terminals 202 of the electronic 200 may be configured to receive signals from different sensors. For example, the terminal 202*a* may be wired to accept sensor impulses from a drumhead sensor caused by a strike on a drumhead, while the terminal 202*b* may be wired to accept impulses from a sensor configured to detect drumhead vibration. In some other embodiments, the different terminals may be designed for different instruments 10. For instance, while the terminals 202*a*,202*b* may be designed for a snare drum, the terminal 202*c*,202*d* may be configured for connection to a hi-hat or cymbal assembly. In this way, the same electronic 200 can be used for many different percussion instruments, and in some embodiments the same type of electronic can be used for all of the percussion instruments in a drum set. Differentiations for types of instruments 10 (e.g., designating one electronic as being associated with a snare drum and another electronic as being associated with a bass drum) can be accomplished via firmware. In some embodiments, each terminal can be capable of use with all types of instruments 10, with the differences based on type of instrument implemented via firmware. While the terminals 202 are shown on the primary board 204 in this embodiment, other embodiments are possible.

The module 210 of the electronic 200 can include any combination, with or without additional components, of:

- a transceiver (such as a 2.4 GHz or 5 GHz FSK transceiver);
- a core processor with memory (e.g. flash memory) and RAM (e.g. SRAM) (in one specific embodiment, 512 kb of flash memory and 128 kb of SRAM, though it is understood that this is purely exemplary in nature);
- an analog-to-digital converter, which can be used to measure sensor inputs;
- an analog comparator, which can be used for sensing wake-up actuations;
- a timer, which can be used for determining mode transitions (e.g. after a predetermined dormancy time, transitioning to sleep mode; after a predetermined time, transitioning from sleep mode to standby mode to send a connection request; etc.);
- a signal booster;
- a shield to protect from interference;
- one or more serial peripheral interface (SPI) modules, which can be used for communication with the digital potentiometers;
- touch sensing input, which can be used for capacitive sensing; and/or a unique identifier for identification of each electronic (and thus its associated instrument), with one example being an 80-bit unique identification number for each chip.

Other elements may also be included as would be understood by one of skill in the art. It should be understood that fewer elements than those listed above are possible. Moreover, the elements of the electronic 200 could be arranged differently, such as all on a single board, in a different arrangement on two boards, or on three or more boards. It should also be understood that while embodiments of the present disclosure often refer to the electronic 200, other types of electronics could be used as would be understood by one of skill in the art in light of the present disclosure.

Electronics according to the present disclosure can utilize some or all of their sensor inputs to determine how to interpret received sensor impulses, such as by using the firmware embedded in the electronic's processor. This determination can also be made by using a mode setting of the electronic, which can correspond to the type of instrument being played (e.g., snare, tom tom, bass drum, cymbal, hi-hat, or other instrument, many of which will be described below in detail). The electronic can determine the magnitude of impulse received from each sensor for each actuation, and use this data-in some embodiments combined with other data such as the mode setting-to determine the instrument signal that should be sent.

Connection Diversity

Instruments, electronic portions, and electronics according to the present disclosure can utilize connection diversity to improve quality and robustness of wireless connections. By way of example, each of a hub 20 and one or more instruments 10 (e.g., the electronic portions and/or electronics of the instruments, such as the electronic 200 discussed above) can include multiple antennas, and be capable of switching which antenna is receiving and/or transmitting. The other of the antennas can be dormant and/or powered down while the transmitting/receiving antennas are sending and receiving signals. The multiple antennas can include the same or different types of antennas. In one specific embodiment, each of the hub and one or more instruments includes at least one wire antenna and at least one chip antenna, which can be beneficial in that either of these antenna types may perform better depending on the communication environment. By way of example, an electronic 200 can be configured to recognize that it is performing poorly and/or has hit a low performance threshold, such as if it does not receive a certain threshold number or percentage of acknowledgment signals in response to transmitted signals. Examples of low performance thresholds can be, for example, a 0.1% failure rate, a 0.5% failure rate, a 1% failure rate, a 2% failure rate, a 3% failure rate, a 5% failure rate, a 10% failure rate, 1 missed acknowledgment, a plurality of missed acknowledgments 2 missed acknowledgments, 3 missed acknowledgments, 5 missed acknowledgments, or other failure rates as would be understood by one of skill in the art. Different instruments and/or hubs can all have the same low performance threshold, or can have different low performance thresholds. Moreover, different antennas within the same instrument and/or hub can all have the same low performance threshold or can have different low performance thresholds.

Once a low performance threshold is hit, an instrument 10 or hub 20 according to the present disclosure (e.g., through its respective electronic and/or electronics module) can be configured to change its operative antenna, such as from a chip antenna to a wire antenna or vice versa. The instrument 10 or hub 20 can also in some embodiments be configured to send a signal to its counterpart electronic (e.g., an instrument electronic sending a change signal to a hub electronic) to change which antenna is operative, such as through its own original antenna or the antenna to which the instrument/hub is changing. The change signal can be its own signal, or can be embedded within another signal. The change signal can be on a re-send protocol, such as resending until acknowledgment is received from the other electronic, and/or until a signal from the other electronic is sent that confirms the other instrument 10 or hub 20 has received the message and/or changed antennas.

The instrument(s) 10 or hub(s) 20 can stay on its second antenna indefinitely, for a set period of time, until another (or the same) low performance threshold is hit using the new antenna, until the performance of the new antenna becomes worse than the performance of the previous antenna, and/or until the low threshold of the old antenna is passed using the new antenna. In one specific embodiment, the instrument 10 changes antennas every time an acknowledgment is missed. Other embodiments are also possible. In some embodiments, instruments 10 can recognize that a low performance threshold has been hit (such as in the manner described above) and/or send change signals such as those described above while in run mode and/or while being played by a user.

Hubs according to the present disclosure can utilize different antennas for different instruments. By way of example, if a hub and all instruments connected to the hub are utilizing their respective first antennas (e.g. chip antennas), and less than all of the connected instruments reach low performance thresholds, those instrument's electronic 200 can send the change signal such that the hub 20 and the instruments change to their respective second antennas (e.g. wire antennas) with respect to signals between the hub and those specific instruments, while the hub and the other instruments continue to use their respective first antennas. In another embodiment, a change signal from one system component can order the change for all system components or multiple other system components. By way of example, in one embodiment, if a hub electronic reaches a low performance threshold with one instrument, it could send a change signal to all instruments. In a second embodiment, if a hub electronic reaches a low performance threshold with respect to less than all of the instruments, it could send a change signal to only those low performing instruments. In one embodiment of the present disclosure, the hub determines which of its antennas is working better for more of the instruments to which it is connected, and uses that antenna.

While the above is described with regard to two-antenna systems, it is understood that the same concepts could also be applied to three-or-more-antenna systems.

It should be understood that the above Wireless Connection devices, systems, and methods can be applied to any of the devices, systems, and methods described throughout this disclosure, and to other known devices, systems, and methods.

Interchangeability

Instruments 10 (such as percussion instruments) according to the present disclosure can have interchangeable and/or removable parts such that they can be used as an electronic instrument or an acoustic instrument. For instance, the percussion instrument 10 can have a drumhead or a set of drumheads (or other striking surfaces) that is/are relatively quiet when struck, such as mesh, PET, polyester, or rubber drumheads (or other materials as known in the art, such as those traditionally used with electronic drums), for use when the drum is in electronic mode and/or when electronic components are in place; and a drumhead or set of traditional drumheads made of traditional acoustic materials, such as Mylar and plastics, or other materials known in the art, for use when the drum is in acoustic mode and/or when electronic components are not in place. It should be understood that the above materials listings are exemplary in nature and not limiting; for instance, in certain instances, a material described above as a typical electronic material may be used as an acoustic material, and vice versa, depending on user choice. These concepts can be applied to, for example, snare drums, tom toms, bass drums, congas, bongos, timbales, timpani/tympani/kettle drum(s), cymbals, hi-hats, and other instruments as would be understood by one of skill in the art.

It is understood that the electronics described herein could also be used with a traditional drumhead, such that the sound produced by actuation would be the combination of a traditional acoustic sound and an electronic sound. It is further understood that the electronics portion could remain in place and/or attached to the drum but be inactive, so that when a traditional drumhead is used, an acoustic sound is produced without any electronic sound. The electronics portion can be mechanically designed so as to, to the extent possible, avoid interfering with the acoustic sound when the electronics portion is "off." For instance, the electronics portion of a snare drum such as the snare drum 300 (discussed in detail below) can contact less than 20% of the inner wall area of a drum shell, less than 10% of the inner wall area of the drum shell, less than 5% of the inner wall area of the drum shell, less than 2.5% of the inner wall area of the drum shell, less than 1% of the inner wall area of the drum shell, or less. The contact with the inner wall area of the drum shell can, in some embodiments, be substantially symmetrical about the radius of the drum shell.

Drum Examples

Below are specific embodiments of drums incorporating elements and concepts of the present disclosure. It is understood, however, that the elements and concepts described with respect to each example are not specifically limited to that type of instrument. For instance, the electronics portion 500 described with regard to the snare drum 300 can be used in other instruments such as the bass drum 600; the dampening concept described with regard to the bass drum 600 can be used with other types of drums such as the snare drum 300; etc. Many different embodiments are possible as would be understood by one of skill in the art.

Example 1: Snare Drum

Figure 3:
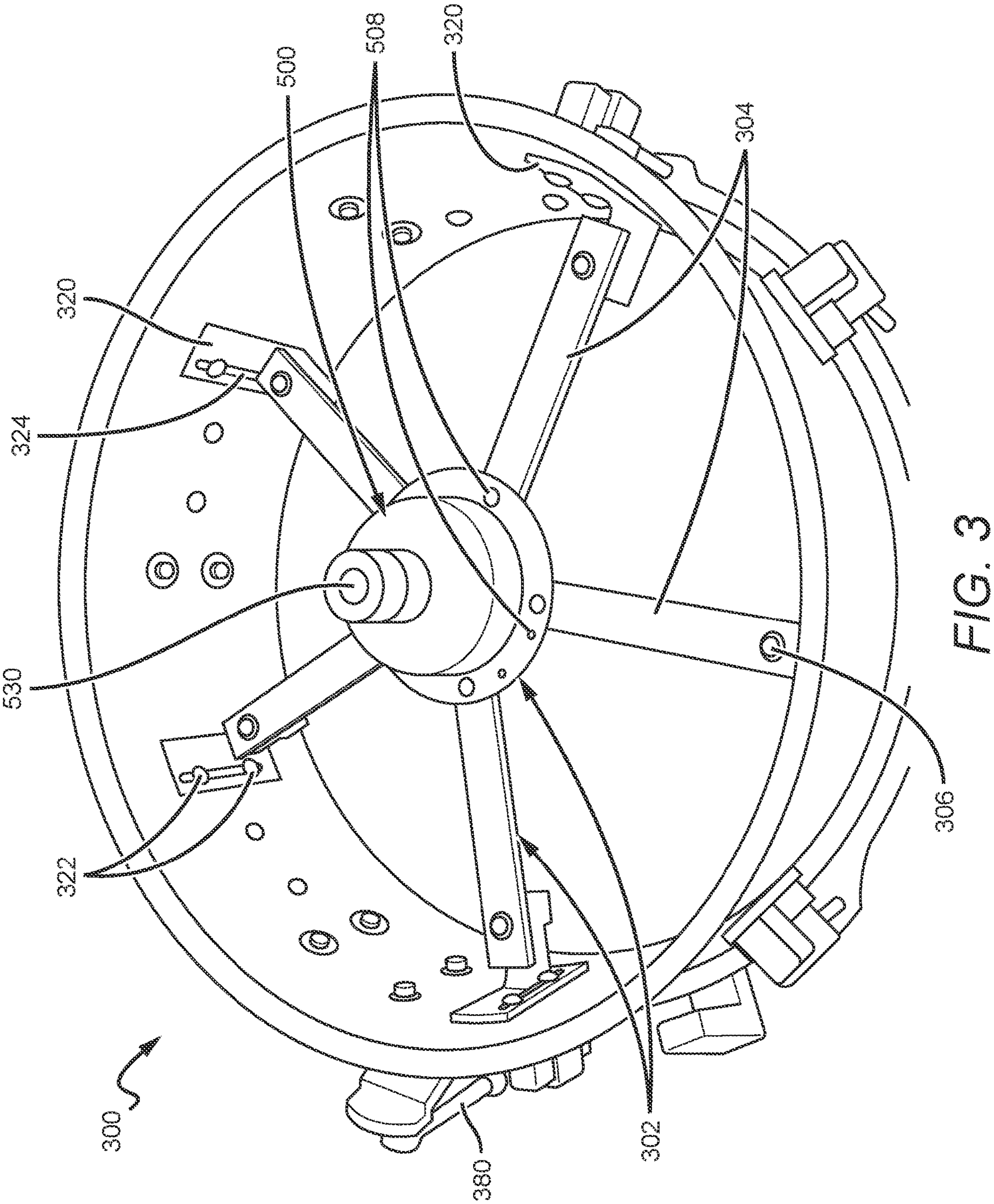
FIG. 3 is a top perspective view of a snare drum according to one embodiment of the present disclosure, with the top drumhead removed.

FIG. 3 shows a snare drum 300 (with the top drumhead removed for viewing purposes) that can incorporate the above-described wireless technology, electronics, and/or interchangeability concepts. The drum 300 includes a trigger platform 302. The trigger platform 302 can include a plurality of arms 304 or another type of support structure, and an electronics portion, electronics module, and/or trigger box 500 (shown by itself in FIGS. 5A-5F, and hereinafter referred to as an "electronics portion" for simplicity).

The electronics portion 500 can be below the top drumhead and/or approximately in the center of the drum 300, and/or be connected to the drum body by the arms 304 and/or other components, such as the brackets 320 (which will be discussed in further detail below). The electronics portion 500 can include multiple connection holes 508 (some of which are not in use in FIG. 3) so as to be able to accommodate various different shell and/or lug configurations. The trigger platform 302 and the components thereof, such as the arms 304 and the body of the electronics portion 500, can be made of the same material or a multitude of materials, such as but not limited to plastic, metal (e.g., aluminum), wood, and/or other materials as known in the art.

The drum 300 can include brackets 320. The brackets 320 can be attached to an inner wall of the drum 300. Each bracket 320 can connect to one of the arms 304 of the trigger platform 302, as shown, such as using drum screws 306 and/or other connectors. The brackets 320 can have an adjustable height with respect to the inner wall of the drum 300, which can make the drum 300 adaptable to different components. For instance, as shown in FIG. 3, when the screws 322 are loosened the brackets 320 can be moved up or down before the screws 322 are again placed through the height apertures 324.

In FIG. 3, a relatively quiet drumhead (e.g., a PET drumhead) could be placed on the drum 300 as shown, and the drum 300 would be in electronic mode. Alternatively, a user could remove the trigger platform 302 by unscrewing the connectors 306 and pulling the trigger platform 302 out from the inside of the drum, and then connecting an acoustic drumhead (e.g., a Mylar and/or plastic drum head) to the sidewall of the drum 300. The drum 300 can include all components of a traditional drum, such as drum lugs, tensioning screws, etc., so as to be fully operational as a traditional drum when a traditional drumhead is installed. It is understood that an acoustic drumhead could also be used in conjunction with the electronic components and/or when the drum 300 is in electronic mode.

Figure 4B:
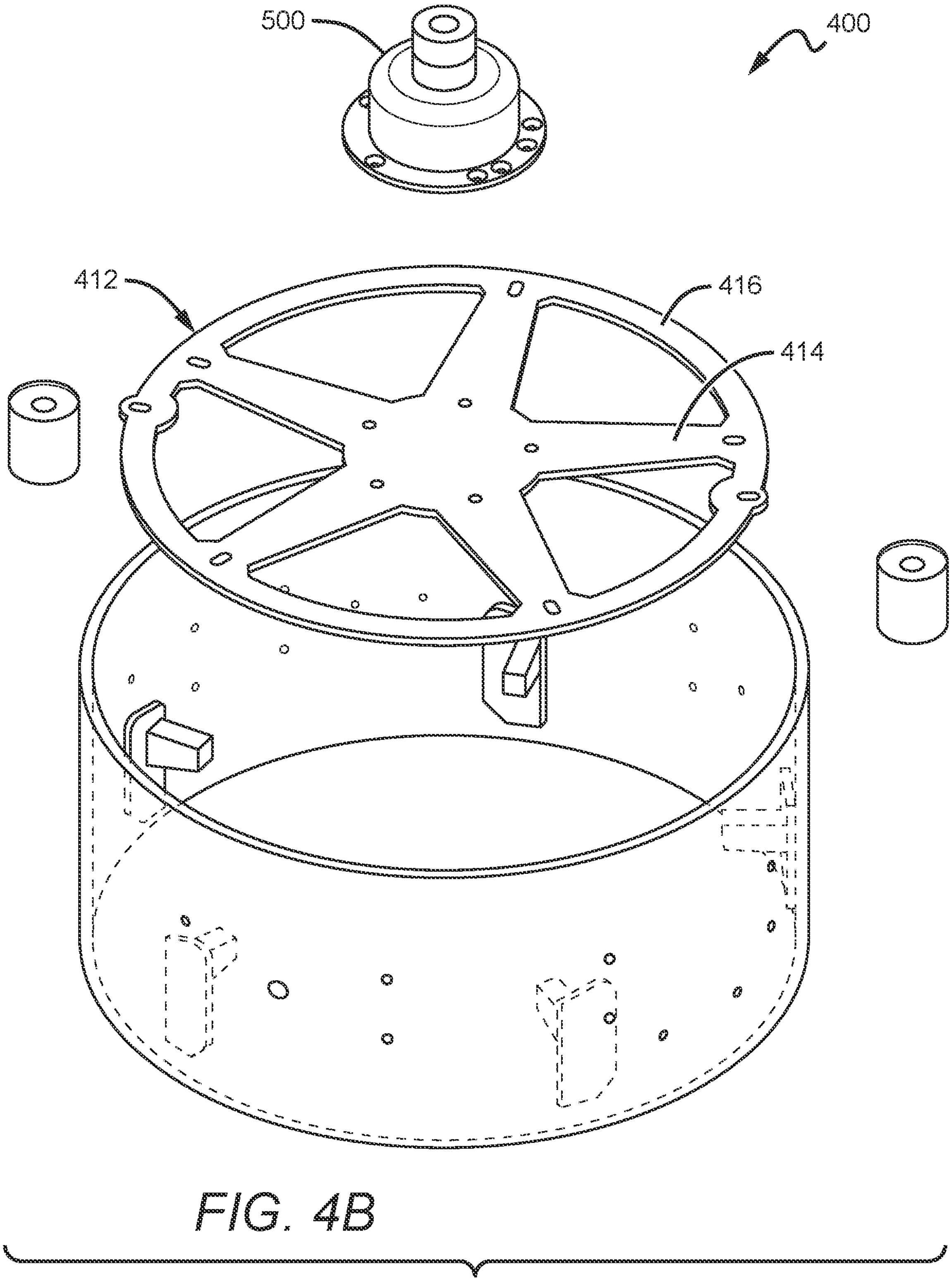

In some embodiments, instead of or in addition to arms 304, a support structure such as a circular support structure (e.g., a plate or disc) can be used (e.g., as part of a trigger tray), which can connect to the inner drum shell wall and/or to other components such as the brackets 320. For instance, FIGS. 4A and 4B (with equivalent reference numerals used for substantially equivalent or equivalent structures) show a drum 400 including a support structure 412 which can be circular and can operate similarly to the arms 304 from the drum 300. The support structure 412 can include arms 414 and an outer ring 416, which can enhance stability as well as ease of installation and removal. Instead of individual arms 304 connecting to the brackets 320, the single support structure 412/outer ring 416 connects to multiple brackets 320. Other support structure designs are possible, including but not limited to solid circular support structures.

It is understood that while the above interchangeability concepts have been described with regard to the snare drums 300,400, they could be applied to other instruments, such as but not limited to tom toms and bass drums (such as the bass drum 600 shown in FIGS. 6A-6C and described below).

Electronics Portion

FIGS. 5A-5F show various views of the electronics portion 500. The electronics portion 500 be used for receiving signals from one or more sensors, and relaying those signals to a hub. The electronics portion 500 can include an electronic similar to or the same as the electronic 200 (FIG. 2), and can be used to accomplish the blocks described above with regard to FIGS. 1A-2B and/or the Wireless Connection portion of the disclosure.

The wireless format of the present disclosure also has distinct advantages over prior art wireless devices, such as wireless microphones. The system, such as the system 300, can be powered by a local and/or self-contained source (though it is understood that other embodiments are possible). For instance, the system can be powered by batteries 504, which can be removable/replaceable. In the embodiment shown, the batteries 504 can be included in the electronics portion 500, such as within a main body or housing 502 of the electronics portion 500. The electronic 200 can be proximate and/or in the same location as the batteries 504, such as within the main body 502 of the electronics portion, to allow for simple powering of the electronic 200.

Instruments, electronics, and electronic portions (e.g., the electronics portion 500) according to the present disclosure can be configured to operate using the above-described instrument power modes, thus greatly reducing power usage. This is in contrast to prior art methods employed by, for example, typical wireless microphones, which send a continuous signal and thus require continuous power usage (instead of sending discrete signals such as in embodiments of the present disclosure). Moreover, continuous signals, such as those used by prior art wireless microphones, are more susceptible to interference.

In this and other embodiments of the present disclosure, it should be understood that power sources other than batteries 504 are possible, including but not limited to energy harvesting power sources, such as by using ambient background energy. Any type of power source can be used, including but not limited to photovoltaic, piezoelectric, solar, electrostatic, magnetic, thermoelectric, solar, pyroelectric, energy harvesting (e.g. using ambient background energy, kinetic energy, etc.) etc. This type of powering is made possible and/or enhanced at least in part by the relatively low power requirement due to the discrete power usage described above (as opposed to the continuous power usage of, e.g., a wireless microphone). Generally, a locally mounted power source such as batteries is beneficial in that it eliminates the need for a wired connection. However, wired power connections are also possible (even if the signals from actuation are sent wirelessly). Any type of power is possible.

The electronics portion(s) of instruments according to the present disclosure, including but not limited to the electronic portions 500, can receive updates electronically and wirelessly such that they never need to be connected via wire to another device. Additionally, it should be understood that instruments, electronics portion(s), and electronics according to the present disclosure, including but not limited to the electronic portions 500, can include connection and/or antenna diversity components and methods as described elsewhere in the present disclosure.

Trigger Sensor(s)

In the specific embodiment of FIG. 3 shown, a single first sensor (or "trigger") 530 is shown as part of a sensor arrangement 560, an example of which will be discussed later with respect to FIG. 5G. The first sensor 530 can be, for instance, a piezoelectric sensor, or another type of sensor as known in the art. The first sensor 530 can be used for sensing when and how the drum 300 (or other drum to which the sensor is connected) is struck, including sensing, for example, how hard the drum 300 is struck, and/or different zones and different methods of striking. The trigger can be in physical contact with and/or otherwise connected to the underside of the top drumhead. For instance, the top of the electronics portion 500 as shown could be or include the trigger 530 which could abut the bottom of the top drumhead, or the electronics portion could be connected, such as via one or more wires, to a trigger 530 that is attached to the bottom of the top drumhead. In one embodiment, the piezoelectric element can be beneath a foam element 594 (e.g. polyurethane and/or PORON foam), and may also be separated from a force sensitive ("FS") sensor 592 (to be discussed in more detail below) by an intervening element such as a foam element (e.g., polyurethane and/or PORON foam). The trigger 530 can primarily be used to sense when and how a user actuates the top drumhead using his or her drumsticks.

In some embodiments, multiple triggers (such as the trigger 530) can be used. For instance, in one embodiment, one central trigger 530 (which can be in the middle of the drum) can be surrounded by two, three, four, or more secondary triggers, which can be equidistant from the central trigger 530. The secondary triggers can be placed radially around the central trigger 530. In one embodiment, they are approximately halfway from the central trigger 530 to the drum shell; in another embodiment, they are approximately halfway or more from the central trigger 530 to the shell; in another embodiment, they are less than halfway from the central trigger 530 to the shell. Additionally, embodiments not including a central trigger 530 are possible. For instance, two (or three, four, or more) triggers centered about the drumhead could be used, such as radially located triggers. The triggers can be used both to detect the force of a strike, and/or to detect its position (e.g., via triangulation, or other methods known in the art). These secondary sensors/triggers can be connected to the electronics portion 500, such as via wire(s), wirelessly, or as otherwise would be understood by one of skill in the art. The secondary sensors/triggers can be piezoelectric sensors or other sensors as known in the art. The secondary sensor(s)/trigger(s) in one specific embodiment are mounted on the support structure 412, such as on the arms 414, though other arrangements are possible.

The addition of a second trigger in addition to the first trigger can help to prevent a "hotspot" where more volume is produced when the drumhead is struck near the single trigger, and can also assist in sensing where the drumhead is struck (i.e., in what "zone" the drumhead is struck). Similarly, a third trigger can prevent hotspots over a two-trigger embodiment, etc. Finally, sensor location arrangements can benefit from being symmetrical about the center of the drumhead, though it is understood that asymmetrical arrangements are also possible. Some specifically contemplated embodiments include 1) a central trigger with two other triggers on diametrically opposing sides of the central trigger; 2) a central trigger with three other triggers substantially forming a triangle about the central trigger; 3) a triangular formation of secondary triggers (with or without a central trigger); and 4) a square or diamond-shaped formation of secondary triggers (with or without a central trigger). Many different embodiments are possible.

The central trigger 530 and additional sensors can be connected in parallel with one another, as opposed to acting independently. In other embodiments, the central trigger 530 is independent while two or more side sensors are connected with each other in parallel. A mean/average of sensing values can be used with the parallel connected sensors, which can also aid in hotspot reduction. In other embodiments, the triggers are not connected in series or in parallel to one another, but instead act independently.

It is understood that numerous different types of triggers and/or trigger materials can be used. For instance, some alternative trigger materials that can be used in embodiments of the present disclosure include force sensitive ("FS") sensors, such as force sensitive resistor ("FSR") sensors, smart fabrics, and other materials.

Vibration Sensor (s)

The electronics portion 500 can include one or more additional sensors beyond the first sensor 530 and one or more secondary drumhead triggers. For instance, a second sensor (or group of sensors) can be included as part of the electronics portion 500, such as a sensor included within the main body or housing 502 of the electronics portion 500, and/or at the base of the main body or housing 502. The second sensor can be used for a multitude or purposes. In the embodiment shown, the first sensor 530 is used to detect a strike on the head of the drum, while the second sensor detects vibrations of the drum shell. The second sensor can be mechanically linked to the drum shell for this purpose, such as via components of the trigger tray (e.g., the arms 304, support structure 412). In this embodiment and other embodiments, the second sensor can be used to detect, for example, rim shots and/or cross-sticks, where a user causes vibration of the rim. It is understood that other sensor locations for sensing vibration and/or rim strikes are possible. The vibration sensor(s) can be a piezoelectric sensor or other type of sensor as known in the art. In one embodiment, the vibration sensor(s) is included within and/or as part of the electronics portion 500, though many different embodiments and locations are possible.

Pressure Sensor (s)

Sensing can also be used to recognize the presence of pressure on the top drumhead, such as the presence of a user's hand on the top drumhead. For instance, a force sensing sensor (referred to herein as an "FS sensor") (e.g., a force-sensing resistor ("FSR") sensor) can be utilized for this purpose. One or more FS sensors can be placed on the top drum head, such as on the bottom of the top drum head, and can be used to sense when a user applies pressure to the top surface of the drum head. Upon user actuation, the electronics (such as the electronic 200, described above) can recognize a signal sent by the FS sensor, indicating whether (and in some instances, how much) pressure has been applied to the top drum head (such as by a user's hand). The electronic (e.g., the electronic 200) can then adjust the signal produced based on the inputs from the FS sensor so as to produce a different sound than if no pressure were sensed. While these embodiments are described herein with regard to FS sensors, it is understood that other types of sensors that measure force, displacement, and/or pressure could be used.

Figure 5B:
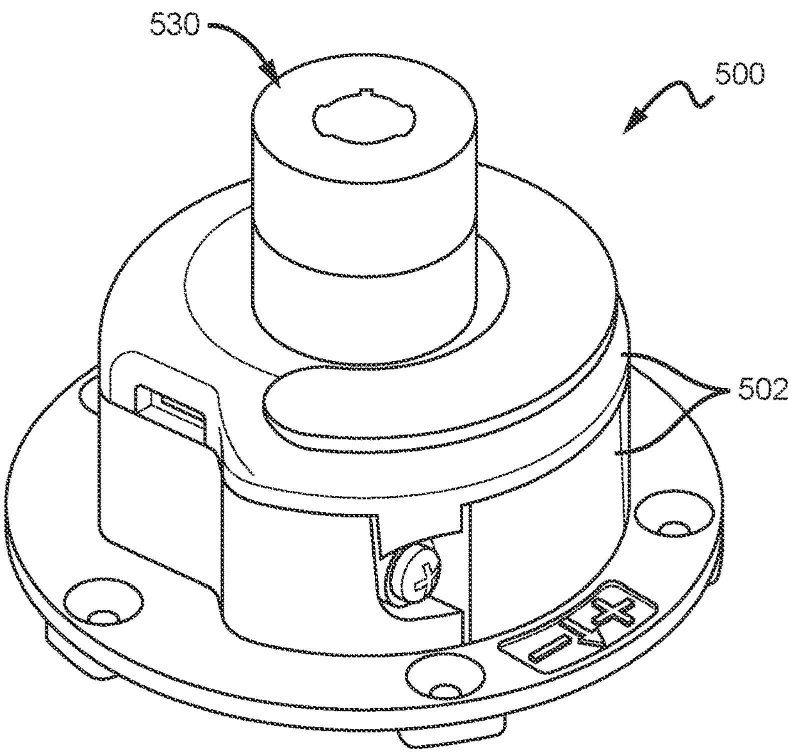
Figure 5C:
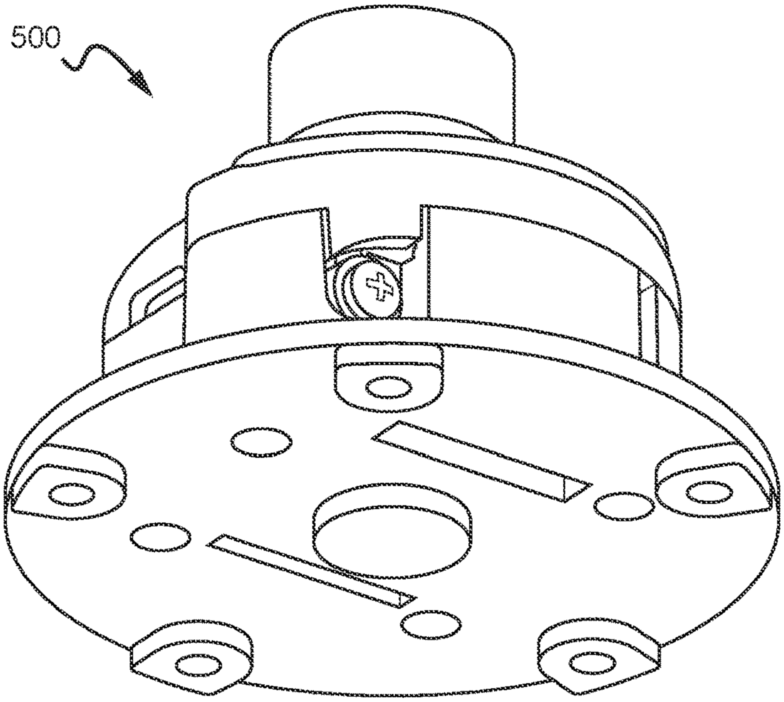
Figure 5D:
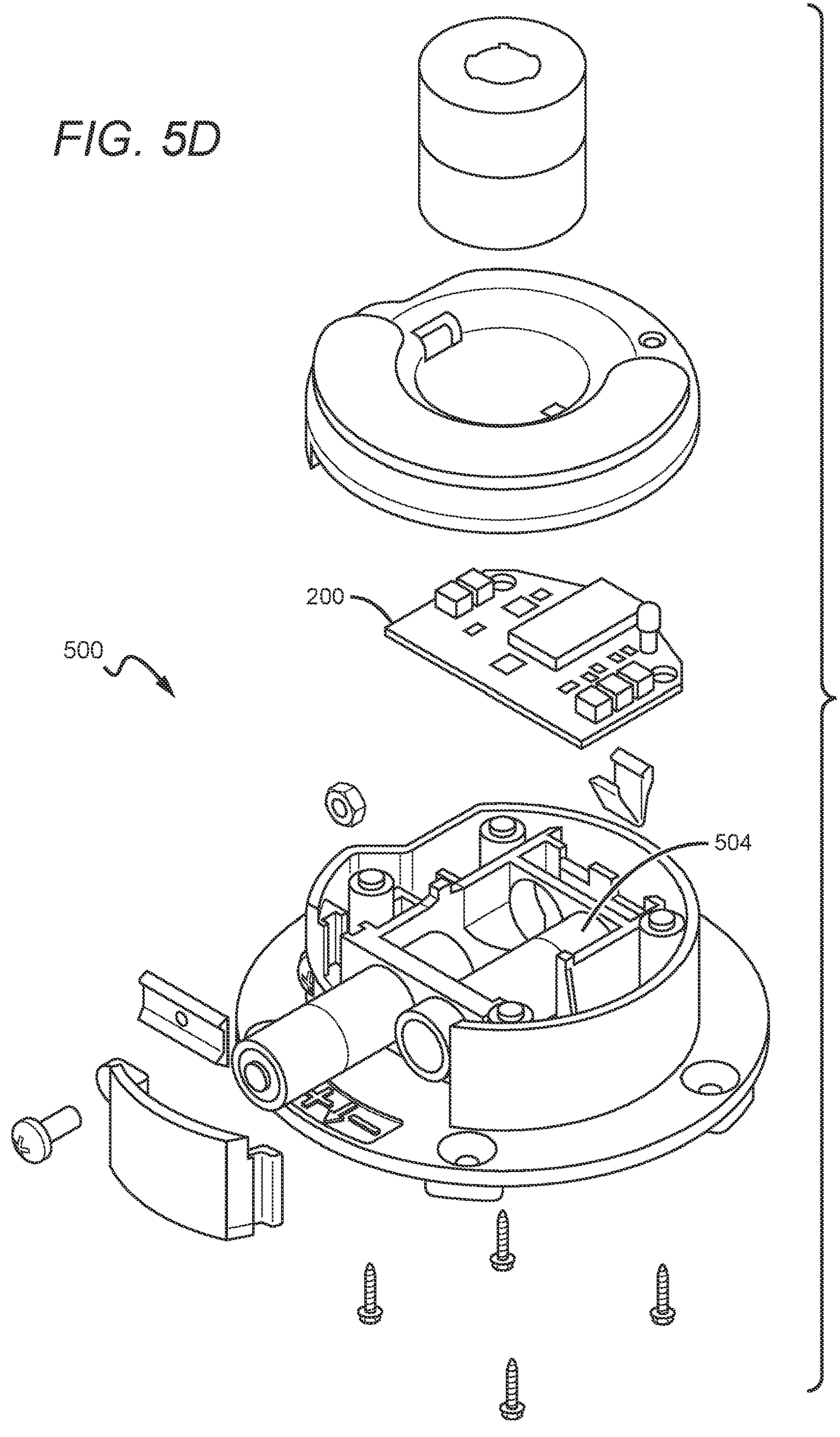
Figure 5E:
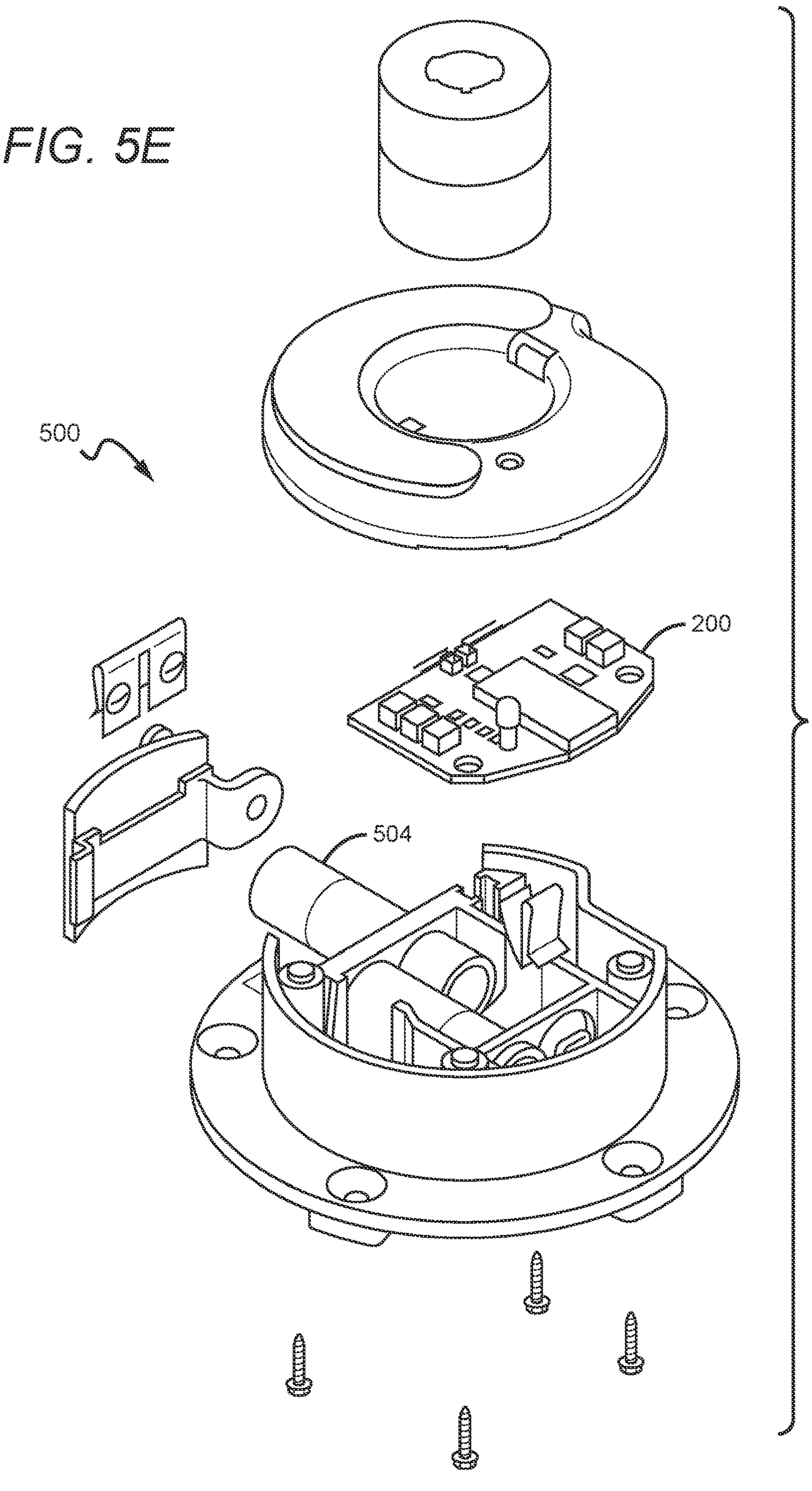
Figure 5F:
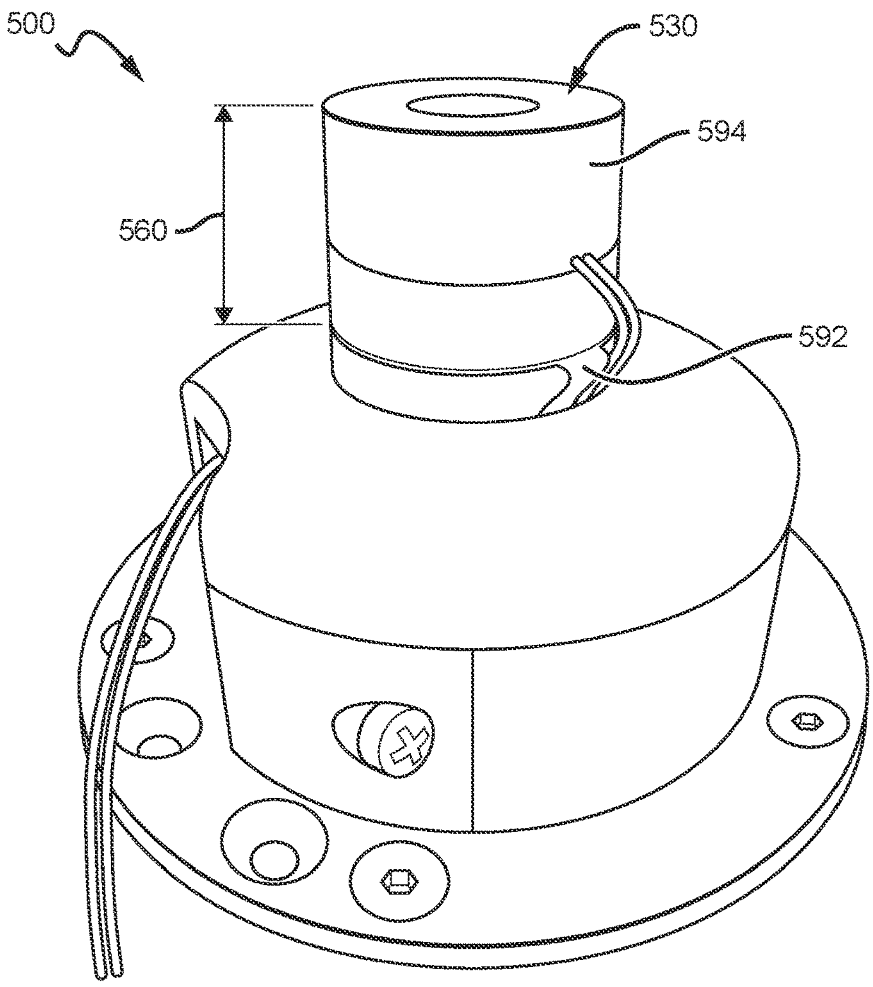
Figure 5G:
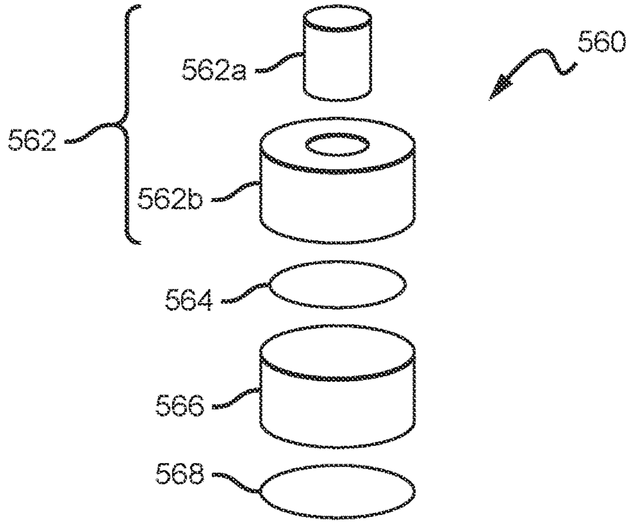
FIG. 5G is an exploded view of a sensor arrangement according to one embodiment of the present disclosure.

FIG. 5F shows one example of an electronics portion 500 that uses FS technology. The electronics portion 500 can include an FS sensor 592 that is included as part of, within, below, near, and/or otherwise proximate to the trigger 530, though it is understood that other embodiments with the FS sensor 592 not proximate the trigger 530 are possible, such as when an FS sensor is placed directly on the bottom of the drumhead. In the specific embodiment shown, the FS sensor 592 is an FSR sensor, and it understood that in all instances in the present disclosure where the phrase "FS sensor" is used, such sensor could be an FSR sensor.

In the specific embodiment shown, the FS sensor 592 is below one or more foam components 594 of the electronics portion 500, such as between pieces of foam or on the base of the top of the lid of the electronics portion 500 and/or beneath the foam components, though many different locations are possible. When a user places his or her hand on the top drumhead, the top of the electronics portion 500 is pressed downward, thus activating the FS sensor 592. The pressure of the user's hand (or other similarly applied pressure) is typically more than the pressure of, for instance, a strike upon the drumhead using a drum stick. Thus, the sensing of the FS sensor can determine whether or not a user's hand is on the drumhead and send a message and/or impulse accordingly, and the electronic components can utilize this input to adjust the produced sound accordingly. For instance, in one embodiment, the FS sensor can be used to differentiate between when a user plays a cross stick (a drumming technique whereby a user applies pressure to the drumhead while also striking the rim of the drum with a drumstick) versus when a user plays a rimshot (a drumming technique whereby the user strikes both the head and rim with the drumstick). The differentiation in the signal can be used by the electronic components, such as the electronic 200, in order to determine the type of sound that should be produced (e.g., a cross stick sound versus a rimshot sound). It should be understood that many other different usages and locations of FS sensors according to the present disclosure are possible, and that pressure sensors other than FS/FSR sensors can be used.

Exemplary Sensor Arrangement

As discussed above, the electronics portion can include the sensor arrangement 560. An exploded view of an example sensor arrangement 560 is shown in FIG. 5G. The sensor arrangement 560 includes, for example, a first and/or top separator 562, the sensing element 564 (e.g., piezoelectric element) of the sensor 530 discussed above, a second separator 566 below the first separator 562 and sensing element 564, and the sensing element 568 (e.g., the force sensing element) of the sensor 592. It should be understood that additional elements are possible, and that elements can be omitted.

The separator elements can be made of materials known in the art for transferring force (e.g. from a drum strike or pressure) while minimizing damage to sensitive elements such as the sensing elements 564,568. For instance, one or both of the separators 562,566 can be foam, such as PORON foam and/or polyurethane foam. The separators can be multi-part separators, such as the separator 562 which includes an internal portion 562*a* and an external portion 562*b*, which can be the same or different materials. For instance, in one embodiment the internal portion 562*a* is PORON foam while the external portion 562*b* is polyurethane foam. The sensing element 564 can be piezoelectric, such as a 10-40 mm piezoelectric element, though it is understood that different sizes could be used. The sensing element 568 can be a force sensing element such as an FSR. One exemplary FSR is a TPE-510B FSR available from Tangio, though it is understood that different force sensing elements could be used as would be understood by one of skill in the art.

The sensor arrangement 560 or a modified version thereof can also be used for the previously described secondary trigger(s) placed between the central trigger 530 and the drum shell. For instance, one embodiment of a secondary trigger according to the present disclosure is the same as the sensor arrangement 560, but for the omission of the sensing element 564.

Electronic Throw-Off and Snare Tension Adjustment

Prior art acoustic snare drums often include a "throw-off," such as the throw-off 380 shown in FIG. 3. Some prior art throw-offs are described, for example, in U.S. Pat. No. 5,616,875 to Lombardi and U.S. Pat. No. 7,902,444 to Good et al., each of which is fully incorporated by reference herein in its entirety. Generally, a snare drum includes a series of stiff wires (i.e., a "snare" with "snare wires") that are held against the bottom drumhead. These wires produce the characteristic "snare" sound when the drum is struck. The snare is held against the bottom drum head by tension when the throw-off (e.g., the throw-off lever) is in a first position (typically an upward position), and can be removed from the bottom head by placing the throw-off in a second position (typically a downward position). Thus, when the throw-off is in the second position, the snare drum produces a different sound than when the throw-off is in the first position.

In some embodiments of snare drums according to the present disclosure, a sensor can be included so as to sense the position of the throw-off 380. In one specific embodiment, a sensor informs the electronics (e.g., the electronics portion 500 and/or electronic 200) of the position that the throw-off is physically in (e.g., using an electronic switch), and the electronics thus adjust the produced signal based on that position. For instance, if the throw-off is sensed to be in the "upward" position such that the snare of an acoustic drum would be held against the bottom head, the signal(s) produced upon actuation of the drum will produce a sound customary of a snare drum; whereas if the throw-off is sensed to be in a "downward" position, the signal(s) produced upon actuation will produce a sound that is more typical of a tom). The sensor can be, for instance, a switch, a potentiometer, a proximity sensor, or any other variable or switched sensor that is capable of determining physical position.

Additionally, when the snare is in contact with the bottom head, the amount of contact can be fine-tuned using a tension adjuster such as a lever or joystick, so as to fine tune the sound produced by the snare drum. Some such devices and methods are described in U.S. Pat. No. 8,143,507 to Good et al., which is fully incorporated by reference herein in its entirety. Movement of the lever or joystick may also result in the removal of the snare from the bottom head, resulting in the same sound as if the throw-off had been put into the "off" position. As with the throw-off, one or more of the previously-described sensors can be used in conjunction with the tension adjuster to sense its position, and adjust the signal produced upon actuation so as to reflect the position of the tension adjuster.

While the above describes switched embodiments, it is understood that continuous controller embodiments (which sense actual position, as opposed to being "on" or "off") are also possible and contemplated in embodiments of the present disclosure. Such sensors can be used to determine, for instance, how tightly a snare is being held against the bottom drumhead, which can cause differentiation in the sounds to be produced.

Sensor Interpretation and Instrument Signal Determination

As previously described, in embodiments of the present disclosure, electronics according to the present disclosure can determine the magnitude of impulse received from each sensor for each actuation, and use this data-in some embodiments combined with other data such as the mode setting-to determine the instrument signal that should be sent for each actuation. For instance, in the case of the snare drum, the instrument's electronic can determine if the head sensors (e.g. central sensor 530 and any secondary sensor(s)) are dominant, and if so, send a signal corresponding to a head strike. If the impulse from the vibration sensor is dominant, the electronic can send a signal corresponding to a rim strike (where a drummer has hit the rim). If impulses from the head sensor(s) and vibration sensor(s) are both of sufficient magnitude, the electronic can send a signal corresponding to a rimshot (where the drummer has hit both the head and the rim). If impulses from the pressure sensor 592 are of sufficient magnitude (e.g. because a user has applied enough pressure and/or caused enough displacement of the drumhead), the electronic can send a signal corresponding to a cross stick. The above signals can also be shifted based on a signal from the throw-off sensor, which can indicate the position of the throw-off and thus whether a snare sound should be added. Thus, in embodiments utilizing a switch for the throw-off sensor, either a first set of signals or a second set of signals would be used based on whether the throw-off was in an engaged or a disengaged position.

These same interpretation methods can also be utilized with the instruments described below, with their respective sensors, whether those sensor arrangements include the same sensors, fewer sensors, more sensors, or different sensors By way of example, the tom tom sensor interpretation may be equivalent to the snare sensor interpretation but for lacking the throw-off sensor portion; the bass drum interpretation may be equivalent to the snare sensor interpretation but for lacking the throw-off sensor portion and side sensor(s) portion; the cymbal sensor interpretation may rely on sensor impulses from bell, bow, and edge sensors; and the hi-hat sensor interpretation may be equivalent to the cymbal sensor interpretation, but also use a sensor impulse based upon distance between the upper and lower cymbals.

Example 2: Tom Tom

Tom tom drums are mechanically very similar in nature to snare drums, though they do not include a snare or accompanying components (e.g., throw-off and snare adjustment lever). Thus, a tom tom drum according to the present disclosure could include any of the trigger sensors, vibration sensors, and/or pressure sensors described above with regard to the snare drum. The concepts and components described above with regard to a snare drum could be applied to a tom tom drum (or similar) as would be understood by one of skill in the art.

Example 3: Bass Drum

Figure 6A:
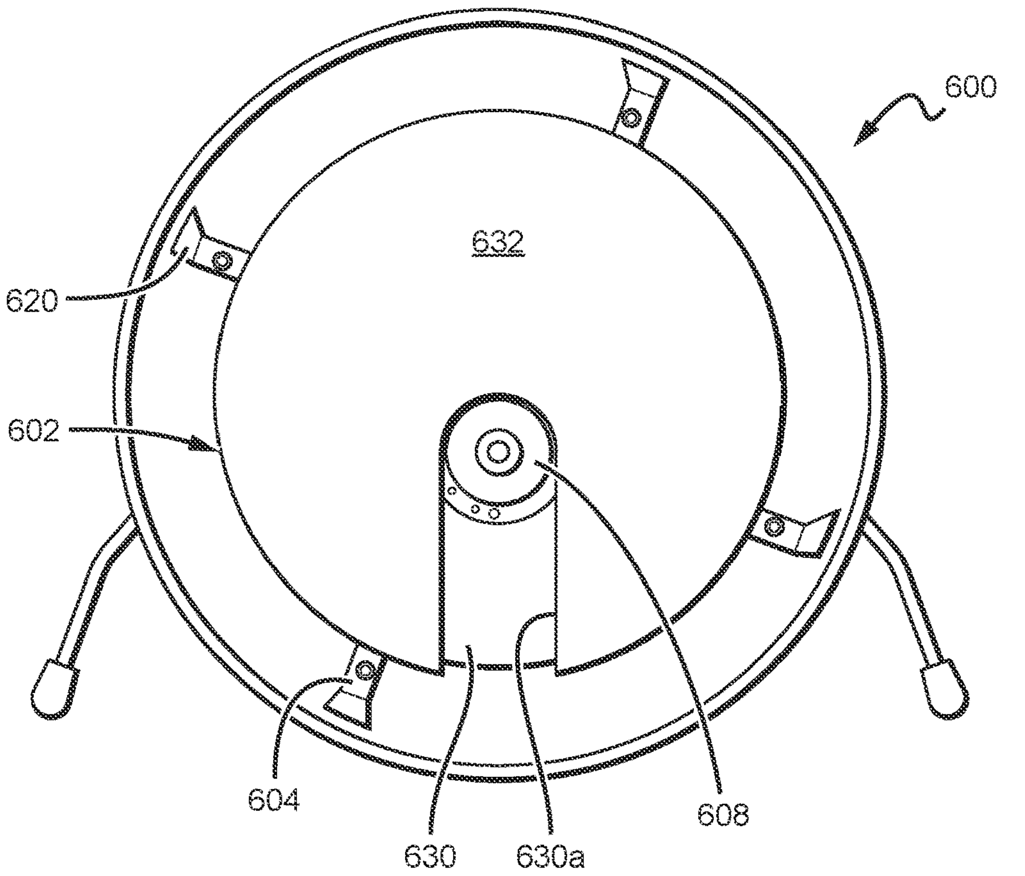
FIGS. 6A and 6B are rear perspective and bottom rear perspective views, respectively, of a bass drum according to one embodiment of the present disclosure, with the rear drumhead removed.
Figure 6B:
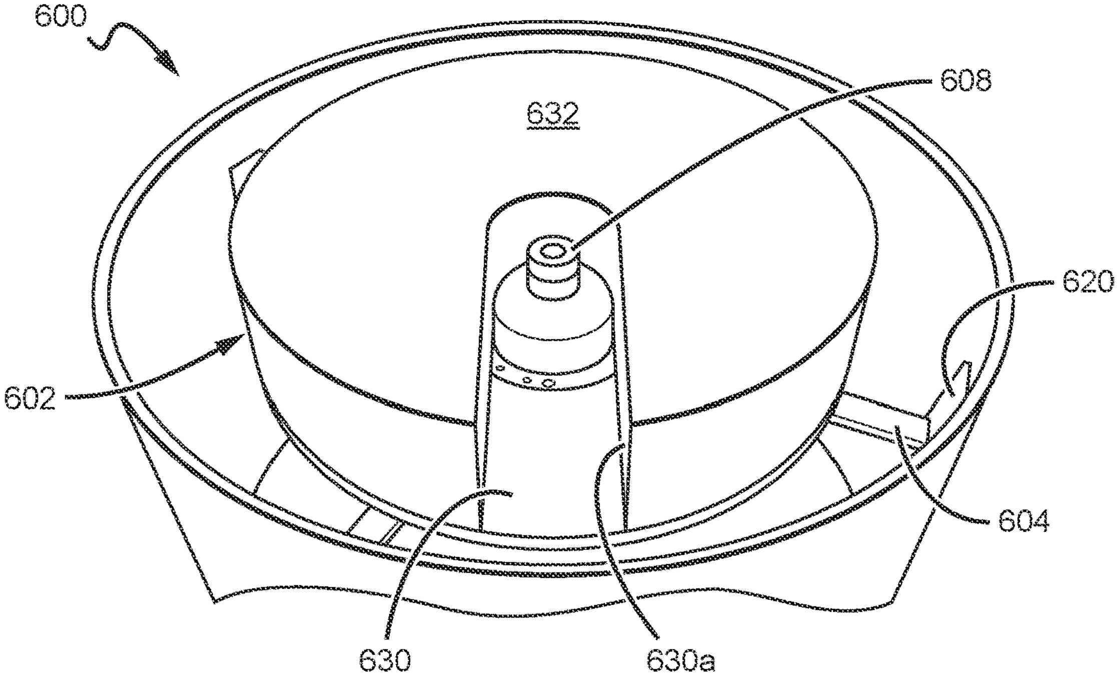
Figure 6C:
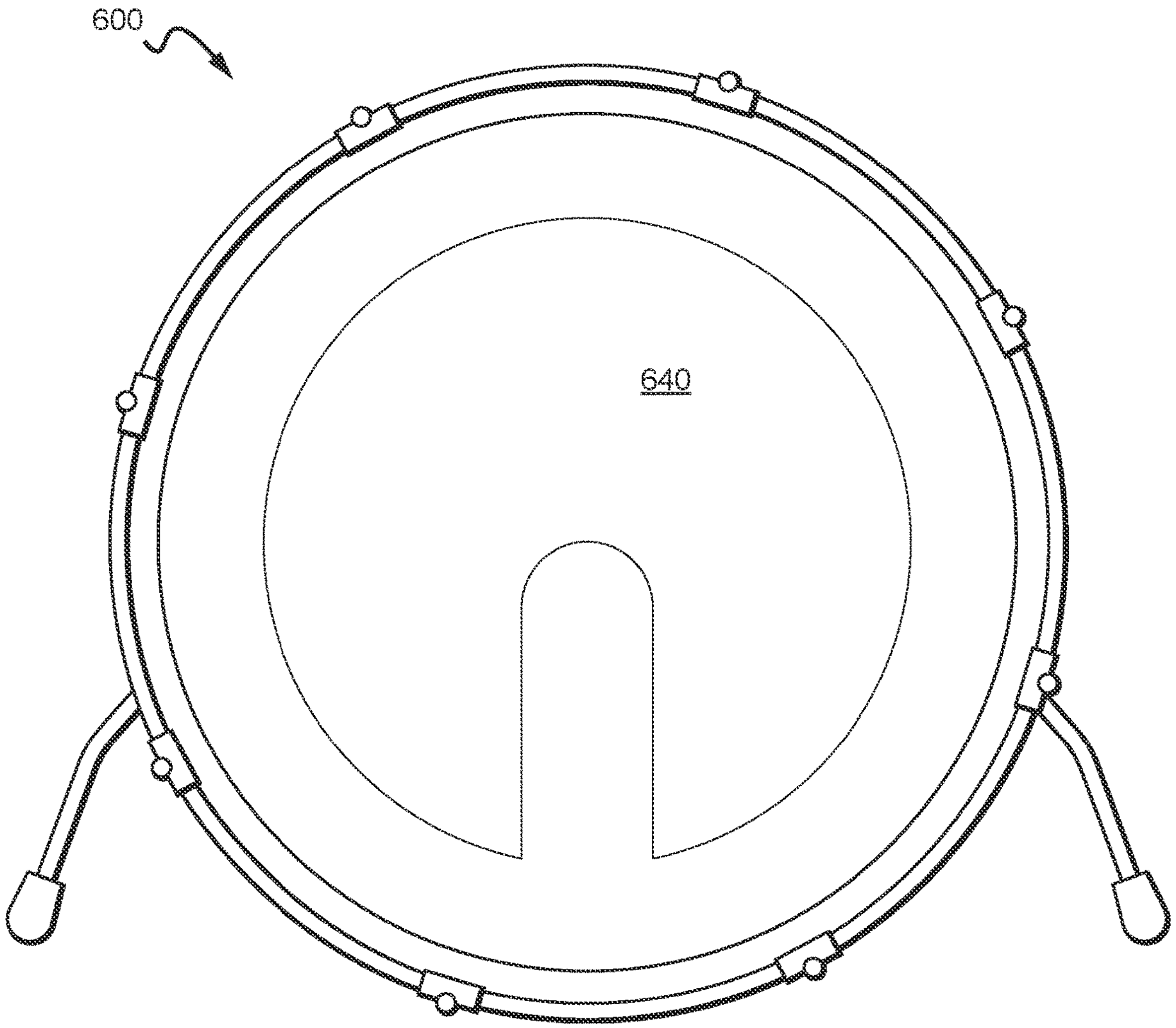
FIG. 6C is a rear perspective view of the bass drum shown in FIGS. 6A and 6B, with the rear drumhead.

FIGS. 6A-6C show a drum 600 according to one embodiment of the present disclosure, in this specific case, a bass drum. The drum 600 can include many components similar to and/or the same as the drum 300 from FIG. 3.

The drum 600 can include a trigger platform 602, which can include arms 604 and an electronics portion 608. The electronics portion 608 may be in the center, or may be off-center as shown, such as being horizontally centered but below the vertical midpoint of the rear drumhead (not shown in FIGS. 2 and 3, element 640 in FIG. 4) so as to more closely match where a drum beater will typically strike the rear drumhead. Other locations are also possible. The electronics portion 608 can include and/or be connected one or more sensors as described with the electronics portion 500, and can be in contact with and/or connected to the inner side of the rear drumhead. In some embodiments, the electronics portion 608 is the same as or similar to the electronics portion 500, and/or includes the same sensors (e.g. one drumhead piezoelectric sensor, one vibration piezoelectric sensor, and one pressure sensor such as an FS sensor).

The drum 600 can also include brackets 620, and the arms 604 and brackets 620 can be similar to the arms 304 and brackets 320 and/or connected in a similar or the same way. The arms 604 (and the arms 304 from FIG. 3) can be pivotable with relation to the substrate 630 and/or electronics portion 608, and in some embodiments the arms 604 can have an adjustable length. One or both of these features can be used to adjust the position of the electronics portion 608 and/or substrate 630 with relation to the body and/or drum shell of the drum 600. Additionally, the trigger platform 602 can include a substrate 630 on which the electronics portion 608 is mounted. The substrate 630 can be, for instance, disc-shaped. In this case, the substrate 630 is a wood disc that is circular. The arms 604 can connect to the substrate 630, or in some embodiments (such as embodiments where a substrate is not used) can connect to the electronics portion 608. Similar to the support structure 412 from FIGS. 4A and 4B, in an alternative embodiment, a support structure with an outer ring (similar to the outer ring 416) can be used.

Figure 6D:
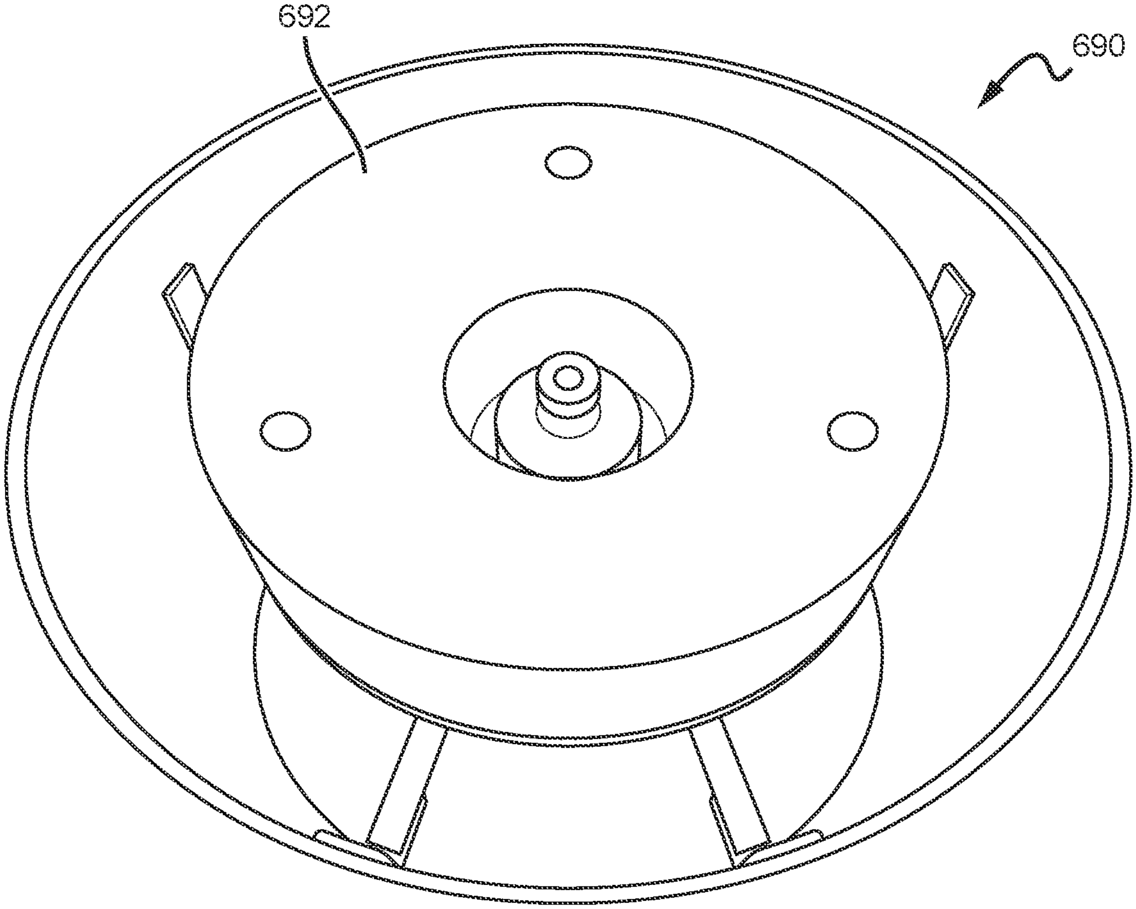
FIG. 6D is a bottom rear perspective view of another embodiment of a bass drum according to the present disclosure, with the rear drumhead removed.

The trigger platform 602 can also include a dampener 632 designed to abut the surface of the rear drumhead. The dampener can be between the substrate 630 and the rear drumhead in embodiments where the substrate 630 is present, such that the substrate 630 provides support for the dampener 632 (though some embodiments include a dampener but not a substrate), and the dampener 632 can directly abut the substrate and/or the rear drumhead in some embodiments. The dampener can be, for example, foam, rubber, and/or other materials known in the art, and can be one integral piece (as shown) or multiple pieces. The dampener can be attached in manners known in the art, such as being attached to the substrate 630 using posts, male/female attachments, fasteners, and/or adhesives; many different embodiments are possible. The dampener 632 can cover and/or be in contact with 5% or more of the rear drumhead's inner surface, 10% or more of the rear drumhead's inner surface, 25% or more of the rear drumhead's inner surface, 33% or more of the rear drumhead's inner surface, 50% or more of the rear drumhead's inner surface, 66% or more of the rear drumhead's inner surface, 75% or more of the rear drumhead's inner surface, 90% or more of the rear drumhead's inner surface, or more. The dampener 632 can have an area of 5% or more of the rear drumhead area, 10% or more of the rear drumhead area, 25% or more of the rear drumhead area, 33% or more of the rear drumhead area, 50% or more of the rear drumhead area, 66% or more of the rear drumhead area, 75% or more of the rear drumhead area, 90% or more of the rear drumhead area, or more. The dampener 632 can be approximately circular as is shown in FIGS. 6A-6C, and/or can have a radius that is 5% or more of the radius of the rear drumhead, 10% or more of the radius of the rear drumhead, 25% or more of the radius of the rear drumhead, 33% or more of the radius of the rear drumhead, 50% or more of the radius of the rear drumhead, 66% or more of the radius of the rear drumhead, 75% or more of the radius of the rear drumhead, 90% or more of the radius of the rear drumhead, or more. The dampener can in some embodiments include a cutout portion 630*a* as shown, though in some embodiments no cutout portion is included. For instance, FIG. 6D shows an embodiment of a drum 690 with a dampener 692 with no cutout portion.

The dampener 632 can help to lessen the acoustic sound produced by the drum 600, such as be lessening the vibration of the rear drumhead after it is struck by a beater. This can be true whether an electronic drumhead (e.g., made of a material previously described such as PET) or an acoustic drumhead is used.

The entire trigger platform 602, including but not limited to arms 604, electronics portion 608, substrate 630, and dampener 632 can be removed and an acoustic rear drumhead placed on the drum 600 to provide the user with a traditional drum that can include all of the traditional components (e.g., lugs and tensioning screws). Like the drum 300, an acoustic rear drumhead can also be used in conjunction with the trigger platform 602. It is understood that dampeners can be used in instruments other than bass drums, such as the snare drum 300, other types of drums and/or percussion instruments, or other types of instruments altogether.

One or more pressure sensors, such as FS sensors (e.g., FSR sensors), can be used as part of the drum 600. For instance, the electronics portion 608 can be similar to the electronics portion 500, and contain an FS sensor similar to or the same as the FS sensor 592. Whereas the FS sensor 592 used in conjunction with the snare drum 300 is most often used to sense whether a user is applying pressure to the top drumhead, an FS sensor used in conjunction with a bass drum such as the bass drum 600 can sense whether (and to what extent) a user is "burying" the bass drum pedal into the bass drum 600. Burying a bass drum pedal is a technique by which a drummer attempts to (or accomplishes) holding the beater head against the bass drum instead of allowing it to rebound, resulting in less resonance. The FS sensor can sense the extent to which a user buries the beater head, and adjust the electronically produced sound accordingly.

Additionally, some embodiments of the present disclosure can be drum heads that already include the components previously described. For instance, it is contemplated that an electronic drum head could include an electronic (e.g., the electronic 200) therein or on a bottom surface thereof, with or without a support structure, and the electronic drum head could be used with various instruments.

Cymbal Instrument Examples

Below are specific embodiments of percussion instruments incorporating elements and concepts of the present disclosure, those percussion instruments including one or more cymbals. It is understood, however, that the elements and concepts described with respect to each example are not specifically limited to that type of instrument. Many different embodiments are possible as would be understood by one of skill in the art.

Example 4: Cymbal Assembly

Figure 7A:
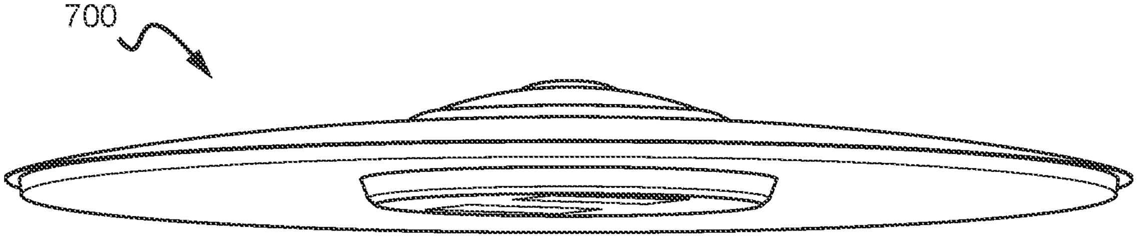
FIGS. 7A and 7B are bottom perspective views and FIG. 7C is a top perspective view of a cymbal assembly according to the present disclosure.
Figure 7B:
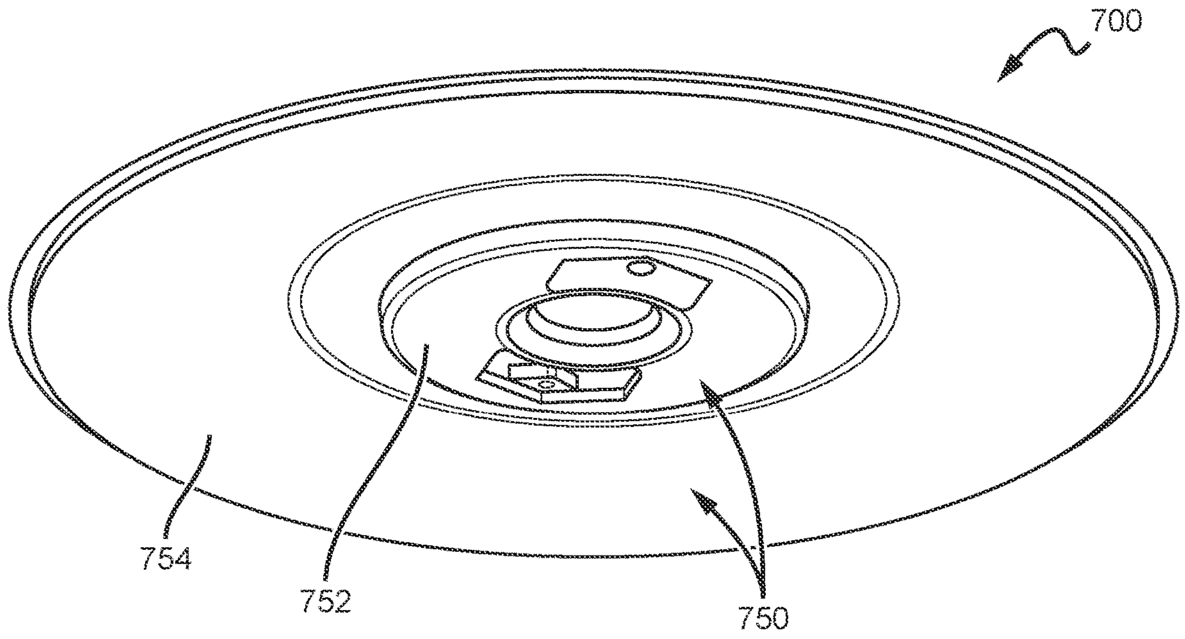
Figure 7C:
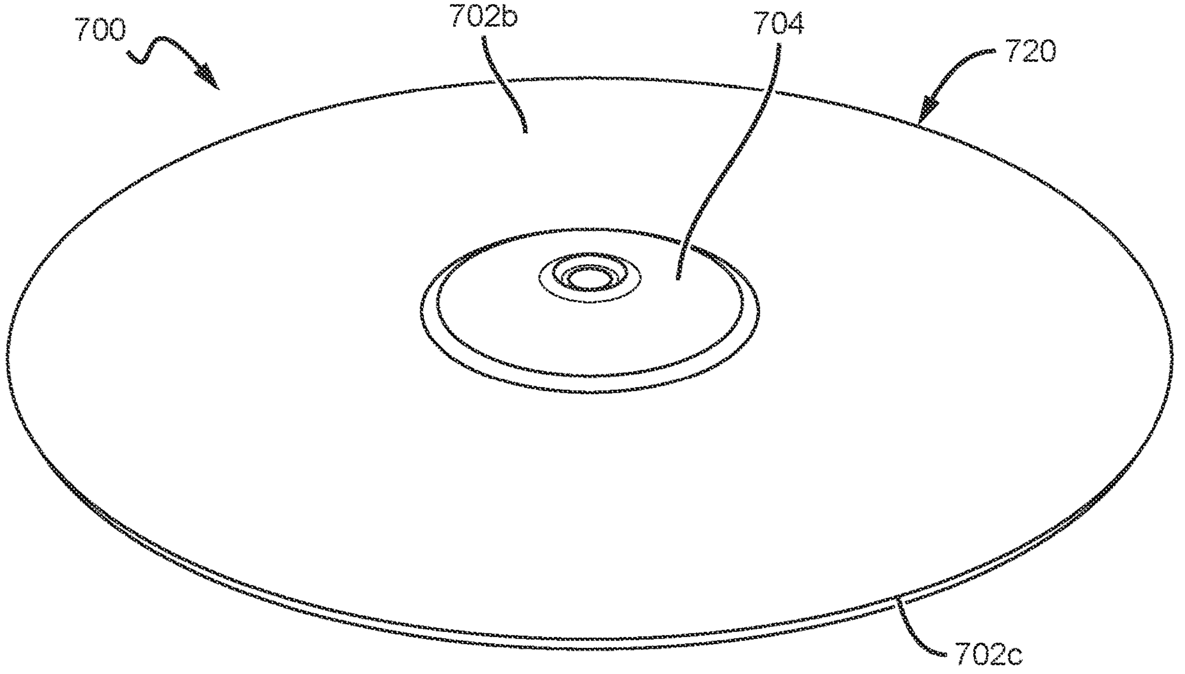
Figure 7D:
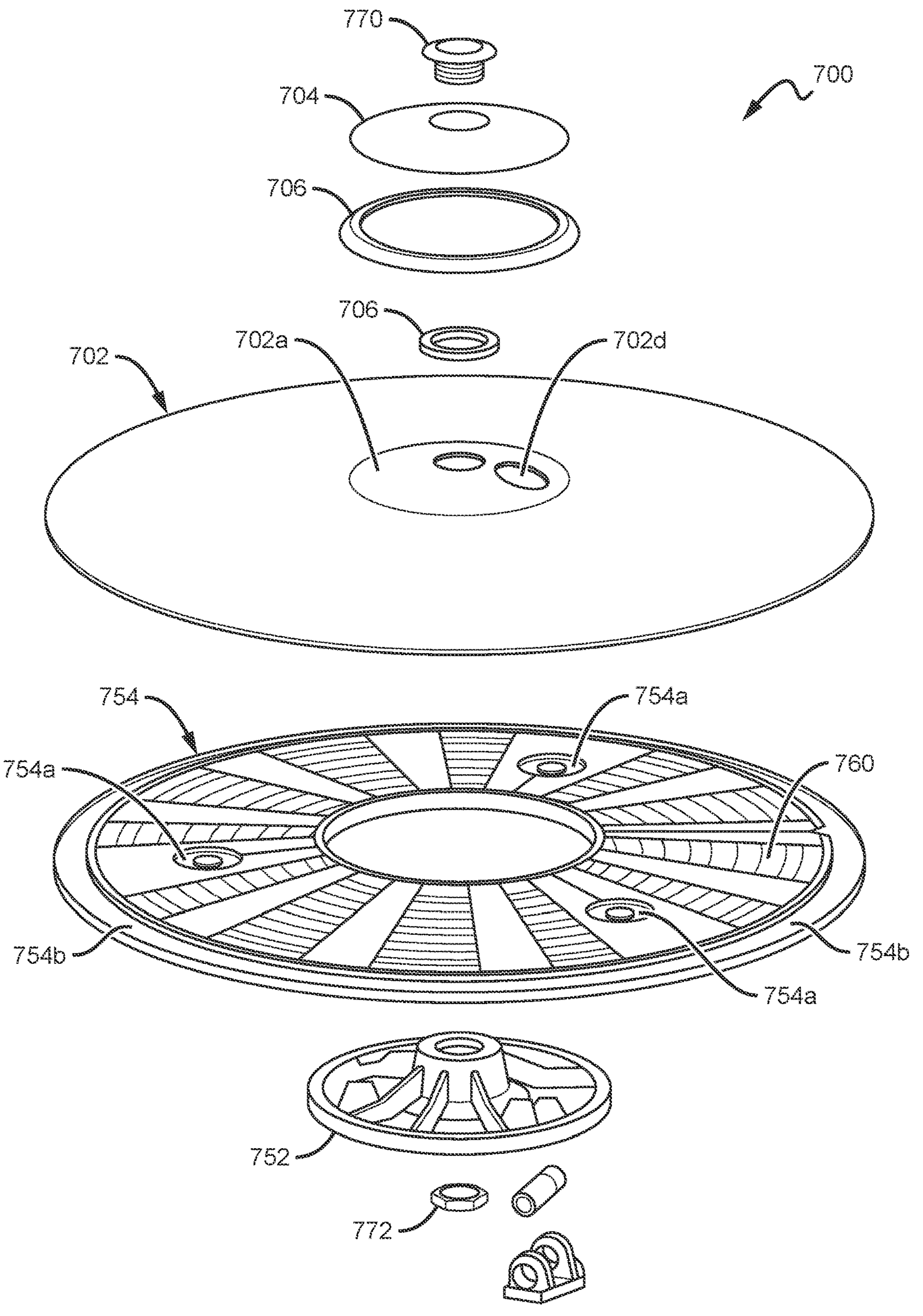
FIGS. 7D and 7E are exploded perspective views of the cymbal assembly shown in FIGS. 7A-7C.
Figure 7E:
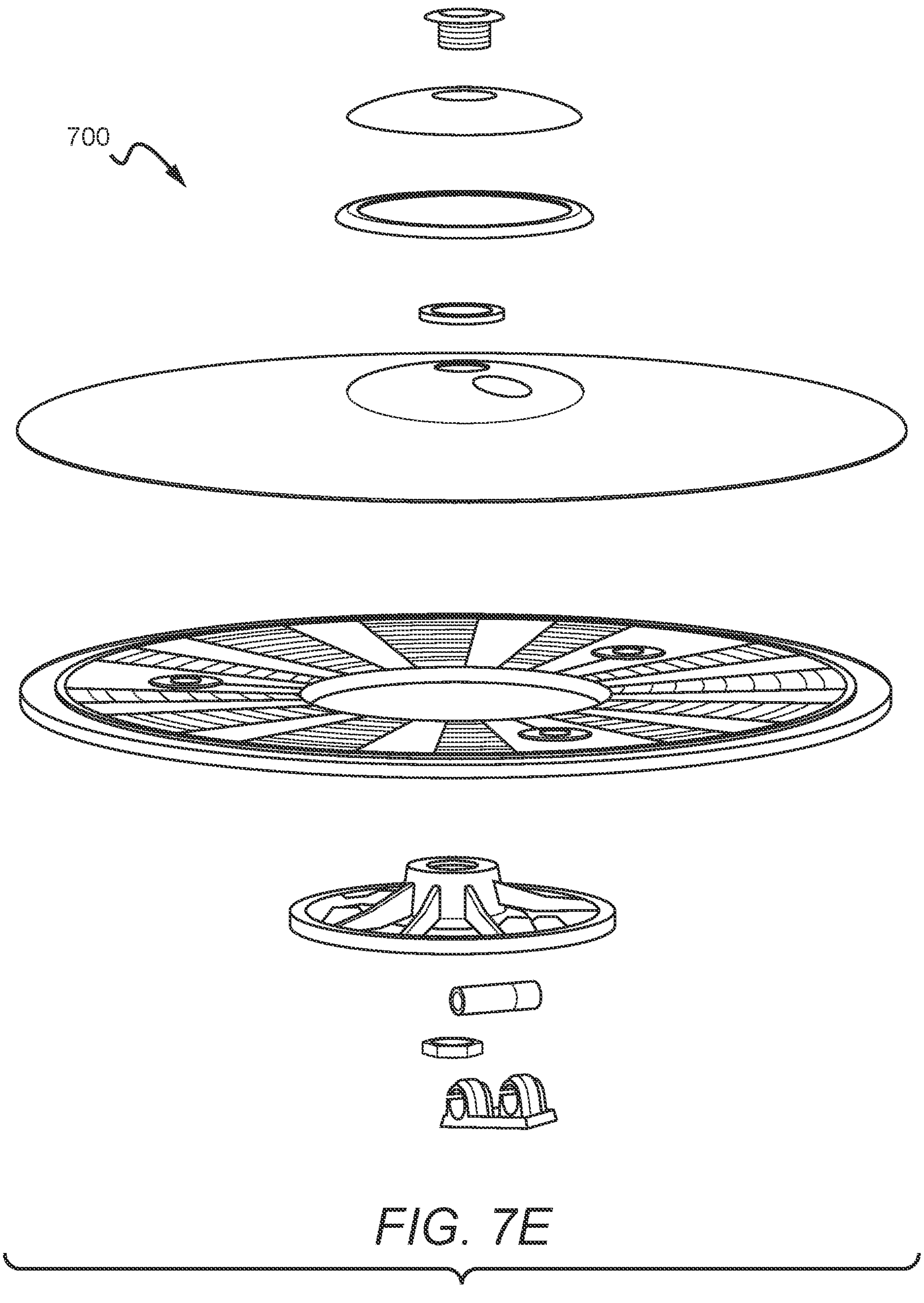

FIGS. 7A-7F show various views of a cymbal assembly 700 according to the present disclosure. As best seen in FIG. 7D, the cymbal assembly 700 can include a striking portion 702, a secondary bell 704, and an electronics portion 750, the electronics portion including an electronics module 752 and a sensor module 754, which in the embodiment shown circumferentially surrounds the electronics module 752. It is understood that embodiments without certain ones of these components are possible. For instance, in some embodiments, the secondary bell 704 may not be present, in some embodiments, the electronics portion may only include the electronics module 752; etc. Other traditional components of a cymbal stand can also be included, such as a cymbal stand rod. Many different embodiments are possible. The electronics portion 750 can be removable from the cymbal stand rod, such as by removing fasteners.

The secondary bell 704 can be over the striking portion 702, while the electronics portion 750 is underneath the striking portion 702. The electronics portion 750 (including one or both of the electronics module 752 and the sensor module 754), striking portion 702, and secondary bell 704 can each be shaped to define an axial hole through which a stand rod (e.g., a cymbal stand rod) can pass, with each of these components mounted to the stand and resembling a traditional acoustic cymbal stand assembly.

In some embodiments, the striking portion 702 and/or the electronics portion 750 have circular cross-sections, and/or are disc-shaped. The electronics portion 750 can have the same radius, area, and/or cross-sectional size as the striking portion 702, or may have a smaller radius, area, and/or cross-sectional size, as in the embodiment shown, which can help to hide the electronics portion 750 from view. The electronics portion 750 can have an area that is smaller than the striking portion 702 bottom area but that is 25% or more, 33% or more, 50% or more, 66% or more, 75% or more, 90% or more, or even more of the striking portion 702 bottom area. The electronics portion 750 can be approximately circular, and can have a radius that is less than 100% of, but 25% or more, 33% or more, 50% or more, 66% or more, 75% or more, 90% or more, or more of the striking portion 702 radius. The outer edge of the electronics portion 750 can be inwardly offset from the edge of the striking portion 702 by various distances, such as 3" or less, 2.5" or less, 2" or less, 1.5" or less, 1" or less, ¾" or less, ½" or less, ¼" or less, or even less; and/or by 1/32" to 2", 1/16" to 1.5", 1/16" to 1", ⅛" to 1", ⅛" to ¾", or ⅛" to ½"; and/or by 1/32" or more, 1/16" or more, ⅛" or more, ¼" or more, ½" or more, ¾" or more, 1" or more, 1.5" or more, 2" or more, or even more. Combinations of these ranges are possible, and it is understood that offsets outside these ranges are also possible.

In some embodiments, the striking portion 702 is a traditional cymbal and can be made of metal, such as copper alloys (e.g., bell bronze, malleable bronze, brass, nickel silver). In some other embodiments, the striking portion 702 is made of and/or comprises a material that makes less noise when actuated, such as plastic, Mylar, PET, rubber, and/or other materials as known in the art or previously described herein. The electronics portion 750 can be made of various materials known in the art, such as plastics and/or metal. Many different materials are possible.

The cymbal assembly 700 can include one or more sensors for recognizing a user actuation. A traditional cymbal will make a different sound depending on where it is struck: the bell (the raised middle portion), the bow (the main body of the cymbal, extending from the bottom of the bell outward), and the edge. The bell, bow, and edge of the striking portion 702 are shown as elements 702*a*,702*b*,702*c*, respectively, in FIGS. 7C and 7D. In the specific embodiment shown, the cymbal assembly 700 includes three sensor groups, each of which can include one or more sensors: a bell sensor or sensors, a bow sensor or sensors, and an edge sensor or sensors. It is understood that embodiments of the present disclosure can include just one of these sensor groups, any two of these sensor groups, or all three of these sensor groups, and that additional sensor groups can be added.

Bell Sensor(s)

With regard to the bell sensor group, one or more sensors (e.g., piezoelectric sensors) can be placed on the underside of the secondary bell 704 or elsewhere as would be understood by one of skill in the art (e.g., on the top of the bell 702*a*). The sensors can be placed onto the underside of the secondary bell 704 through an attachment aperture in the striking portion 702, such as the attachment aperture 702*a*. An attachment aperture 702*a* can be included for each sensor that is attached. Any number of sensors can be attached, such as one bell sensor, two bell sensors, three bell sensors, or more. The use of attachment apertures 702*a* can be helpful in preventing shorting of the sensors, such as by allowing an attachment mechanism such as adhesive an outlet when the sensor is placed through the attachment aperture 702*a* and pressed against the underside of the secondary bell 704.

The use of the secondary bell 704 instead of the bell of the striking portion 702 can be beneficial in that it can result in reduced acoustic resonance of the striking portion 702. The secondary bell 704 can have an area that is 50% or less, 25% or less, 20% or less, 15% or less, 10% or less, or even less the area of the striking portion 702. The secondary bell 704 can be separated from the striking portion 702, such as via one or more separators 706, such as rubber separators or washers, in order to reduce and/or prevent contact to the secondary bell 704 being transferred to the striking portion 702. However, it is understood that in other arrangements, the bell of the striking portion 702 may be used. In such arrangements, sensors for recognizing bell strikes may be included as part of the electronics portion 750.

Bow Sensor(s)

One or more bow sensors can be included as part of the electronics portion 750, such as on the sensor module 754. For instance, in the specific embodiment shown, three sensors can be included at the locations 754*a*. These sensors can be used to recognize actuations on the bow of the cymbal assembly 700. The bow sensors can be piezoelectric sensors, or other sensors as would be understood by one of skill in the art. It is understood that any number of sensors can be used, with two or more (e.g., three) sensors being beneficial to the reduction of hotspots.

The striking portion 702 and the electronics portion 750 can be separated by a relatively small distance when at rest, such as an inch or less, ¾" or less, ½" or less, ¼" or less, or even less. This separation can be achieved using a separator such as an O-ring, which can, for example, be placed in a channel on the topside of the electronics portion, such as the channel 760 on the topside of the sensor module 754. In other embodiments, the striking portion 702 and electronics portion 750 may be in direct contact.

In some embodiments, a dampening material is included between the electronics portion 750 and the striking portion 702 to reduce the acoustic sound produced by an actuation of the striking portion 702. The dampening material could be included, for instance, on the topside of the sensor module 754 and/or the entire electronics portion 750. The damping material can cover 25% or more, 50% or more, 75% or more, 85% or more, 90% or more, or even more of the area of the underside of the striking portion 702, though other embodiments are possible. The dampening material can be, for instance, foam, rubber, and/or any other material that can reduce the acoustic sound that would otherwise be produced by an actuation of the striking portion 702 as would be understood by one of skill in the art In some embodiments, the sensors are uncovered by and/or stick through the dampening material which is otherwise generally over the top surface of the sensor module 754, such as an embodiment where cutouts are included in the dampening material in the area of the sensors. In other embodiments, the dampening material serves as a mechanical link between the sensors and the underside of the striking portion 702. In other embodiments, the sensors are uncovered by and/or stick through the dampening material, and are mechanically linked to the underside of the striking portion 702 in another manner, such as via one or more mechanical posts that can be made of, for instance, rubber or another material as would be understood by one of skill in the art. In other embodiments, the sensors may not be in physical contact with the striking portion 702. In other embodiments, the sensors may be in direct physical contact with the striking portion 702. Many different embodiments are possible.

Edge Sensor(s)

The cymbal assembly 700 can also include one or more edge sensors. The edge sensors can be placed around the edge of the electronics portion 750, such as around the top edge 754*b* of the sensor module 754. The top edge 754*b* of the sensor module 754 can include an edge wall at the end thereof, or may not include such a wall and simply end at a ledge. The top edge 754*b* can be substantially flat in nature to allow for the placement of the edge sensor(s).

In one embodiment, a singular and/or monolithic edge sensor can be used to cover more than 180°, 270° or more, 300° or more, 330° or more, 345° or more, 350° or more, or 355° or more of the top edge **754*b*. A small gap between the ends of the edge sensor can be included so as to allow for easier placement, since the top edge 754*b*, while substantially flat, can be slightly frustoconical in shape (like a traditional cymbal). It is understood that other embodiments are possible, such as an embodiment where a singular and/or monolithic edge sensor covers 360° of the top edge 754*b*, and an embodiment where two or more sensors are used to cover more than 180°, 270° or more, 300° or more, 330° or more, 345° or more, 350° or more, or 355° or more of the top edge 754*b***, and/or less than 360°. In embodiments with multiple sensors, the sensor ends may meet, may overlap, or a gap may be left between them. Many different embodiments are possible.

With a traditional acoustic cymbal, a user can "choke" the cymbal (i.e., stop the cymbal from producing sound after an actuation, or lessen that sound) by grabbing the underside and topside of the cymbal with his fingers, causing a reduction in the cymbal's vibration. The edge sensor(s) can be used 1) to recognize a choke, and/or 2) to recognize an edge strike. In another embodiment, the edge sensor(s) are used only to recognize a choke, while the bow sensor(s) described above recognize an edge strike. Many different embodiments are possible.

In one embodiment, the edge sensor is an FS sensor (e.g., FSR sensor) (or if multiple edge sensors are included, multiple FS sensors). The user can utilize a traditional choking movement, pressing down on the topside of the striking portion 702 and up on the underside of the electronics portion 750, such as the sensor module 754; and/or otherwise squeeze or move the edges of the striking portion 702 and electronics portion 750 closer together. As the striking portion 702 and the sensor module 754 are squeezed together, the FS sensor(s) senses increased pressure, and sends a corresponding impulse or message (such as to an electronic included in the electronics module 752, to be discussed in more detail below).

The use of one or more FS sensors for the edge sensor(s) can be particularly useful, in that it can act as a continuous controller instead of a switch. Whereas prior art electronic cymbals utilize a switch such that the cymbal is either completely choked or unchoked, a continuous controller embodiment such as the cymbal assembly 700 allows for a greater amount of control by the user. The user can, for instance, slightly choke the cymbal assembly 700 so as to quiet the sound and/or reduce the overall decay time and/or increase decay speed as a drummer could with a traditional acoustic cymbal (such as by squeezing the cymbal more gently). It is understood, however, that other embodiments are possible, such as switched embodiments and embodiments utilizing other types of sensors (e.g., piezoelectric edge sensors).

Other manners of causing the cymbal to "choke" are also possible, as opposed to squeezing together the striking portion 702 and electronics portion 750. For instance, in one embodiment, the cymbal assembly 700 can sense certain types of contact from a user, such as a hand touch. In one embodiment, if a user uses his or her hand to touch both the striking portion 702 and the electronics portion 750, a circuit is completed. The completion of this circuit can result in a signal being sent that results in a "choke" of the cymbal. In other embodiments, one or more capacitive sensors may be used to recognize the proximity of the striking portion 702 and electronics portion 750. This recognition can be used by an included electronics portion in order to alter the signal produced by the instrument (e.g., to "choke" the cymbal).

Edge Sensor(s) Arrangement

Figure 7F:
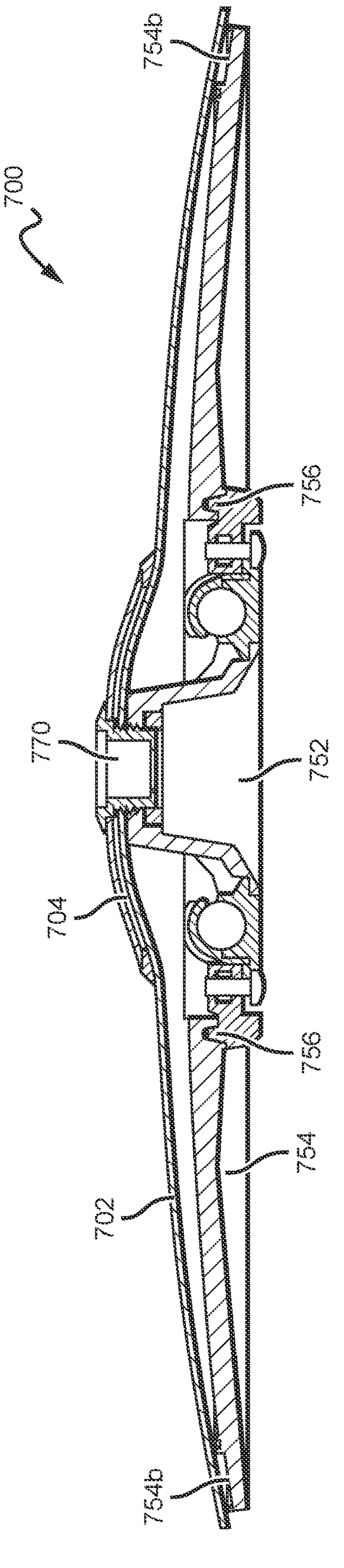
FIG. 7F is a cross-sectional view of the cymbal assembly shown in FIGS. 7A-7C.
Figure 7G:
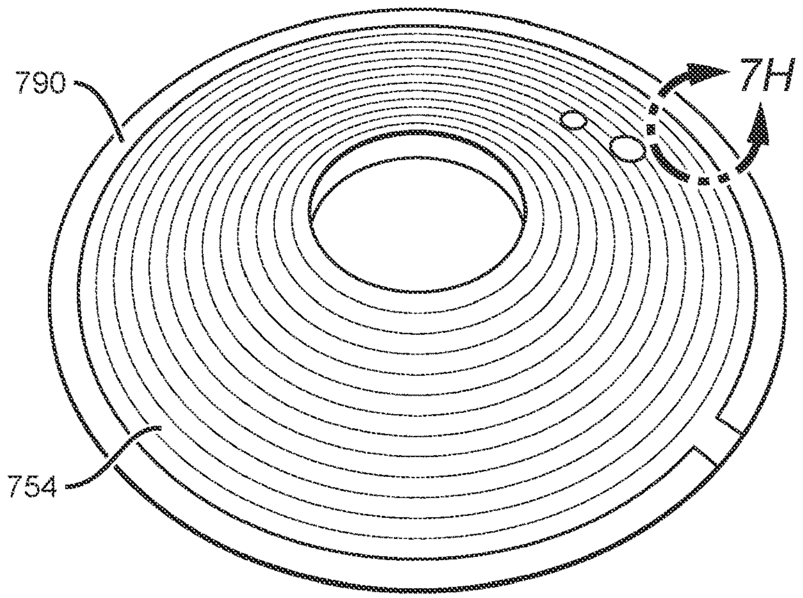
FIGS. 7G-7J are perspective views of portions of another embodiment of a cymbal assembly according to the present disclosure.
Figure 7H:
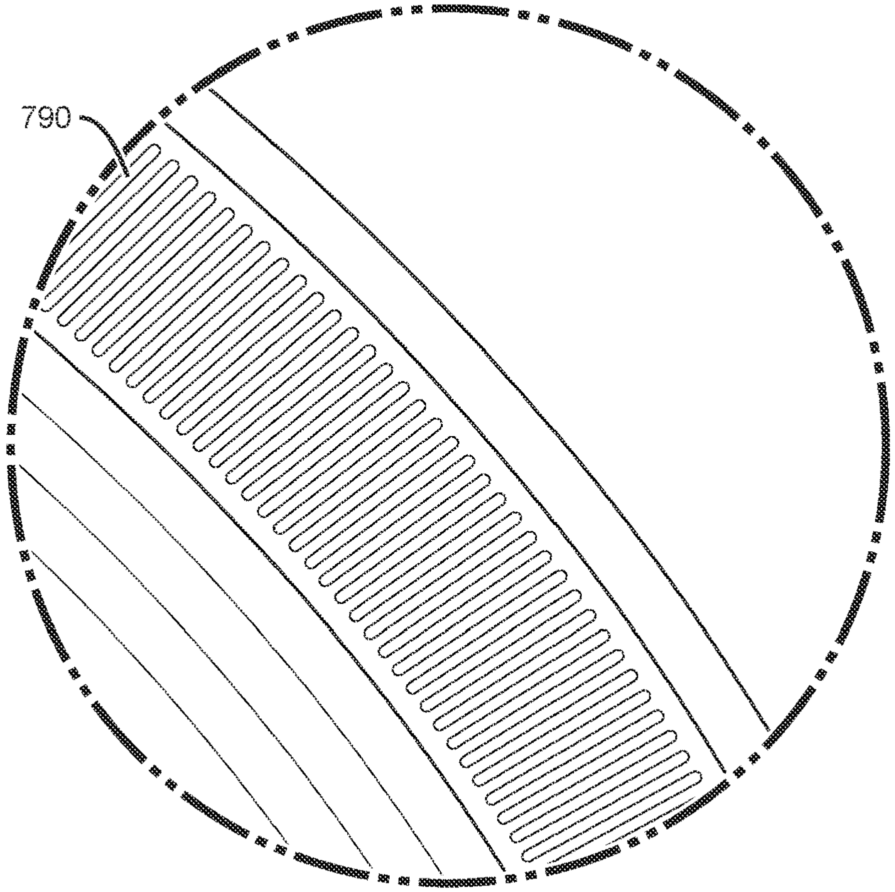
Figure 7I:
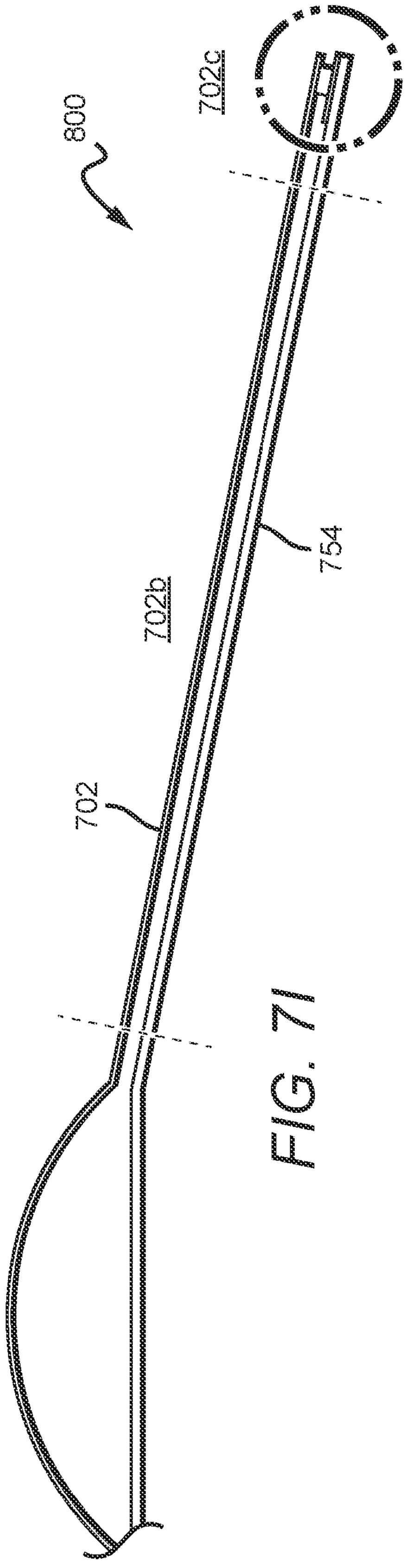
Figure 7J:
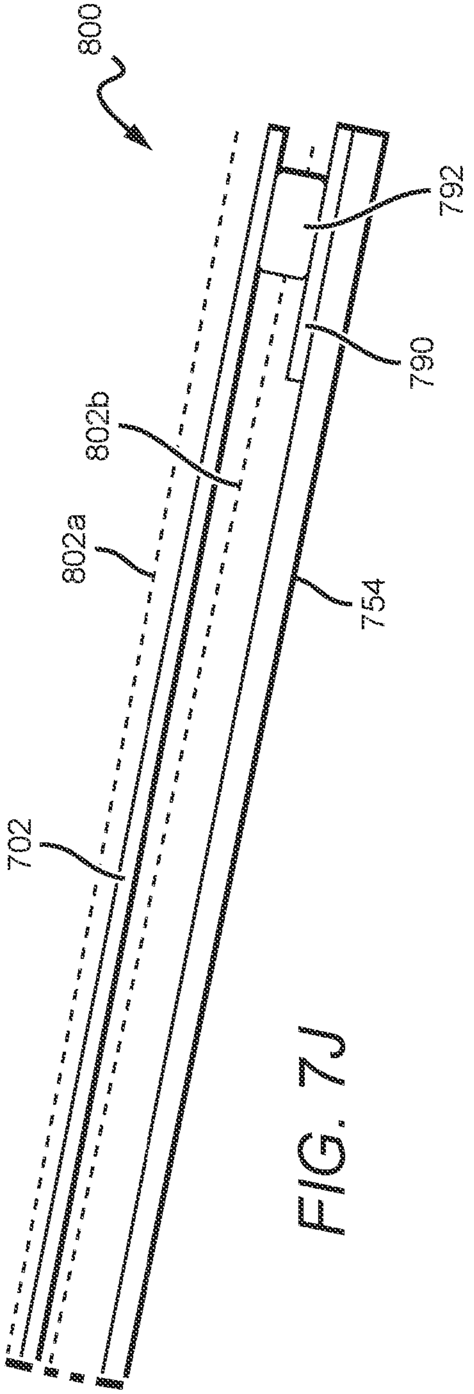

FIGS. 7G and 7H show one embodiment of a sensor module 754 including an edge sensor 790. The edge sensor 790 can be an FS sensor (e.g., an FSR sensor), and can be a single piece that extends nearly 360°, though it is understood that any of the previously described sensor arrangements can be used as would be understood by one of skill in the art (e.g., one or more sensors collectively covering more than 180°, 270° or more, 300° or more, 330° or more, 345° or more, 350° or more, or 355° or more, etc.). FIGS. 7I and 7J show schematic views of portions of a cymbal arrangement 800 according to the present disclosure, including a striking portion 702 and sensor module 754, with the striking portion 702 including a bow portion **702*b* and edge portion 702*c*. An edge sensor 790 is included on the sensor module 754 and/or beneath the edge portion 702*c* of the striking portion 702. A gap can remain between the edge sensor 790 and the underside of the striking portion 702. In one embodiment best seen in FIG. 7J, a spacer 792 can be used to fill the gap between the sensor 790 and the striking portion 702 and/or to mechanically connect the sensor 790 and the striking portion 702. This spacer 792 can be used to transfer force from the striking portion 702 (e.g., the edge portion 702*c* of the striking portion 702) to the sensor 790, such as when a user "chokes" the cymbal by squeezing the striking portion 702 and sensor module 754 together, and/or when a user strikes the edge portion 702*c* of the striking portion 702, such as with a drumstick. The spacer can be made of an elastic material, such as rubber; many different materials could be used as would be understood by one of skill in the art. In an alternative embodiment, the edge sensor 790 can be included on the underside of the edge portion 702*c* of the striking portion 702 with a gap between the sensor 790 and the sensor module 754, which can be filled with a spacer 792 as described above. The spacer can be connected to the elements above and/or below it, such as the striking portion 702 and the sensor 790** respectively in the embodiment shown. This connection can in some embodiments be an adhesive connection, though it is understood that other embodiments are possible.

The arrangement shown in FIG. 7J can in some instances suffer from performance issues due to the sensitivity of the sensor 790 in combination with manufacturing tolerances of the striking portion 702. For instance, even standard manufacturing tolerances of cymbals can cause these issues. By way of representation, lines **802*a*,802*b* represent striking portion position based on manufacturing tolerances. As can be seen, the spacer 792 would likely be ineffective if the striking portion 702 were manufactured to match either of lines 802*a*,802*b*. The high sensitivity of the sensor 790** (e.g., an FSR sensor) in combination with these standard manufacturing tolerances can lead to performance issues.

Figure 7K:
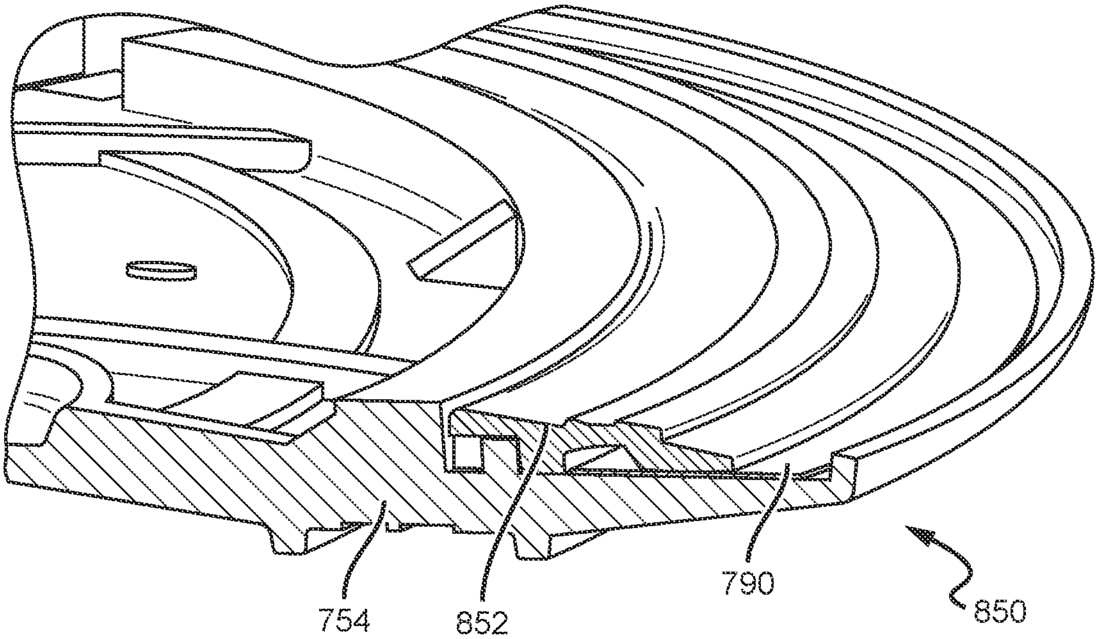
FIGS. 7K-7N are perspective views of portions of another embodiment of a cymbal assembly according to the present disclosure.
Figure 7L:
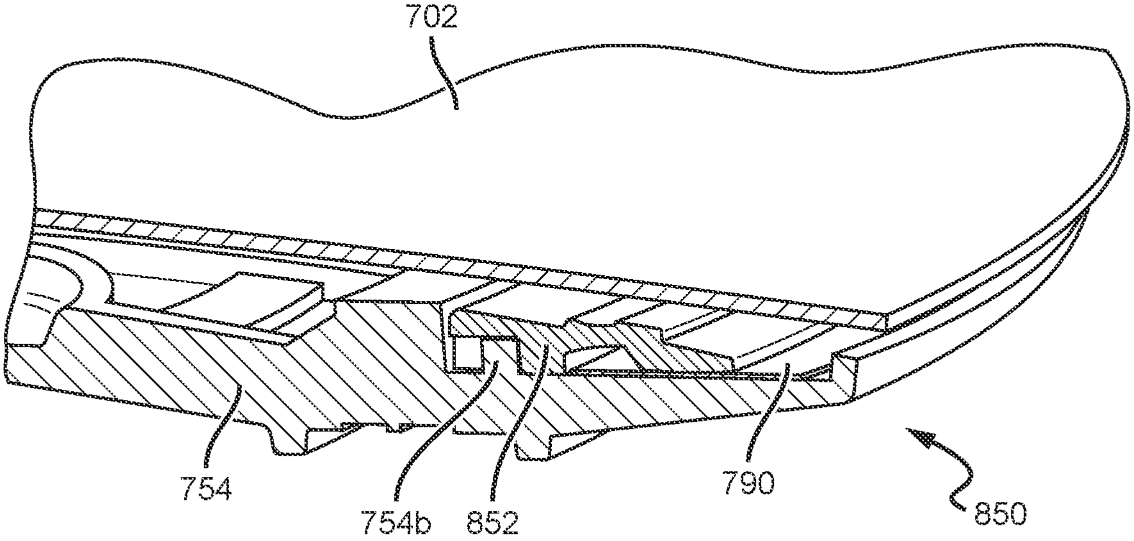
Figure 7M:
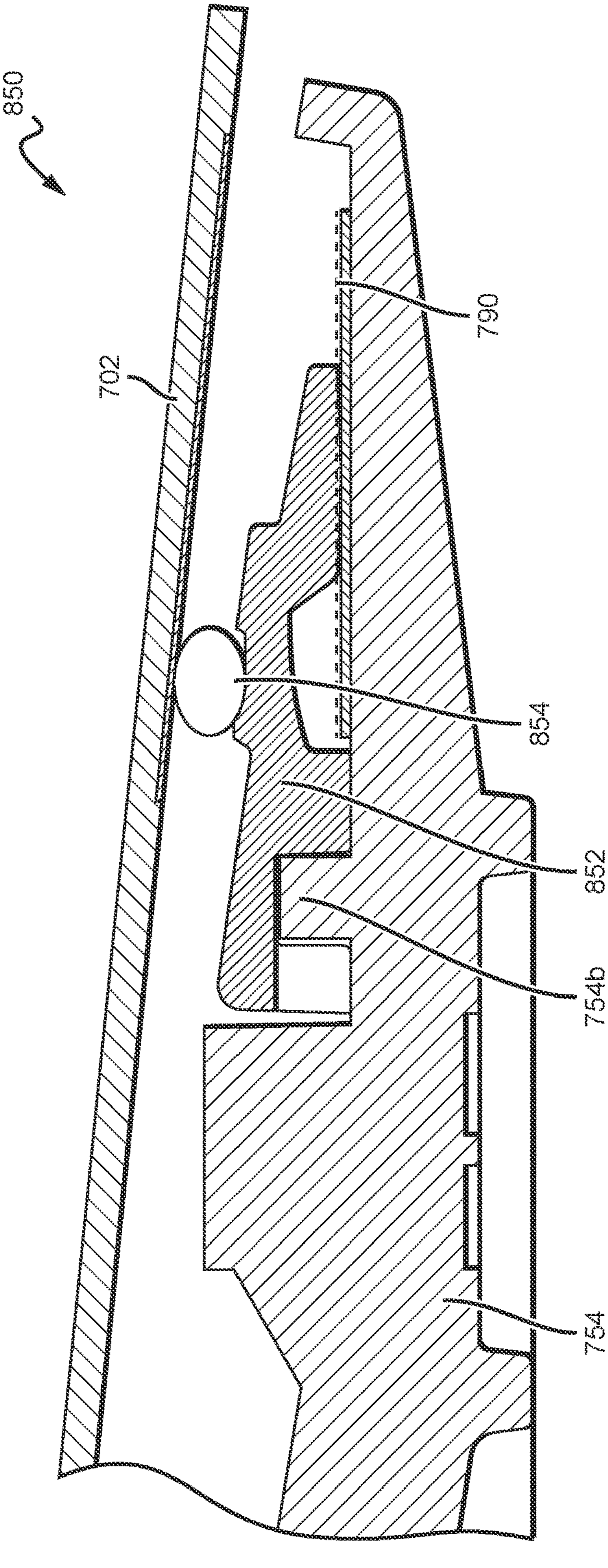

FIGS. 7K-7N show views of an alternative cymbal arrangement 850, including sensor module 754, sensor 790, and striking portion 702 (omitted from FIG. 7K). The arrangement 850 can also include a pressuring member 852 and spacer 854. The pressuring member 852 can be used to apply pressure to the sensor 790. The pressuring member 852 can attach and/or interlock with the module 754 (e.g. sensor module), such as with a protrusion **754*b*, though it is understood that other arrangements are possible, including but not limited to mechanical connections such as male/female connections and/or interlocking connections, adhesive connections, fastener connections, and other connections as would be understood by one of skill in the art. The pressuring member 852 can be circumferential in nature. In some embodiments, the pressuring member 852 and/or protrusion 754***b* can cover more than 180°, 270° or more, 300° or more, 330° or more, 345° or more, 350° or more, 355° or more, or 360°. It is understood that the pressuring member 852 and/or protrusion 754*b* may be a single piece, or may itself be made up of multiple sub-members, which may be continuous or discontinuous. The pressuring member 852 can be compliant in nature, and can be made of many different materials, such as rubber, silicone, polymers, plastic, and/or other materials as known in the art, though it is understood that non-compliant and/or rigid embodiments are also possible. The protrusion 754*b* or other attachment point between the pressuring member 852 and sensor module 754 can be to the inside (i.e., toward the center of the assembly) of the sensor 790.

A gap can remain between the top of the pressuring member 852 and the underside of the striking portion 702. The pressuring member 852 can then be mechanically connected to the underside of the striking portion 702 by a spacer 854, shown in FIGS. 7M and 7N. The pressuring member 852 can include a portion (e.g., a cutout and/or concave portion) for accommodating the spacer 854.

In order to adjust for the manufacturing tolerance issues described above with regard to FIGS. 7G-7J, the spacer 854 can be an unhardened and/or uncured material when it is placed between the striking portion 702 and the pressuring member 852 and/or the sensor module 754. The spacer 854 can then become shaped and/or can conform to fill the gap below the striking portion 702, and then be hardened and/or cured. Various materials could be used for the spacer 854, with some examples being plastic, rubber, and/or silicone. The material can be curable (e.g., a curable silicone, such as one or more curable silicone beads) and/or otherwise able to be hardened. Other materials, such as but not limited to sealants, adhesives, epoxies, and other materials as known in the art can also be used. Any of these materials can be used alone, or can be used in conjunction with one or more other materials. In some embodiments, the hardened and/or cured material can have an adhesive quality and stick to the adjacent elements, such as the pressuring member 852 (or in embodiments without such a member, the sensor module 754) and/or the underside of the striking portion 702. The hardened material in some embodiments is rigid and/or resilient, and in other embodiments is compliant and/or elastic in nature. The spacer can be circumferential in nature, or can be placed radially and/or at various points around the circumference of the sensor 790, such as at two, three, four, eight, or more points (e.g., substantially equidistant points) around the circumference of the sensor 790. Many different embodiments are possible as would be understood by one of skill in the art.

Figure 7N:
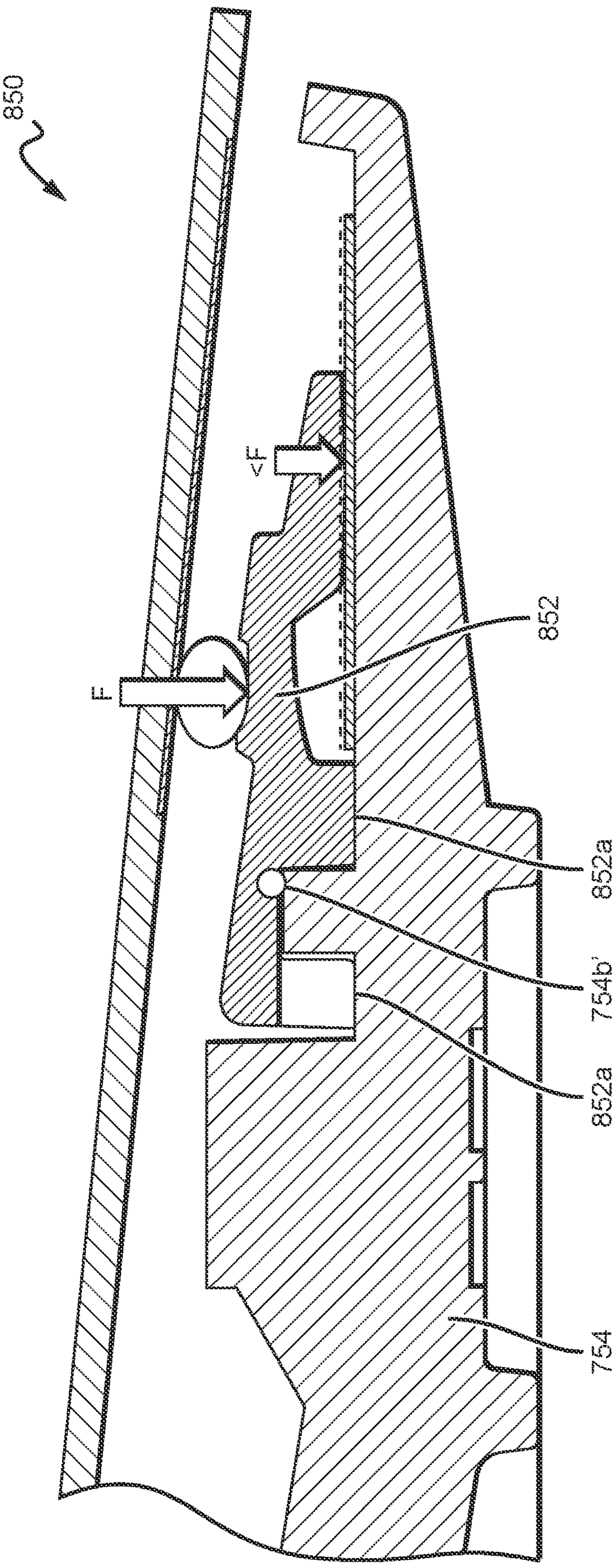

As can be seen in FIG. 7N, the use of the pressuring member 852 can reduce the total force that is applied to the sensor 790. This can be due to one or more factors, such as a) the fact that the pressuring member 852 includes portions 852*a* of its bottom that do not rest on the sensor 790 (and thus some of the force will pass through these portions 852*a* and directly into the sensor module 754 without being felt by the sensor 790), and/or b) the pressuring member 852 can rest on the sensor module 754 (e.g. protrusion 754*b*) at a hinge point such as hinge point 754*b*'. This reduction in force can bring the total applied force to the sensor 790 to within the sensor's operating range.

Figure 7O:
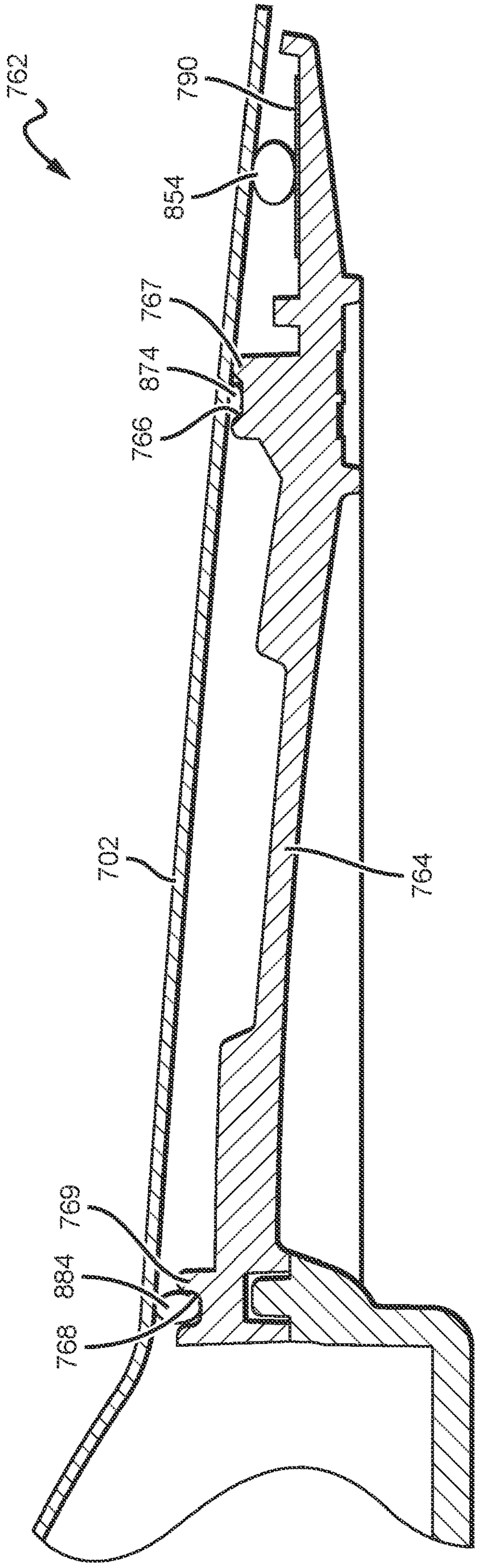
FIG. 7O is a cross-sectional view of a portion of another embodiment of a cymbal assembly according to the present disclosure.

It is understood that in some embodiments, the pressuring member 852 may not be present; for instance, in some embodiments of the present disclosure, the spacer 854 can replace the spacer 792 from FIGS. 7G-7J. FIG. 7O shows a portion of a cymbal assembly 762 according to another embodiment of the present disclosure, including a sensor module 764 which can be part of an electronics portion. The cymbal assembly 762 can include an edge sensor 790. The spacer 792 from FIG. 7J can be replaced with the spacer 854.

Additionally, it should be understood that spacers 854 can be used in areas other than the edge of a cymbal assembly such as the cymbal assembly 762. For instance, in the embodiment shown, the cymbal assembly 762 includes a spacer 874, which can be the same as or similar to the spacer 854, and which may serve a mechanical and/or O-ring type function. The spacer 874 can be on the outer half of the sensor module 764 and inward of the edge sensor 790. The spacer 874 can be included within an indentation 766 (e.g., a cup or channel) of the sensor module 764, such as a raised portion 768 of the sensor module 764, which may be separate or integral with the remainder of the sensor module 764. The raised portion 767, by itself and/or in conjunction with the spacer 874, can serve as a support for the striking portion 702. The placement of the spacer 874 within the indentation 766 can help to contain the spacer material prior to hardening/curing. A similar arrangement including a spacer 884, an indentation 768, and/or a raised portion 769 (which can be the same as or similar to the spacer 874, indentation 766, and raised portion 767, respectively) can be used on an inner portion of the sensor module 764, such as in the inner half, inner quarter, or inner 10% of the sensor module 764, and/or at or proximate the inner edge of the sensor module 764, the inner edge of the bow of the striking portion 702, and/or the junction between the bow and bell of the striking portion 702 as shown. It should be understood that like the spacer 854, the spacer 874 and/or the spacer 884 can be circumferential in nature and/or a plurality of the spacers can be placed radially about the sensor module 764. It should also be understood that any individual or combination of these spacer arrangements and associated elements can be used with various embodiments of the present disclosure, including but not limited to those previously described and the embodiment described below with regard to FIG. 7P.

It is understood that the concepts in this section can be applied to other types of arrangements including but not limited to other types of cymbal arrangements, such as hi-hats. Additionally, it is understood that the order of elements can be changed as would be understood by one of skill in the art (e.g., the sensor 790 could be above element 854).

Edge Capacitance

Figure 7P:
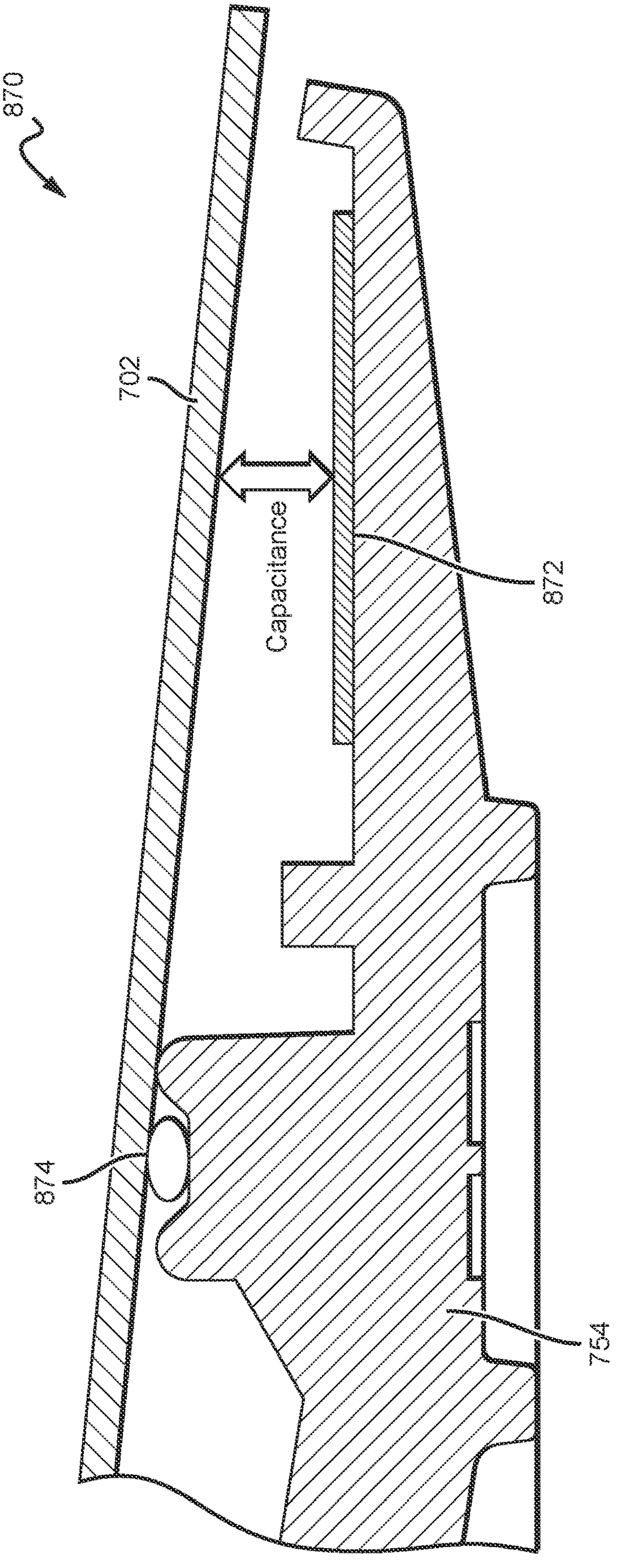
FIG. 7P is a cross-sectional view of a portion of another embodiment of a cymbal assembly according to the present disclosure.

FIG. 7P shows a cross-sectional view of an alternative cymbal arrangement 870, including the sensor module 754, and striking portion 702. The cymbal arrangement 870 can also include a spacer 874, which can be the same as or similar to the spacer 854 (e.g. silicone bead(s) serving in an O-ring type function), and can serve a mechanical function. The spacer 854 can be closer to the center of the cymbal arrangement 870 than the capacitive elements discussed below.

In place of (or in some embodiments in addition to) one or more edge sensors as described with previous embodiments, the cymbal arrangement 870 utilizes sensing (e.g. capacitive sensing) to determine position of the striking portion 702, which can in turn be utilized to recognize a choke and/or edge strike. To achieve this, the cymbal arrangement 870 can include a conductive element 872, which can be metallic, such as sheet metal. The conductive element 872 can be substantially flat and/or ring-shaped. For instance, it can have the same or similar dimensions, and/or be arranged in the same or similar manner, as the edge sensor 790 previously described with regard to FIGS. 7G-7O.

One or more sensors, such as capacitive displacement sensors or optical sensors, can be utilized to measure a variable or variables corresponding to the distance between the conductive element 872 and the striking portion 702. These variables could include, for instance, capacitance or distance. The sensor impulses will vary due to, e.g., an edge strike, choking of the cymbal arrangement 870, and/or distance between the striking portion 702 and conductive element 872. These impulses can thus be used by an electronic to recognize an edge strike or cymbal choke. In one embodiment, the electronic differentiates between an edge strike and a cymbal choke based on the characteristics of the displacement; for example, an edge strike may cause a displacement that rebounds faster than a user choking the cymbal. The sensor(s) may be located on the sensor module 754, on an underside of the striking portion 702, between the sensor module 754 and the striking portion 702, or other locations as would be understood by one of skill in the art.

In some embodiments, a plurality of sensors (e.g. 2 sensors, 3 sensors, 4 sensors, or 5 sensors or more) are arranged radially around the cymbal arrangement 870, such as in an equidistant arrangement, to refine the measurements being taken.

Mechanical Connections

Returning to FIG. 7F, FIG. 7F shows a cross-sectional view of the cymbal assembly 700. The components of the cymbal assembly 700 can be held together via one or more connectors/fasteners, such as a nut-and-bolt connection. For instance, as can be best seen in FIGS. 7D and 7F, a first connection piece 770 (referred to hereinafter as a "bolt" for simplicity) can connect to a second connection piece 772 (referred to hereinafter as a "nut" for simplicity) through the axial holes of the other components, such as the secondary bell 704, the striking portion 702, and the electronics portion 750 (such as the electronics module 752). In order to hold the components together tightly, the axial holes of the components (e.g., the components 704,702,750,752) can be larger than the typical ½" axial holes of traditional acoustic cymbal assemblies. For instance, the axial holes can be ⅝" or larger, ¾" or larger, ⅞" or larger, approximately 1" or larger, 1.25" or larger, 1.5" or larger, or even larger. It is understood, however, that smaller axial holes are also possible. The inclusion of a larger axial hole allows for the use of larger connection pieces such as the bolt 770, which can result in a tighter connection between components. The nut 772, when tightened, can be within an aperture of the electronics portion 750 and/or electronics module 752.

The use of a multipiece electronics portion 750 can have distinct advantages over prior art arrangements. For instance, by including an electronics module 752 that is relatively small in conjunction with a sensor module 754 that corresponds more closely to the size of the striking portion 702, the same electronics module 752 can be used with a variety of sizes of striking portions and cymbal assemblies, or even other instruments. This results in greater manufacturing efficiency, since the same electronics module 752 can be used for a variety of different products. However, it is understood that monolithic/single piece electronics portions are possible.

The electronics module 752 can connect, such as detachably connect, with one or more of the other components of the cymbal assembly 700. For instance, as can be seen in FIG. 7F, the electronics module 752 can connect (in this specific embodiment, detachably connect) to the sensor module 754, such as via interlocking. In some instances, this can be a snap and/or male female connection. In the specific embodiment shown, the electronics module 752 can connect to the sensor module 754 via one or more male/female connections 756, with the electronics module 752 including male component(s) 756*a* (seen best in FIG. 8C) and the sensor module 754 including accompanying female component(s), though it is understood that any male/female connection could be used as would be understood by one of skill in the art. The connections can be generally circular in nature, as shown in this embodiment, though other embodiments are possible. Other types of connections (e.g., using fasteners and/or adhesives) are also possible in addition to or in place of the described connections.

Electronics Portion and Electronics Module

Figure 8A:
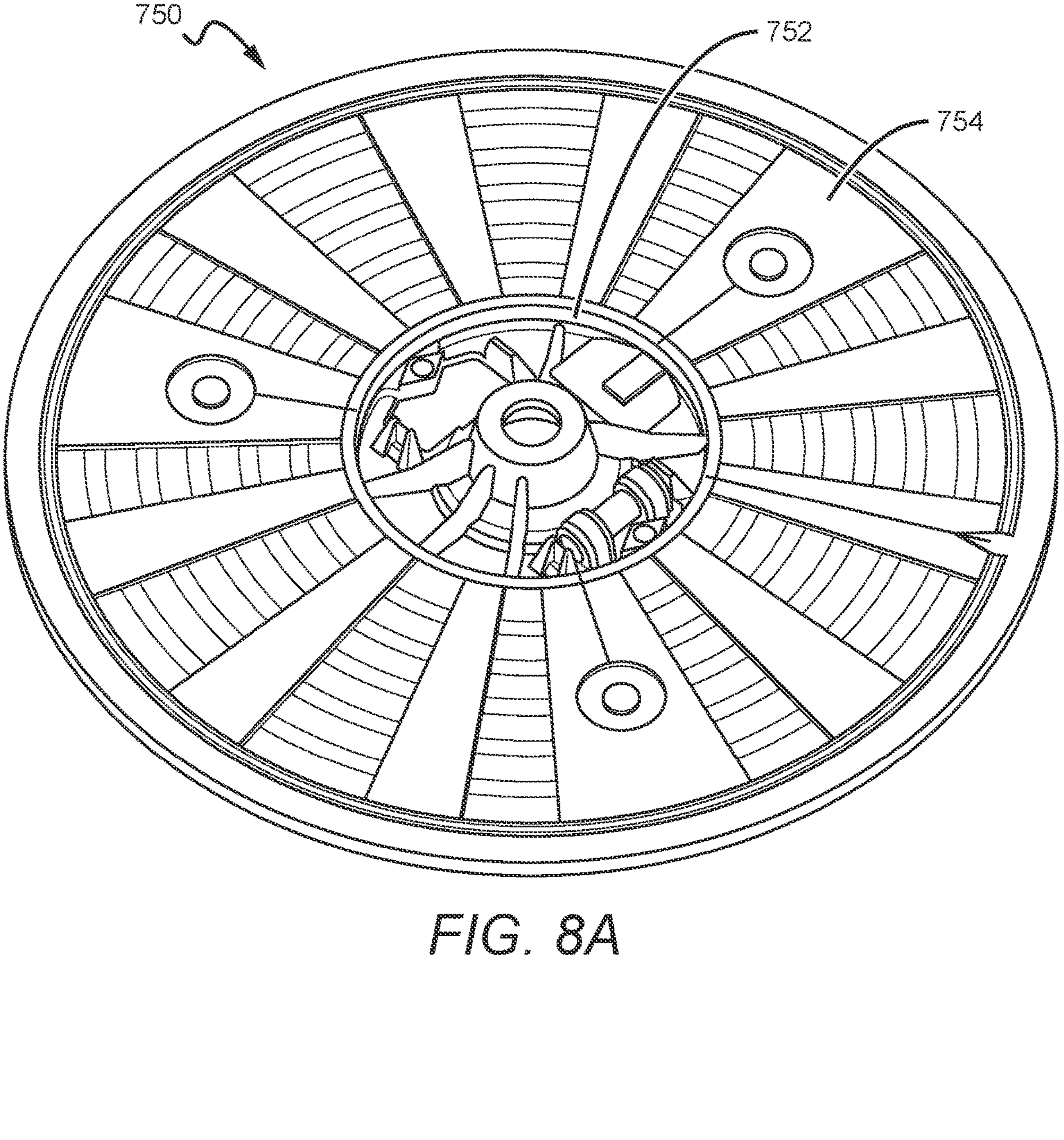
FIGS. 8A-8C are perspective views of portions of the cymbal assembly shown in FIGS. 7A-7F.
Figure 8B:
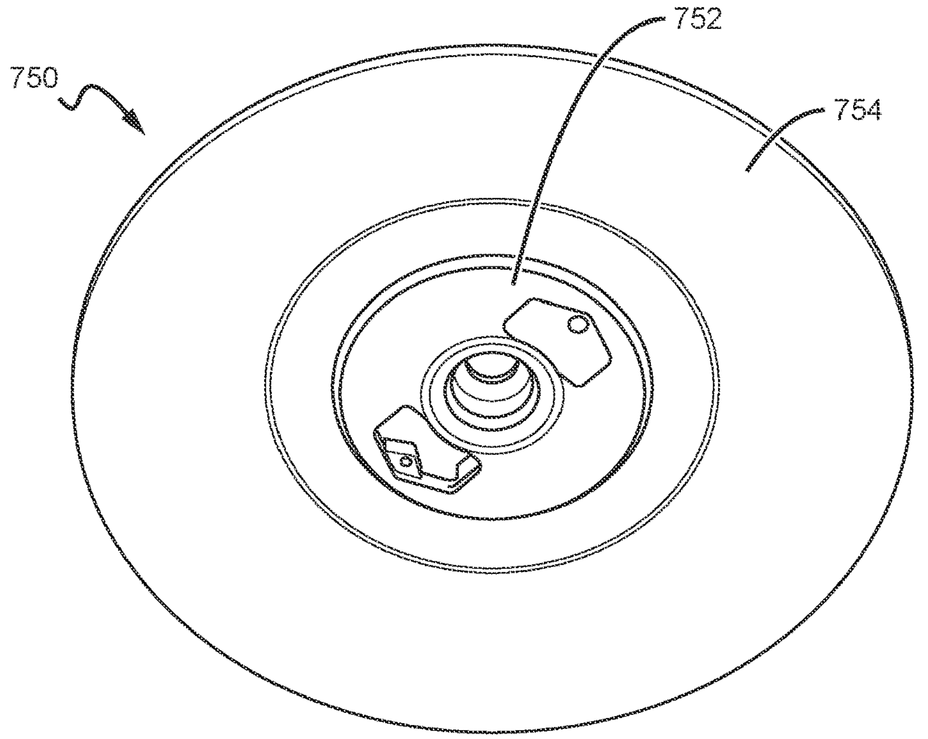
Figure 8C:
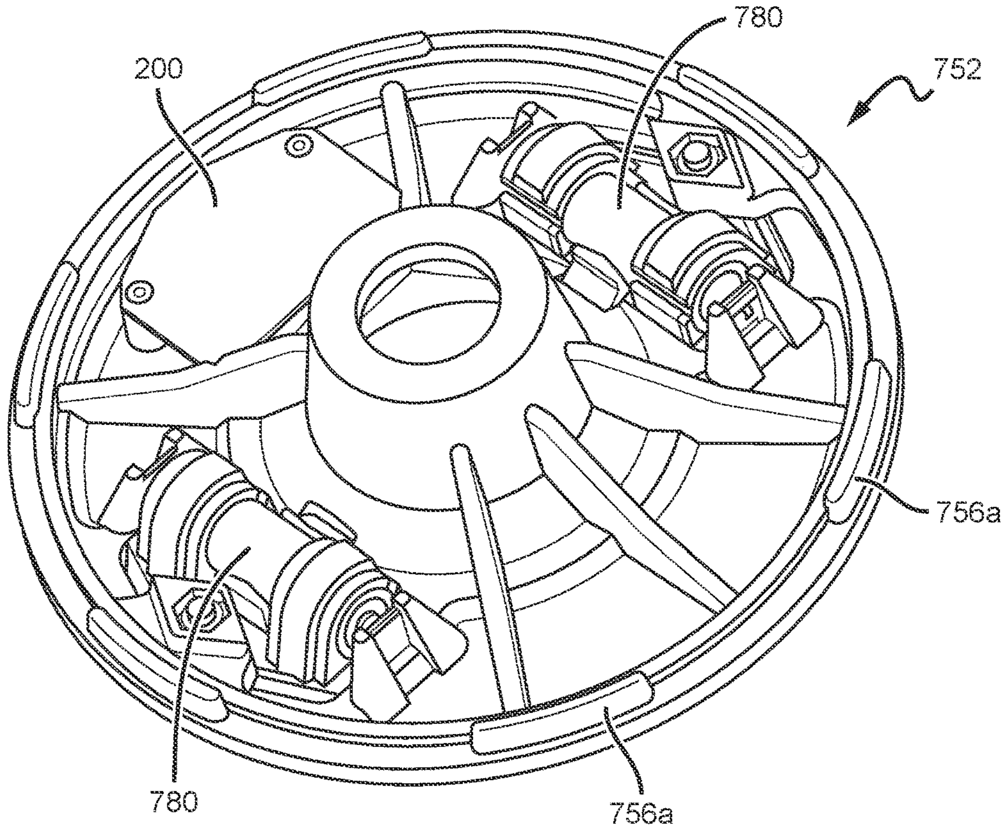

FIGS. 8A and 8B are views of the electronics portion 750, while FIG. 8C shows the electronics module 752. The electronics module 752 can include an electronic such as the electronic 200. The electronic 200 can be connected to the above-described sensors, such as via wire connections. The electronics module 752 can also include one or more power sources 780 that can be local power sources, such as batteries.

Because the cymbal assembly 700 is self-powered and transmits wirelessly, it does not require external connections, such as external wire connections. In prior art electronic cymbal assemblies, wire connections are required. These wire connections can prevent the free movement and rotation of the cymbal assembly striking portion, because such movement/rotation causes twisting of the external wires and/or wires running from a foot pedal to the cymbals. However, because external wire connections have been eliminated, the striking portion 702 of the cymbal assembly 700 can freely move and rotate similar to the cymbal of an acoustic cymbal assembly.

Example 5: Hi-Hat Assembly Embodiment 1

Figure 9A:
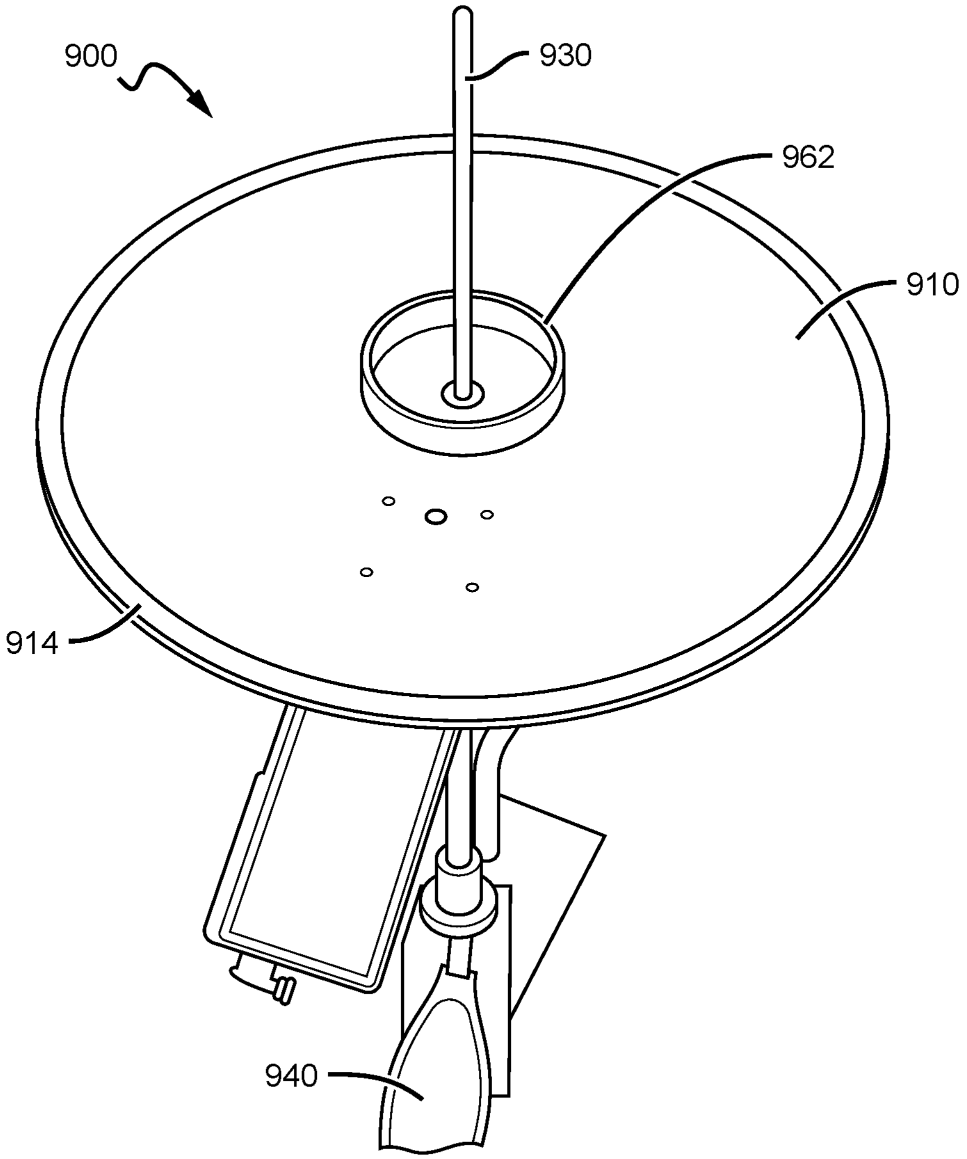
FIGS. 9A-9C are perspective views of portions of a hi-hat assembly according to the present disclosure.
Figure 9B:
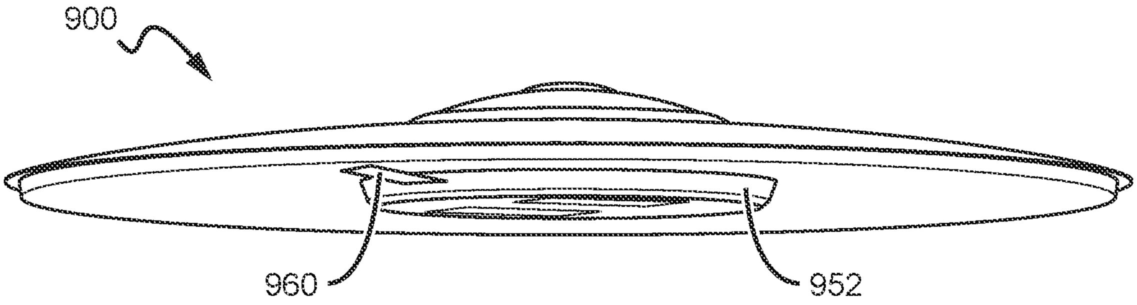
Figure 9C:
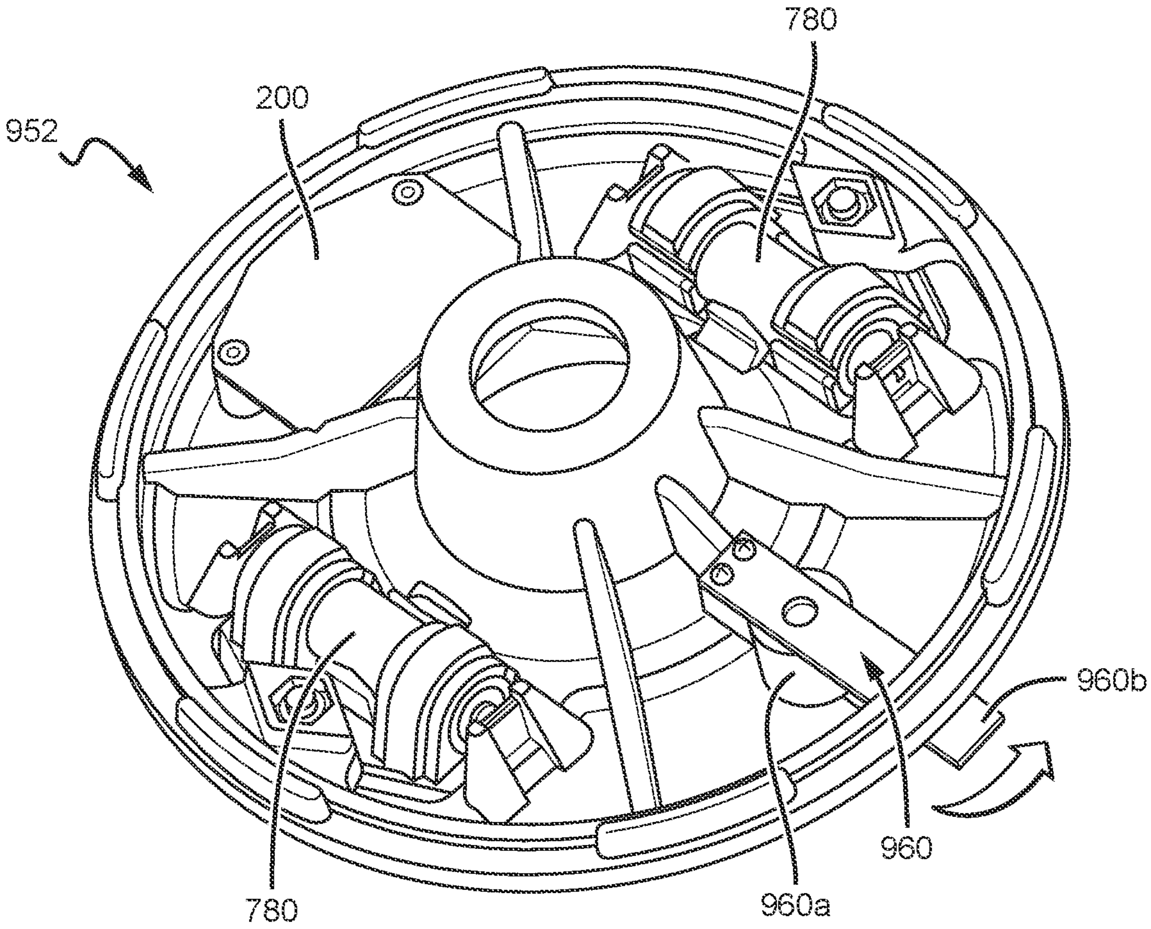

As another example of a cymbal instrument according to the present disclosure, FIGS. 9A-9C show example components of a hi-hat assembly 900. The hi-hat assembly 900 can include a bottom cymbal 910 and a top cymbal 920, which can be mounted on a stand 930, and a pedal 940. The pedal can be operable to move the top cymbal 920 downward and toward the bottom cymbal 910, with top cymbal 920 movements sometimes resulting in striking the bottom cymbal 910 and sometimes resulting only in becoming closer to the bottom cymbal 910. The top and/or bottom cymbals 920,910 (in this case, only the top cymbal 920) can include many components similar to and/or the same as those included in the cymbal assembly 700 described above with regard to FIGS. 7A-7F, and in one embodiment is substantially equivalent to the cymbal assembly 700 with the exception of a modified electronics module, which will be discussed in detail below with regard to FIG. 9C.

A ring 914, which can be of one or more sound dampening materials such as foam, rubber, and/or other materials known in the art, can be used to dampen and/or prevent acoustic sound being produced by the cymbals 910,920 coming into contact with one another. Other elements and methods for dampening could be used in addition to or in place of the ring 914 as would be understood by one of skill in the art.

The hi-hat 900 can also include electronics and related components, in this case as part of the top cymbal 920, though it is understood that other mounting arrangements are possible, such as being mounted to the topside of the bottom cymbal 910. For instance, electronics and related components can be included in an electronics module 952, shown in detail in FIG. 9C. The electronics module 952 can include many of the same or similar components as the electronics module 752, such as an electronic 200 and one or more power sources 780.

The shown assembly and other embodiments of the present disclosure can also include a capacitive lever 960. In the specific embodiment shown, the capacitive lever 960 includes a mount portion 960*a* and a lever portion 960*b*, though many different embodiments are possible, and the mount portion could be omitted in some embodiments. The lever portion 960*b* can be, for example, a spring metal strip, and can be made of a conductive material such as metal. The mount portion 960*a* can be round (similar to or the same as the mount portion 1060*a* discussed in more detail below), and can be covered by two layers: a conductive layer that can be connected to the electronic 200, and a non-conductive layer over and/or covering the conductive layer to prevent the lever portion 960*b* from making contact with the conductive layer because the non-conductive layer is between the conductive layer and the lever portion 960*b*. In the embodiment shown, the capacitive lever 960 is part of the electronics module 952, though other embodiments are possible. As with the cymbal assembly 700, by including the capacitive lever 960 as part of the electronics module 952, the electronics module 952 can be used with varying sizes of instruments such as hi-hats.

As the lever portion 960*b* is moved (in the embodiment shown, in the rotational direction shown and/or in the direction shown by the arrow, though other embodiments are possible) it flexes/rolls on the mount portion 960*b*, which can be round shaped. In embodiments where the mount portion 960*b* is round, this allows the lever portion 960*b* to gradually make more (or less) contact with the mount portion 960*a* as it changes position, resulting in great sensitivity and accuracy. As the lever portion 960*b* is moved, a capacitive displacement sensor measures the change in position and produces a signal corresponding to the position. This signal is an input into the electronic 200. In order to cause rotation of the capacitive lever, an actuator such as the actuator 962 can be used. The actuator in this embodiment is included above the bottom cymbal 910 and below the top cymbal 920, and can be mounted to the stand 930 and/or be included as part of the top cymbal 920. The actuator 962 can be circumferential in nature (e.g., as shown, a cup shape) so as to operate effectively no matter the orientation of the top cymbal 920 (and thus the capacitive lever 960). In operation, as the top cymbal 920 is moved downward, the capacitive lever 960 encounters the actuator 960 and is rotated upward. The capacitive displacement sensor can be used to measure the position of the capacitive lever 960 and, thus, the position of the top cymbal 920 in relation to the bottom cymbal 910 and/or the proximity of the cymbals 910,920.

In a traditional hi-hat assembly, the sound produced when a user strikes the top cymbal, such as with a drumstick, will vary based on the position of the top cymbal relative to the bottom cymbal. For instance, if a the user has actuated the pedal to a point where the top cymbal has moved halfway toward the bottom cymbal, then the sound produced upon striking the top cymbal will be different than the sound that is produced when striking the top cymbal when it is at its resting position. In the embodiment shown, when a user strikes the assembly with a drum stick, such as by striking the topside of the top cymbal 920, the relative position of the top and bottom cymbals 910,920 is measured using the capacitive lever 960, and a signal corresponding to that position is used as an input to produce a sound, such as an input to the electronic 200. The sensor impulse will vary based on the position of the capacitive lever 960, which itself varies based on the relative positions of the top and bottom cymbals 910,920 (in this case, based on the position of the top cymbal 920); and the sound produced can vary based on the message/impulse.

In this specific embodiment, the lever 960 is used to measure position through capacitance variation. However, other embodiments are possible. For instance, in some embodiments, a different mechanism than a lever is used, such as a compressible device whose vertical height varies based on the relative positions of the cymbals. In other embodiments, variables other than capacitance are used. In some embodiments, more than one measuring device (such as but not limited to levers) are used. In some embodiments, the measuring device, which is included as part of the electronics module 952 in a central position of the assembly, is in another position, such as a position near the rim of the cymbal or in an intermediate position. In one contemplated embodiment, an optical sensor is used to measure the distance between the two cymbals. In another contemplated embodiment, a sound and/or light reflection/time-of-flight measurement is used to determine the space between the two cymbals, such as an optical and/or time-of-flight sensor. Many different embodiments are possible.

An embodiment where electronics and/or the position sensing mechanism (such as the lever 960) are included proximate and/or between the cymbals, such as the assembly 900 where the electronics are included between the top and bottom cymbals 920,910, can have distinct advantages over embodiments where cymbal position sensing elements are included elsewhere. For instance, when position sensing utilizes elements in the pedal, a wire often must be run from the pedal, such as to a transmitter/converter (e.g., the transmitter/converter 952). This can be cumbersome, and is avoided in the assembly 900 by including all or substantially all electronic components between and/or proximate the cymbals 910,920. As with all of the embodiments of the present disclosure, this is also beneficial in that the user can select his or her own hardware to use with each drum, such as his or her favorite drum pedal.

Example 6: Hi-Hat Assembly Embodiment 2

Figure 10A:
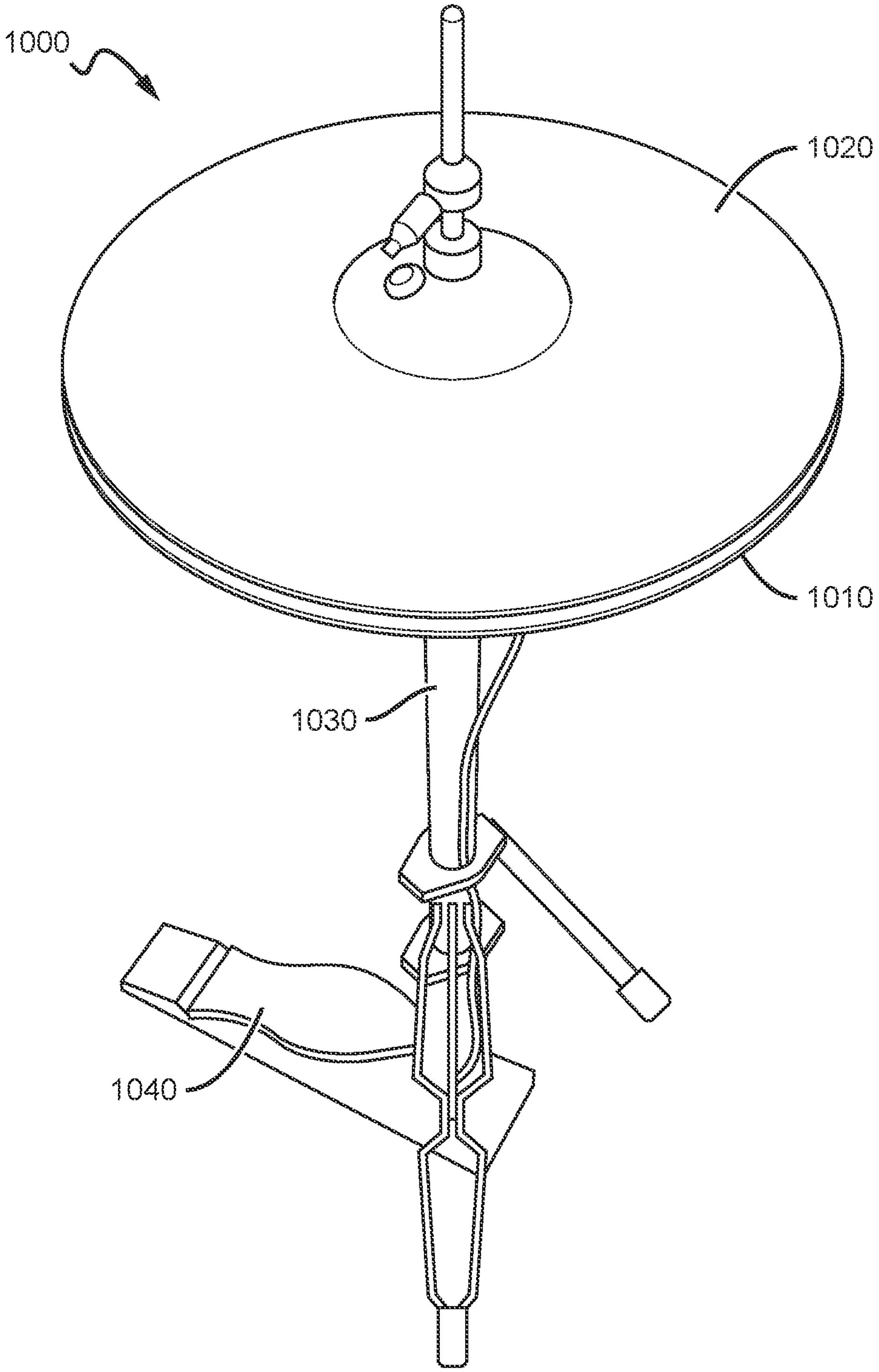
Figure 11A:
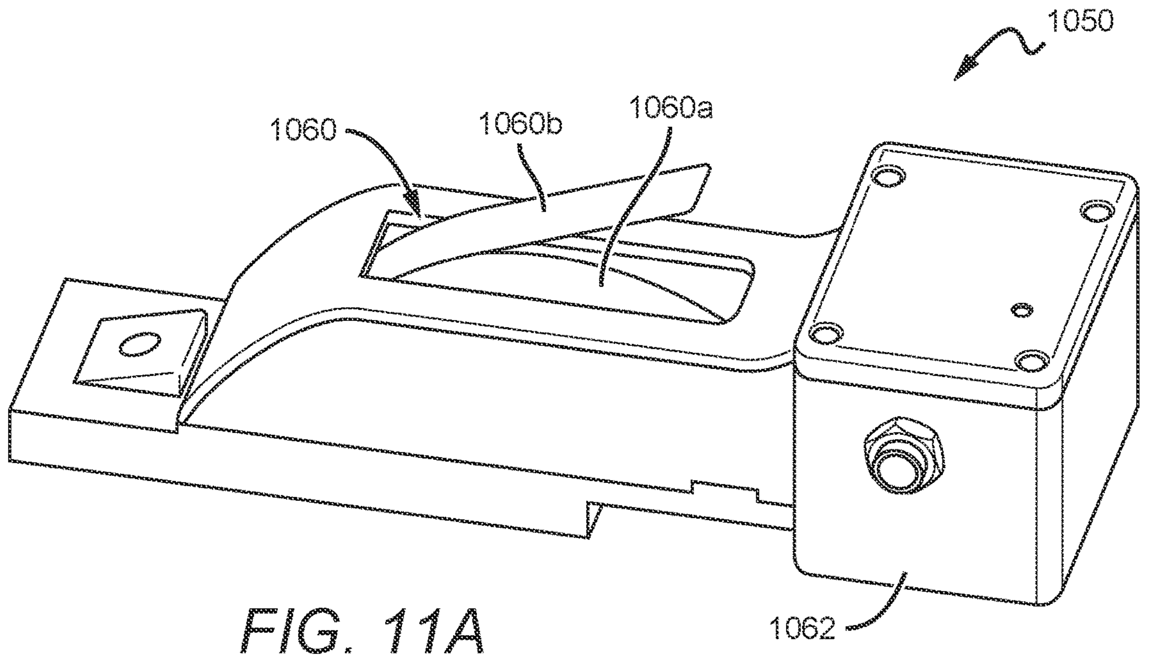
FIGS. 11A and 11B are perspective and exploded perspective views, respectively, of portions of the hi-hat assembly shown in FIGS. 10A-10C.
Figure 11B:
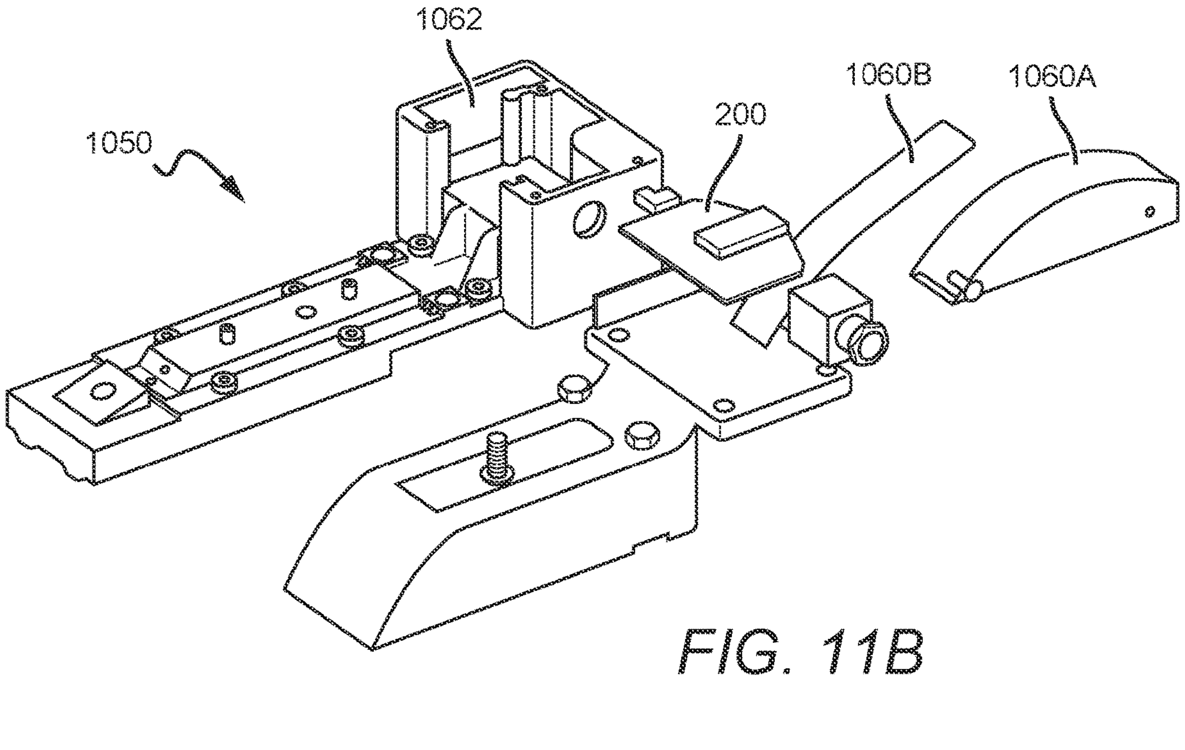

As another example of a cymbal instrument according to the present disclosure, FIGS. 10A-10C show a hi-hat assembly 1000. The hi-hat assembly can include a bottom cymbal 1010 and top cymbal 1020, which can be mounted on a stand 1030, and a pedal 1040. The assembly also includes an electronics portion 1050, which is also shown in FIGS. 11A and 11B. The electronics portion 1050 can be under the pedal 1040 as shown, though other embodiments are possible. The electronics portion 1050 can include, for example, a capacitive lever 1060 (itself including a mount portion 1060*a* and a lever portion 1060*b*), an electronic 200 and a power source such as batteries (which can be included in an electronics compartment 1062), and a jack for a wire connection 1080, though it is understood that some of these components (e.g., the jack and wire connection 1080) can be omitted in some embodiments.

In this embodiment, a capacitive lever 1060 similar to the capacitive lever 960 from FIGS. 9A-9C is included, but the electronics portion 1050 is a part of the pedal 1040 instead of between the cymbals 1010,1020. It is understood that components similar to those shown for the capacitive lever

960 could be used instead of the components of the capacitive lever 1060, and components similar to those shown for the capacitive lever 1060 could be used instead of the components of the capacitive lever 960 in the hi-hat assembly 900. Additionally, it is understood that the electronics portion 1050 can be used with pedals that are not part of a hi-hat, but part of another type of assembly, such as a bass drum beating assembly. Many different embodiments and combinations are possible.

As can be best seen in FIGS. 10B and 10C, as a user presses down the pedal 1040, the capacitive lever 1060 (specifically, the lever portion 1060*b*) is actuated and pressed downward, and when the pedal is raised, the capacitive lever 1060 is released and springs back upward. The assembly can include a stopper 1070 (e.g., a rubber stopper) to limit the range of motion of the pedal 1040 and lever portion 1060*b*. As the lever portion 1060*b* is pressed down, it is pressed onto the mount portion 1060*a*, which is round such that the lever portion 1060*b* makes gradually more contact with the mount portion 1060*a*. The mount portion 1060 can include two layers, the first being a conductive layer connected to an electronic 200, and the second a non-conductive layer (e.g., rubber and/or tape) for preventing contact of the lever portion 960*b* with the conductive layer (e.g., by being over the conductive layer, and/or between the conductive layer and the lever portion 1060*b*). The conductive layer and the lever portion 1060*b* can be connected to the electronic 200 (e.g. via wire connections) to accomplish the previously discussed sensing (e.g., capacitive sensing), which can be programmed into the electronic 200. The electronic can use the sensed information to produce sounds reminiscent of a traditional acoustic hi-hat.

The electronic 200 can be connected to the cymbals 1010,1020 and an electronics portion there (e.g., electronics portion 950), such as via the wire connection 1080, though it is understood that wireless versions are possible, such as versions where transmission is achieved wirelessly and/or where communication between the cymbals and electronic portion 1050 is not needed, such as embodiments where the pedal assembly is operating as an independent device with the role of informing the system (e.g., the hub) of pedal position.

Example 7: Hi-Hat Assembly Embodiment 3

Figure 12A:
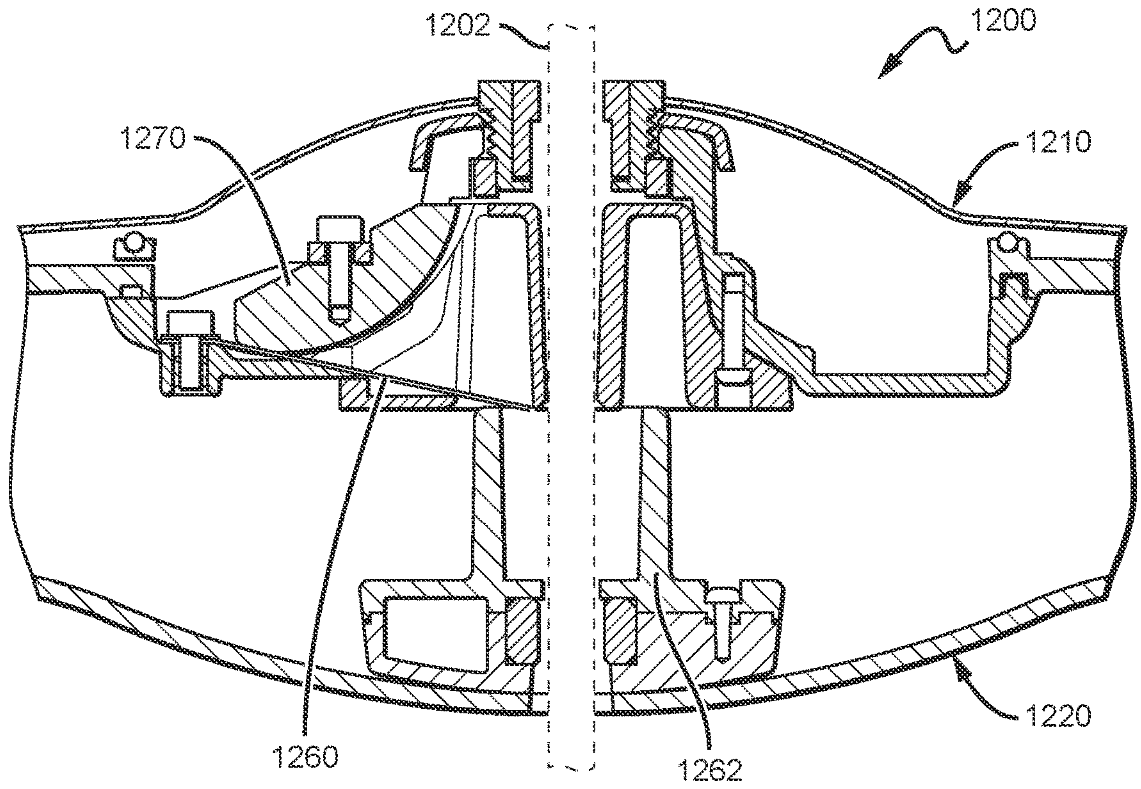
FIGS. 12A and 12B are cross-sectional views of another embodiment of a hi-hat assembly according to the present disclosure.
Figure 12B:
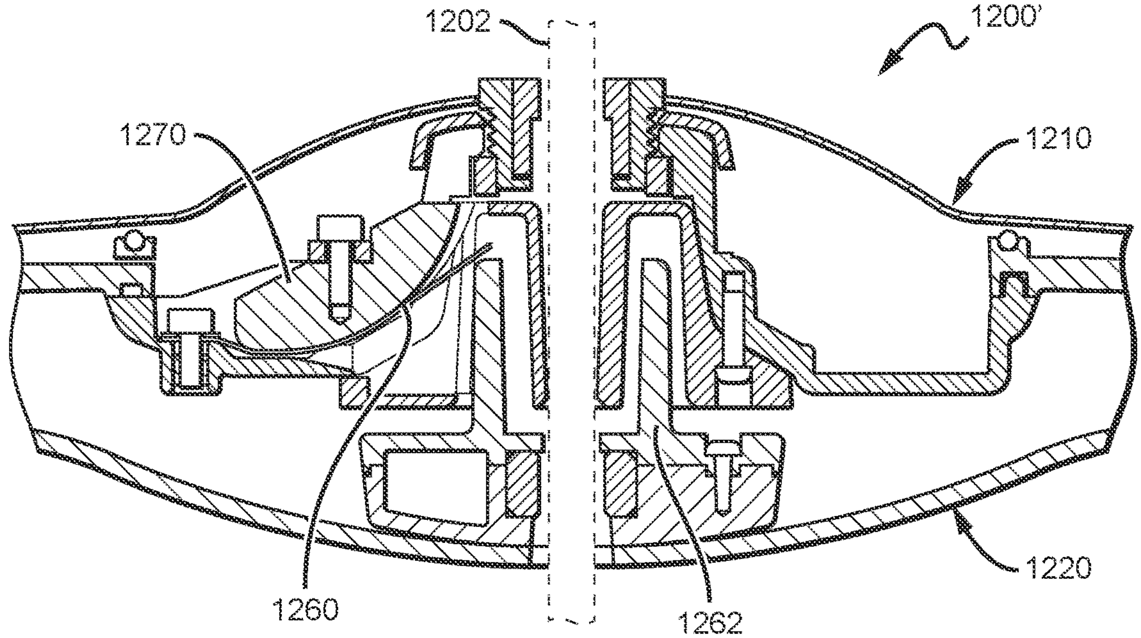

As another example of a cymbal instrument according to the present disclosure, FIGS. 12A and 12B show a hi-hat assembly 1200 according to the present disclosure. FIG. 12A shows the assembly 1200 in a fully open position (i.e., when it is not being played or biased by a drummer), while FIG. 12B shows the assembly 1200' in a fully closed position (i.e., when the cymbals are pressed against one another). The hi-hat assembly 1200 can include components similar to or the same as the assemblies 1000,1050 from FIGS. 9A-11B.

The assembly 1200 can include a bottom cymbal 1210 and a top cymbal 1220, mounted on a stand rod 1202. The assembly can further include a mount or ramp 1270 (referred to hereinafter as a "mount" for simplicity), an actuator 1262, and a capacitive lever 1260 with lever portion 1261. The actuator 1262 can be similar to or the same as, and serve a similar function to, the actuator 962 from the assembly 900. The actuator 962 can be, for example, a plunger. The actuator 1262 can be circumferential in nature, such as round or oval shaped, and/or can cover more than 180°, 270° or more, 300° or more, 330° or more, 350° or more, or 360° As described above with regard to FIGS. 9A-9C, this is beneficial in that it allows the capacitive lever to perform its function regardless of the orientation of the cymbals 1210, 1220.

The capacitive lever 1260 and actuator 1262 can be mounted on different ones of the cymbals 1210,1220. While it is understood that other embodiments are possible, in the embodiment shown the capacitive lever 1260 is mounted on the top cymbal 1220, and the actuator 1262 is mounted on the bottom cymbal 1210; in another embodiment, the capacitive lever 1260 is on the bottom cymbal 1210 while the actuator 1262 is on the top cymbal 1220. As one of the cymbals (e.g., the top cymbal 1220) moves toward the other and the assembly 1200 moves toward the position 1200', the lever portion 1261 encounters the actuator 1262 and begins to become displaced.

The lever portion 1261 can be rigid or, in the embodiment shown, flexible, such as a leaf spring. The mount 1270 can be similarly shaped and serve a similar function to the mount portion 1060*a* from FIGS. 11A and 11B. In the fully open position of the assembly 1200 as shown in FIG. 12A, the lever portion 1261 can be resting on the actuator 1262, and can be partially displaced already or can be undisplaced (i.e., in its natural resting position). As the lever portion 1261 becomes displaced and moves toward the closed position 1200' shown in FIG. 12B, it comes into more contact with and/or becomes nearer to the mount 1270. While other embodiments such as linear embodiments are possible, an engagement surface 1272 of the mount 1270 can be round or curved such that the lever portion 1060*b* makes gradually more contact as the cymbals 1210,1220 become nearer one another and/or as the lever portion 1261 is displaced more by the actuator 1262. The engagement surface 1272 can be continuous, though other embodiments are possible, such as discontinuous embodiments.

As discussed with regard to FIGS. 11A and 11B, the lever portion 1261 and/or the mount 1270 can both comprise a conductive material (e.g., a metal such as aluminum), such as being made of a conductive material and/or including a conductive portion or layer. One or both of the lever portion 1261 and the mount 1270, such as the engagement surface 1272, can also include a non-conductive material or layer for preventing contact of the conductive materials. The non-conductive material(s) or layer(s) can be between the conductive materials of the lever portion 1261 and mount 1270. The non-conductive material could be, for instance, rubber, tape, a non-conductive coating, a powder, a powder coating, or other materials and arrangements as would be understood by one of skill in the art. In one specific embodiment, the mount 1270 includes a powder coating to prevent contact of the conductive materials.

The engagement surface 1272 can be many different shapes, including but not limited to linear or curved shapes. With respect to curved shapes, the radius of curvature can be constant or varied (e.g., such as in a spline curve). Variation of the radius of curvature can allow for more sensitivity based on the position of the cymbals 1210,1220. In one embodiment, a larger radius of curvature is used further from a fulcrum 1260*a* of the lever 1260, such as on a distal portion 1261*b* of the lever portion 1261 compared to a proximal portion 1261*a*. When a larger radius of curvature is used, the same amount of movement of the cymbals 1210,1220 results in more contact between the lever portion 1261 and the engagement surface 1272 and/or a greater capacitance change for the same amount of cymbal movement, and thus more sensitivity. This can be particularly useful when the cymbals 1210,1220 are nearer to a closed position, as this is a particular area for musicians where extra sensitivity is needed. As described above with regard to FIGS. 9A-11B, a sensor such as a capacitive displacement sensor can be used to measure the capacitance between the materials, from which distance can be ascertained. The sensor can be mounted between the cymbals 1210,1220, such as on an underside of the top cymbal 1210 or the topside of the bottom cymbal 1220, though it is understood that other embodiments are possible.

It is understood that embodiments presented herein are meant to be exemplary. Embodiments of the present disclosure can comprise any combination of compatible features shown in the various figures, and these embodiments should not be limited to those expressly illustrated and discussed. For instance and not by way of limitation, the appended claims could be modified to be multiple dependent claims so as to combine any combinable combination of elements within a claim set, or from differing claim sets.

Although the present disclosure has been described in detail with reference to certain preferred configurations thereof, other versions are possible. Therefore, the spirit and scope of the disclosure should not be limited to the versions described above.

Additionally, it is understood that the components and concepts in the present disclosure can be applied to musical instruments not specifically mentioned herein. For instance, these components and concepts can be applied to handheld instruments (e.g. cowbells, congas, triangles, tambourines, shakers), musical instruments such as music pads, marching band instruments, and other types of percussion and non-percussion instruments. Additionally, the components and concepts (e.g., the electronics and/or electronics portions described here) could be part of a device or system separate from an instrument but attachable to an instrument (or a variety of different types of instruments), such as clip-on trigger devices, such as devices that are attachable to a drum rim and/or drumhead.

Additionally, it is understood that the components and concepts in the present disclosure can be applied to signals other than instrument, musical, and/or sound signals, whether in place or instrument signals or in addition to instrument signals. For instance and not by way of limitation, signals for controlling lights could also be used. In one specific embodiment, a certain type of actuation produces an instrument signal and a light signal (e.g., to turn on a light, to turn off a light, the change a light's color, to change the light's mode (e.g. to or from strobe mode), to change a light's brightness, etc.). In another embodiment, a certain type of actuation produces only a light signal. In another embodiment, some types of actuation produce instrument signals while others produce light signals. In another embodiment, a user can switch between instrument mode, light mode, and/or instrument-and-light mode. Many different embodiments are possible, including embodiments using other types of signals.

The foregoing is intended to cover all modifications and alternative constructions falling within the spirit and scope of the disclosure as expressed in the appended claims, wherein no portion of the disclosure is intended, expressly or implicitly, to be dedicated to the public domain if not set forth in the claims.

We claim:

1. An electronic musical instrument system, comprising:

an electronic musical instrument comprising an electronic for communicating with a hub, wherein said electronic musical instrument is configured to operate in a plurality of modes having different functionalities, wherein said plurality of modes comprises a sleep mode, a standby mode, and a run mode;

wherein said electronic musical instrument comprises one or more sensors, and said electronic is configured, when said electronic musical instrument is in said standby mode, to receive impulses from said one or more sensors caused by actuations of said electronic musical instrument;

wherein upon receipt of one of said impulses by said electronic, said electronic musical instrument is configured to change from said standby mode to said run mode and send an instrument signal to said hub, said instrument signal corresponding to a sound; and wherein said instrument signal is 25 bytes or less and has a length of 250 μs or less, and wherein said electronic musical instrument is configured to return to standby mode after receiving an acknowledgment message from said hub.

2. The electronic musical instrument system of claim 1, further comprising said hub.

3. The electronic musical system of claim 1, wherein said plurality of modes further comprises a scan mode, and wherein said electronic musical instrument is configured to conduct a request cycle, said request cycle comprising toggling between said sleep mode and said scan mode to seek a connection to said hub when in said scan mode.

4. The electronic musical system of claim 3, wherein said electronic musical instrument is configured to conduct said request cycle at a pre-set cycle time, and wherein said pre-set cycle time is between 1 and 30 seconds.

5. The electronic musical system of claim 3, wherein the time in scan mode for each request cycle is under 100 ms.

6. The electronic musical system of claim 3, wherein the time in scan mode for each request cycle is less than 1% of total request cycle time.

7. The electronic musical system of claim 3, wherein during said request cycle said electronic musical instrument seeks a connection only to a hub to which said electronic musical instrument was most recently connected.

8. The electronic musical system of claim 3, wherein during said request cycle said electronic musical instrument seeks a connection only on a channel on which the electronic musical system was last connected.

9. The electronic musical system of claim 1, wherein said electronic musical instrument is a drum, wherein said electronic musical instrument comprises a sensor, wherein said electronic musical instrument is configured to send an instrument signal upon said sensor producing an impulse of at least a first threshold magnitude in response to an actuation of a drumhead of said drum having a first force, and configured not to send an instrument signal upon said sensor producing an impulse below said first threshold magnitude in response to an actuation of said drumhead of said drum having a second force less than said first force.

10. The electronic musical system of claim 1, wherein said electronic musical instrument is a drum, wherein said electronic musical instrument is configured to transition from said sleep mode to said standby mode upon a sensor producing an impulse of at least a first threshold magnitude in response to an actuation of a drumhead of said drum having a first force, and configured not to transition from said sleep mode to said standby mode upon said sensor producing an impulse below said first threshold magnitude in response to an actuation of said drumhead of said drum having a second force less than said first force.

11. The electronic musical system of claim 1, wherein:

said electronic musical instrument comprises a sensor, wherein said electronic musical instrument is configured to send an instrument signal upon said sensor producing an impulse of at least a first threshold magnitude in response to playing of said electronic musical instrument with a first force, and configured not to send an instrument signal upon said sensor producing an impulse below said first threshold magnitude in response to playing of said electronic musical instrument with a second force below said first force;

said electronic musical instrument is configured to transition from said sleep mode to said standby mode upon said sensor producing an impulse of at least a second threshold magnitude in response to playing of said electronic musical instrument with a third force, and configured not to transition from said sleep mode to said standby mode upon said sensor producing an impulse below said second threshold magnitude in response to playing of said electronic musical instrument with a fourth force below said third force; and said second threshold magnitude is larger than said first threshold magnitude.

12. The electronic musical system of claim 1, wherein said electronic musical instrument is configured to send instrument profile information and/or settings embedded within a connection request message.

13. The electronic musical system of claim 1, comprising said hub and a plurality of said electronic musical instruments, wherein each of said electronic musical instruments is configured to communicate with said hub.

14. The electronic musical system of claim 1, wherein said instrument signal uses MIDI formatting.

15. The electronic musical instrument system of claim 1, further comprising said hub and a speaker connected to said hub, wherein said speaker is configured to play said sound.

16. The electronic musical system of claim 1, wherein said electronic musical instrument is configured to send user configurable settings embedded within a connection request message, wherein said user configurable settings are sound settings.

17. The electronic musical instrument of claim 1, wherein said instrument signal corresponds to a drum sound.

18. An electronic musical instrument system, comprising:

a speaker;

a computer connected to said speaker;

a hub connected to said computer;

a plurality of electronic drums each comprising a respective drumhead and at least one respective piezoelectric sensor, and further comprising a respective electronic for communicating with said hub, wherein each of said electronic drums is configured to operate in a plurality of modes having different functionalities, wherein said plurality of modes comprises a standby mode and a run mode;

wherein in each of said electronic drums, the respective piezoelectric sensor is configured to produce an impulse in response to an actuation of the respective drumhead, and the respective electronic drum is configured to change from said standby mode to said run mode, convert said impulse into an instrument signal, wirelessly transmit said instrument signal to said hub, receive an acknowledgment of said instrument signal from said hub, and thereafter change back from said run mode to said standby mode to monitor for further impulses, said instrument signal having a message length of 250 μs or less;

wherein said hub is configured to receive instrument signals from each of said plurality of electronic drums and transmit said instrument signals to said computer, and wherein said computer is configured to play drum sounds corresponding to said instrument signals using said speaker.

* * * * *